US010386496B2

(12) United States Patent
Dai et al.

(10) Patent No.: US 10,386,496 B2
(45) Date of Patent: Aug. 20, 2019

(54) NAVIGATION SATELLITE ORBIT AND CLOCK DETERMINATION WITH LOW LATENCY CLOCK CORRECTIONS

(71) Applicant: Deere & Company, Moline, IL (US)

(72) Inventors: Liwen L. Dai, Torrance, CA (US); Sonia Kuntz, Torrance, CA (US); Yiqun Chen, Torrance, CA (US); Yujie Zhang, Torrance, CA (US)

(73) Assignee: DEERE & COMPANY, Moline, IL (US)

( * ) Notice: Subject to any disclaimer, the term of this patent is extended or adjusted under 35 U.S.C. 154(b) by 177 days.

(21) Appl. No.: 15/448,481

(22) Filed: Mar. 2, 2017

(65) Prior Publication Data

US 2017/0269226 A1    Sep. 21, 2017

Related U.S. Application Data

(63) Continuation-in-part of application No. 15/257,092, filed on Sep. 6, 2016.
(Continued)

(51) Int. Cl.
*G01S 19/41* (2010.01)
*G01S 19/44* (2010.01)
(Continued)

(52) U.S. Cl.
CPC ............ *G01S 19/41* (2013.01); *G01S 19/44* (2013.01); *G01S 19/07* (2013.01); *G01S 19/32* (2013.01)

(58) Field of Classification Search
CPC ........... G01S 19/07; G01S 19/41; G01S 19/44
See application file for complete search history.

(56) References Cited

U.S. PATENT DOCUMENTS 5,148,179 A    9/1992 Allison
5,828,336 A *  10/1998 Yunck ............... G01S 19/07
                                          342/357.31
(Continued)

FOREIGN PATENT DOCUMENTS

WO    WO2011/034616 A2    3/2011

OTHER PUBLICATIONS

Chen, et al., "Efficient High-Rate Satellite Estimation for PPP Ambiguity Resolution Using Carrier-Rangers," Sensors (Basel), 14 (12); Publication (online) Dec. 2014, from https://www.ncbi.nim.nih.gov/pmc/articles/PMC4299015/, 13 pgs.
(Continued)

*Primary Examiner* — Gregory C. Issing
(74) *Attorney, Agent, or Firm* — Morgan, Lewis & Bockius LLP

(57) ABSTRACT

A satellite corrections generation system receives reference receiver measurement information from a plurality of reference receivers at established locations. In accordance with the received reference receiver measurement information, and established locations of the reference receivers, the system determines narrow-lane navigation solutions for the plurality of reference receivers. The system also determines, in accordance with the narrow-lane navigation solutions, at a first update rate, an orbit correction for each satellite of a plurality of satellites; at a second update rate, a clock correction for each such satellite; and at a third update rate that is faster than the second update rate, an update to the clock correction for each such satellite. Further, the system generates navigation satellite corrections for each such satellite, including the orbit correction updated at the first update rate, and the clock correction that is updated at the third update rate.

22 Claims, 14 Drawing Sheets

Related U.S. Application Data

(60) Provisional application No. 62/310,554, filed on Mar. 18, 2016, provisional application No. 62/310,080, filed on Mar. 18, 2016.

(51) Int. Cl.
*G01S 19/07* (2010.01)
*G01S 19/32* (2010.01)

(56) References Cited

U.S. PATENT DOCUMENTS

| | | |
|---|---|---|
| 5,991,691 A | 11/1999 | Johnson |
| 2008/0297408 A1 | 12/2008 | Dai et al. |
| 2010/0085252 A1 | 4/2010 | Laurichesse et al. |
| 2011/0037646 A1 | 2/2011 | Tajima et al. |
| 2011/0210889 A1 | 9/2011 | Dai et al. |
| 2012/0162007 A1 | 6/2012 | Leandro et al. |
| 2012/0176271 A1* | 7/2012 | Dai .................. G01S 19/04 342/357.44 |
| 2012/0182181 A1 | 7/2012 | Dai et al. |
| 2014/0002300 A1 | 1/2014 | Leandro et al. |
| 2014/0015712 A1 | 1/2014 | Leandro et al. |
| 2015/0289089 A1 | 10/2015 | Raghupathy et al. |
| 2016/0047917 A1 | 2/2016 | Chen et al. |
| 2016/0370467 A1* | 12/2016 | Gao .................. G01S 19/07 |
| 2016/0377730 A1* | 12/2016 | Drescher ............. G01S 19/13 342/357.23 |
| 2017/0269224 A1 | 9/2017 | Zhang et al. |

OTHER PUBLICATIONS

Deere & Company, International Search Report and Written Opinion, PCT/US2017/021738, dated May 26, 2017, 10 pgs.
Deere & Company, International Search Report and Written Opinion, PCT/US2017/021743, dated Jun. 1, 2017, 17 pgs.
Deere & Company, International Search Report and Written Opinion, PCT/US2017/021752, dated Jun. 2, 2017, 33 pgs.
Deere & Company, International Search Report and Written Opinion, PCT/US2017/021742, dated Jun. 27, 2017, 29 pgs.

* cited by examiner

Figure 8

Table 1 GPS Ambiguity Cluster Matrix

Table 2 List of Ambiguities

NAVIGATION SATELLITE ORBIT AND CLOCK DETERMINATION WITH LOW LATENCY CLOCK CORRECTIONS

RELATED APPLICATIONS

This application claims priority to U.S. Provisional Patent Application No. 62/310,554, filed Mar. 18, 2016, and U.S. Provisional Patent Application No. 62/310,080, filed Mar. 18, 2016, and is a continuation-in-part of U.S. patent application Ser. No. 15/257,092, filed Sep. 6, 2016, each of which is hereby incorporated by reference in its entirety.

This application is also related to U.S. patent application Ser. Nos. 15/448,446, 15/448,457, and 15/448,474, all filed on Mar. 2, 2017, each of which is hereby incorporated by reference in its entirety.

TECHNICAL DATA FIELD

The disclosed embodiments relate generally to systems and methods for generating navigation satellite correction information, for respective satellites in a satellite-based navigation system, and more specifically to an improved system and method for generating satellite bias values to be included in the navigation satellite correction information, which is provided to navigation receivers via one or more communication networks to facilitate accurate position determination of the navigation receivers.

BACKGROUND

In any number of commercial and other applications, such as agricultural, oil exploration, mining, geological, and infrastructure projects, mobile vehicle navigation, and so on, it would be useful to be determine the position of a navigation receiver or other object with a high level of precision, such as 10 cm, 5 cm, or 2 cm, directly from satellite navigation signals, with respect to a global reference frame using precise point positioning (PPP) or other absolute mode of navigation.

In navigation systems that use a differential mode of navigation, such as real-time kinematic (RTK) based systems, base station receivers (often called base stations), located at surveyed positions, periodically broadcast satellite data to moving object receivers. Moving object receivers combine their own phase measurements with the ones received from the base station, and use that information plus the position of the base station to determine their own position. However, the use of differential modes of navigation is not practical in many settings, due to either the cost of such systems, the lack of base stations positioned sufficiently close to the position(s) of the moveable objects whose position needs to be determined with high precision in real time, or difficulties with reliable signal transmission of information from the local base station(s).

Navigation systems using absolute modes of navigation typically use standard point positioning (SPP) or precise point positioning (PPP). In absolute mode navigation systems, a moveable object's coordinates are determined with respect to a global reference frame, using satellite navigation signals received from multiple navigation satellites. To quickly and accurately determine their positions in the global reference frame, navigation receivers need accurate and up to date information on the orbits, clocks, and satellite-specific signal transmission delays of the navigation satellites from which satellite navigation signals are received.

It would be highly desirable to provide a system and method that determines improved navigation satellite correction information so as to enable navigation receivers to achieve higher levels of position determination accuracy using an absolute mode of navigation.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 8 illustrates, in two tables, Tables 1-2, an example of GPS ambiguity cluster matrix information and a list of ambiguity datum.

SUMMARY

Figure 1:
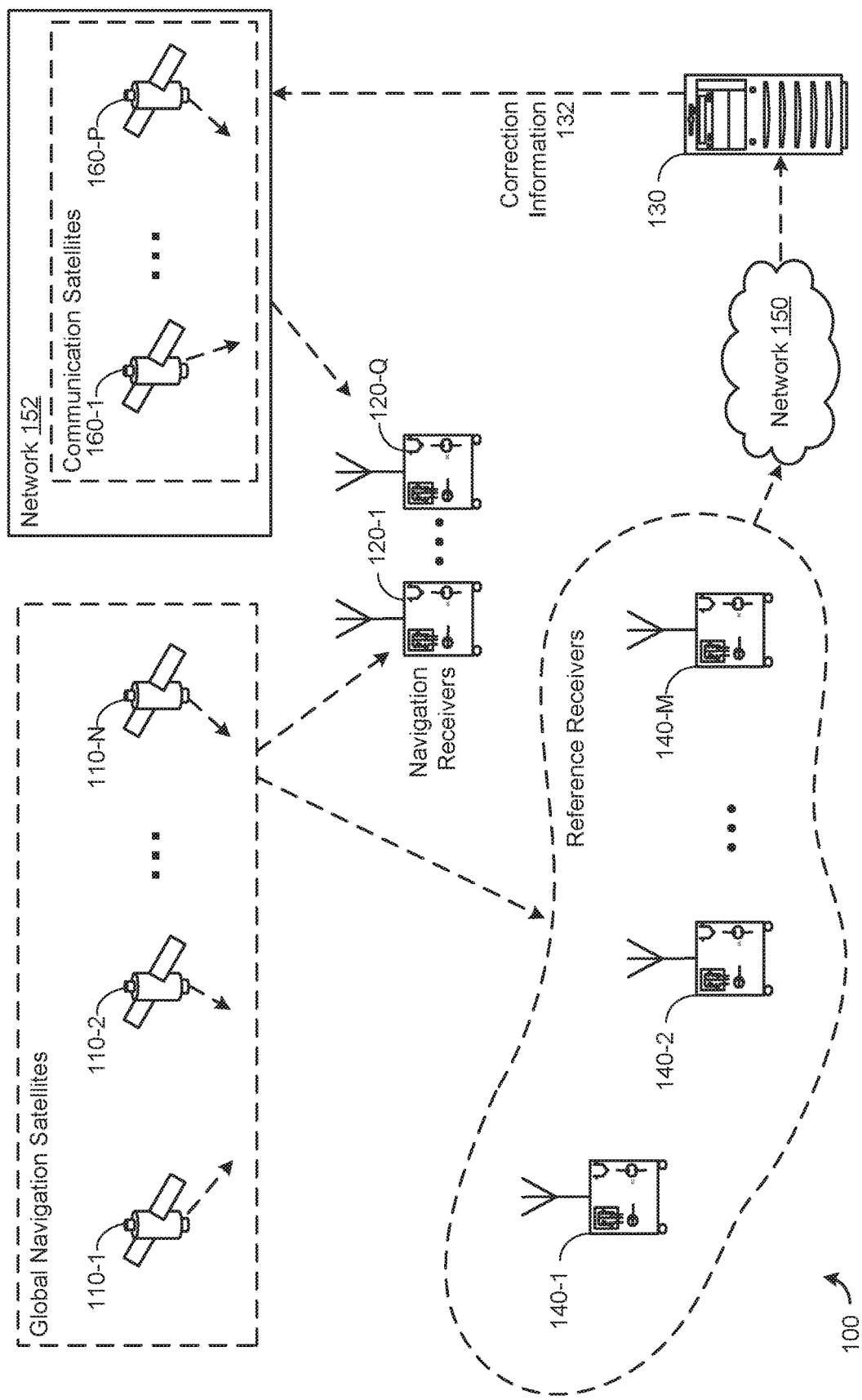
FIG. 1 is a block diagram illustrating a differential global navigation system, according to some embodiments.

Some embodiments provide a system, computer readable storage medium storing instructions, or a method for determining navigation satellite corrections for a plurality of satellites, comprising n satellites, to facilitate navigation by navigation receivers that receive satellite navigation signals from various subsets of the plurality of satellites.

(A1) In some embodiments, in a method of determining navigation satellite corrections for a plurality of satellites, a satellite corrections generation system receives reference receiver measurement information, including receiving, from a plurality of reference receivers at established locations, measurements of satellite navigation signals received by each of the reference receivers, wherein the satellite navigation signals received by each reference receiver of the plurality of reference receivers include satellite navigation signals at first (L1) and second (L2) frequencies. In accordance with the received reference receiver measurement information, and in accordance with the established locations of the plurality of reference receivers, the system determines initial narrow-lane navigation solutions for the plurality of reference receivers, the initial narrow-lane navigation solutions including double-difference (DD) narrow-lane fixed integer ambiguity values and single-different (SD) narrow-lane floating ambiguities.

In accordance with the initial narrow-lane navigation solutions, for a constellation of n satellites in the plurality of satellites, the system determines m clusters of single-difference (SD) narrow-lane floating ambiguities, where m is an integer greater than one, each cluster of SD narrow-lane floating ambiguities comprising pairs of SD narrow-lane floating ambiguities, $\nabla \hat{N}_{r_m}^{S_i S_j}$ and $\nabla \hat{N}_{r_n}^{S_i S_j}$ for a respective pair of satellites, each pair of SD narrow-lane floating ambiguities comprising first and second SD narrow-lane floating ambiguities for a first reference receiver and a second receiver, respectively, that receive satellite navigation signals from both satellites in the respective pair of satellites, wherein the SD narrow-lane floating ambiguities in each pair of SD floating ambiguities have equal fractional portions, $\lfloor \nabla \hat{N}_{r_m}^{S_i S_j} \rfloor = \lfloor \nabla \hat{N}_{r_n}^{S_i S_j} \rfloor$. Further, the method includes determining a satellite narrow-lane bias value, $b_{NL}^s$, for each satellite s of the n satellites, in accordance with fractional portions of the SD narrow-lane floating ambiguities in the m clusters.

The method also includes, in accordance with the determined initial satellite narrow-lane bias value, $b_{NL}^s$, for each satellite s of the n satellites, generating narrow-lane navigation solutions for the plurality of reference receivers, including SD narrow-lane fixed integer ambiguity values for the plurality of reference receivers, and generating a set of navigation satellite corrections for each satellite of the n satellites, the set of navigation satellites corrections for each satellite s including a correction corresponding to the satellite narrow-lane bias value, $b_{NL}^s$, determined for satellite s; wherein the sets of navigation satellite corrections for the n satellites are for transmission to navigation receivers for use in determining locations of the navigation receivers.

(A2) In some embodiments of the method of A1, the method includes, in accordance with the received reference receiver measurement information, and in accordance with the established locations of the plurality of reference receivers, determining wide-lane navigation solutions for the plurality of reference receivers, the wide-lane navigation solutions include wide-lane fixed integer ambiguity values, and determining the narrow-lane navigation solutions for the plurality of reference receivers in accordance with the received reference receiver measurement information, the established locations of the plurality of reference receivers, and the wide-lane navigation solutions.

(A3) In some embodiments of the method of A2, the wide-lane navigation solutions for the plurality of reference receivers are generated, using the Melbourne-Wübbena combination of measurements of satellite navigation signals, subject to constraints for both double-difference integer ambiguity values, each corresponding to a pair of reference receivers and a pair of satellites in the plurality of satellites, and single-difference integer ambiguity values, each corresponding to a pair of satellites in view of a respective reference receiver, and wherein generating the satellite narrow-lane bias value, $b_{NL}^s$, for each satellite s of the n satellites includes updating the satellite narrow-lane bias value, $b_{NL}^s$, for each satellite s of the n satellites in one or more Kalman filters.

(A4) In some embodiments of the method of any of A1 to A3, the sets of navigation satellite corrections for the n satellites are for transmission to navigation receivers for use in determining locations of the navigation receivers using an absolute mode of navigation.

(A5) In some embodiments of the method of any of A1 to A3, the method includes transmitting the generated set of navigation satellite corrections for each satellite of the n satellites via one or more communication networks to navigation receivers for use in determining current locations of the navigation receivers using an absolute mode of navigation.

(A6) In some embodiments of the method of any of A1 to A5, m is equal to n-1, the satellite narrow-lane bias value, $b_{NL}^s$, for each satellite s is a narrow-lane phase bias value, and determining n-1 clusters of single-difference (SD) narrow-lane floating ambiguities includes determining a set of double-difference (DD) narrow-lane fixed integer ambiguity values with respect to the reference receivers and the plurality of satellites, each DD narrow-lane fixed integer ambiguity value corresponding to a pair of the reference receivers and a pair of the satellites in the plurality of satellites, wherein each pair of SD narrow-lane floating ambiguities, $\nabla \hat{N}_{r_m}^{S_i S_j}$ and $\nabla \hat{N}_{r_n}^{S_i S_j}$ for a pair of satellites $S_i$ and $S_j$ corresponds to a respective DD narrow-lane fixed integer ambiguity value in the determined set of DD narrow-lane fixed integer ambiguity values.

(A7) In some embodiments of the method of A6, determining the set of DD narrow-lane fixed integer ambiguity values with respect to the reference receivers and the plurality of satellites includes performing an iterative process of removing respective float narrow-lane ambiguities from a set of potentially fixable DD narrow-lane floating ambiguities in accordance with predefined criteria for identifying problematic DD narrow-lane floating ambiguities, until a remaining set of potentially fixable DD narrow-lane floating ambiguities satisfies predefined validation criteria.

(A8) In some embodiments of the method of A6, the method includes including periodically determining an updated set double-difference (DD) narrow-lane fixed integer ambiguity values with respect to the reference receivers and the plurality of satellites, and determining updates to the determined satellite narrow-lane bias values for the n satellites in accordance with updated set of DD narrow-lane fixed integer ambiguity values.

(A9) In some embodiments of the method of any of A1-A8, determining the satellite narrow-lane bias value, $b_{NL}^s$, for a respective satellite includes determining whether the satellite narrow-lane bias value meets over-range adjustment criteria, and in accordance with a determination that the satellite narrow-lane bias value meets the over-range adjustment criteria, adjusting the satellite narrow-lane bias value by a predefined number of narrow-lane cycles, and adjusting corresponding SD narrow-lane ambiguity values by the predefined number of narrow-lane cycles.

(A10) In some embodiments of the method of any of A1-A9, determining the satellite narrow-lane bias value, $b_{NL}^s$, for each satellite s of the n satellites includes the setting the satellite narrow-lane bias values for the n satellites such that a sum of the satellite narrow-lane bias values for the n satellites is equal to zero.

(A11) In another aspect, a system for determining navigation satellite corrections for a plurality of satellites, comprising n satellites, to facilitate navigation by moveable objects having navigation receivers that receive satellite navigation signals from various subsets of the plurality of satellites, includes a plurality of interconnected computer systems that, collectively, execute a plurality of navigation satellite correction modules, wherein execution of the plurality of navigation satellite correction modules causes the system to perform the method of any of A1-A10.

(A12) In some embodiments, a non-transitory computer readable storage medium stores one or more programs for execution by processors of system that includes a plurality of interconnected computer systems, the programs including instructions that when executed by processors of the system cause the system to perform the method of any of A1-A10.

(B1) In some embodiments, a method for determining navigation satellite corrections for a plurality of satellites, to facilitate navigation by moveable objects having navigation receivers that receive satellite navigation signals from various subsets of the plurality of satellites, includes receiving reference receiver measurement information, including receiving, from a plurality of reference receivers at established locations, measurements of satellite navigation signals received by each of the reference receivers, wherein the satellite navigation signals received by each reference receiver of the plurality of reference receivers include satellite navigation signals at first (L1) and second (L2) frequencies. The method further includes, in accordance with the received reference receiver measurement information, and in accordance with the established locations of the plurality of reference receivers, determining narrow-lane navigation solutions for the plurality of reference receivers, the narrow-lane navigation solutions including narrow-lane fixed integer ambiguity values.

The method further includes, in accordance with the narrow-lane navigation solutions, for a constellation of n satellites in the plurality of satellites: at a first update rate, determining an orbit correction for each satellite of the n satellites; at a second update rate, determining a clock correction for each satellite of the n satellites; and, at a third update rate that is faster than the second update rate, determining an update to the clock correction for each satellite of the n satellites. Furthermore, the method includes generating a set of navigation satellite corrections for each satellite of the n satellites, the set of navigation satellites corrections for each satellite s including the orbit correction updated at the first update rate, and the clock correction that is updated at the third update rate.

(B2) In some embodiments of the method of B1, the method includes determining a satellite narrow-lane bias value, $b_{NL}^s$, for each satellite s of the n satellites, where the satellite narrow-lane bias value is a narrow-lane phase bias value, and where the orbit correction and clock correction for each satellite s of the n satellites are determined in accordance with the narrow-lane fixed integer ambiguity value and satellite narrow-lane bias value, $b_{NL}^s$, of the satellite s.

(B3) In some embodiments of the method of B1 or B2, the third update rate is at least five times faster as fast as the second update rate.

(B4) In some embodiments of the method of any of B1-B3, the method includes, in accordance with the received reference receiver measurement information, and in accordance with the established locations of the plurality of reference receivers, determining wide-lane navigation solutions for the plurality of reference receivers, the wide-lane navigation solutions including wide-lane fixed integer ambiguity values. The method also includes determining the narrow-lane navigation solutions for the plurality of reference receivers in accordance with the received reference receiver measurement information, the established locations of the plurality of reference receivers, and the wide-lane navigation solutions.

(B5) In some embodiments of the method of any of B1-B4, the wide-lane navigation solutions are determined by a first set of preprocessor modules, the orbit corrections are determined by an orbit solution module that receives wide-lane solutions from the first set of preprocessor modules, and the clock corrections determined at the second update rate are determined by a clock solution module that receives the wide-lane solutions from the first set of preprocessor modules and receives the orbit corrections from the orbit solution module.

(B6) In some embodiments of the method of B5, wherein the clock solution module is executed by one or more hardware processors distinct from one or more hardware processors that execute the orbit solution module and distinct from one or more hardware processors that execute the first set of preprocessor modules.

(B7) In some embodiments of the method of any of B5-B6, the updates to the clock correction for each satellite are determined by a low latency clock module that receives carrier phase measurements, or information corresponding to carrier phase measurements, received from at least a subset of the reference receivers, and determines changes in the clock correction for each satellite in accordance with the received carrier phase measurements or information corresponding to carrier phase measurements.

(B8) In some embodiments of the method of any of B5-B7, the method includes integrating the updates to the clock correction for each satellite with the clock correction for the satellite to produce an updated clock correction at each epoch in a sequence of epochs, wherein the generated set of navigation satellite corrections for each satellite of the n satellites includes the updated clock correction for each epoch in the sequence of epochs.

(B9) In some embodiments of the method of any of B1-B8, the method includes transmitting the generated set of navigation satellite corrections for each satellite of the n satellites via one or more communication networks to navigation receivers for use in determining current locations of the navigation receivers using an absolute mode of navigation.

(B10) In another aspect, a system for determining navigation satellite corrections for a plurality of satellites, to facilitate navigation by navigation receivers that receive satellite navigation signals from various subsets of the plurality of satellites, includes a plurality of interconnected computer systems that, collectively, execute a plurality of navigation satellite correction modules, wherein execution of the plurality of navigation satellite correction modules causes the system to perform the method of any of B1-B9.

(B11) In yet another aspect, a non-transitory computer readable storage medium stores one or more programs for execution by one or more processors of a system for determining navigation satellite corrections for a plurality of satellites, the system including plurality of interconnected computer systems, the one or more programs including instructions that when executed by the one or more processors of the system cause the system to perform the method of any of B1-B9.

DESCRIPTION OF EMBODIMENTS

FIG. 1 is a block diagram illustrating a differential global satellite navigation system 100, according to some embodiments. The differential global satellite navigation system 100 includes global navigation satellites 110-1 to 110-$n$, where n is an integer greater than 4, or greater than 10, and is typically equal to 32 for GPS and 24 for GLONASS. The global navigation satellites 110-1 to 110-$n$ each transmit at least two carrier signals. In the case of the Global Positioning System (GPS), the carrier signals include the L1 and L2 signals having frequencies of 1.5754 GHz and 1.2276 GHz, and wavelengths of 0.1903 m and 0.2442 m, respectively. In some embodiments, the global navigation satellites are members of another Global Navigation Satellite System (GNSS), such as GLONASS, Galileo, BEIDOU and QZSS. GLONASS carrier signals and signal biases are discussed below. However, for ease of explanation, systems and methods are described herein with respect to the GPS navigation satellites and signals, except where GLONASS-specific issues, signals and solutions are discussed.

In some embodiments, the carrier signals are received by satellite navigation receivers 120 (e.g., navigation receivers 120-1 to 120-Q). For ease of discussion, satellite navigation receivers 120 are hereinafter called navigation receivers. Navigation receivers 120 can be located anywhere with a virtual global reference frame (also sometimes called global coordinate system). Each navigation receiver typically has hardware and software for receiving satellite navigation signals, as well as navigation satellite correction information, and for determining a current location of the navigation receiver by taking into account the navigation satellite correction information while processing the satellite navigation signals.

A respective navigation receiver 120 may be used by a user for navigation or for determining a current position of the respective navigation receiver, the user, or an object connected to, coupled to or otherwise having a same position as the respective navigation receiver. In order to perform navigation and/or position determination operations, the respective navigation receiver receives signals from a subset of the global navigation satellites 110-1 to 110-$n$ (i.e., the subset includes the global navigation satellites in view of the satellite navigation receiver 120). Navigation receiver 120 then makes satellite navigation measurements based on the signals and calculates a state of the navigation receiver 120 based on the satellite navigation measurements. In some embodiments, the state of the navigation receiver includes a position of the satellite navigation receiver (e.g., X, Y, and Z, or latitude, longitude, and zenith components of position), a velocity of the satellite navigation receiver, and a time. A respective navigation receiver 120 is described in more detail below with respect to FIG. 2.

The carrier signals are received by reference stations 140-1 to 140-M (hereinafter collectively called reference receivers 140) at known locations (e.g., surveyed locations). The reference stations include a GNSS receiver that receives signals from the global navigation satellites 110-1 to 110-$n$. At any one time, the GNSS receiver in each reference station receives signals only from the global navigation satellites 110 that are in view of the receiver's antenna. Reference receivers 140 generate measurements of signals received from the global navigation satellites 110-1 to 110-$n$, and provide those measurements to satellite corrections generation system 130. In order to perform these operations, each of the reference receivers 140 receive signals from a subset of the global navigation satellites 110-1 to 110-$n$ (i.e., the subset of global navigation satellites 110-1 to 110-$n$ that are in view of each reference receiver 140) and makes satellite navigation measurements based on the signals. In some embodiments, reference receivers 140 transmit the satellite navigation measurements to a satellite corrections generation system 130 via communication network 150. In some embodiments, communication network 150 includes a combination of communication networks, which optionally includes wired and wireless networks. Reference receivers 140 are described in more detail below with respect to FIG. 2.

In some embodiments, satellite corrections generation system 130 processes the satellite navigation measurements received from reference receivers 140 to determine the state of global navigation satellites 110-1 to 110-$n$. In some embodiments, the state of the global navigation satellites includes a position of each of the global navigation satellites 110-1 to 110-$n$ (e.g., X, Y, and Z), a velocity of each of the global navigation satellites 110-1 to 110-$n$, satellite biases and a time (herein called the satellite clock). Satellite corrections generation system 130 then generates correction signals 132 (sometimes called aiding signals) that correct for orbital deviations of global navigation satellites 110-1 to 110 N. Note that errors in predicted orbits and clocks of global navigation satellites 110-1 to 110-$n$ are referred to herein as orbital deviations in this specification. Satellite corrections generation system 130 sends correction signals 132 to navigation receivers 120 and reference receivers 140 via a communications network 152. Communications network 152 typically includes one or more communication satellites 160-1 to 160-P that transmit correction signals 132 to satellite navigation receivers 120 and reference receivers 140. In some embodiments, networks 150 and 152 overlap at least in part, and in some embodiments at least some reference receivers and/or navigation receivers receive correction signals 132 via network(s) 150. Satellite corrections generation system 130 is described in more detail below with respect to FIGS. 3A-3C and 4-6.

Communication network 150 can generally include any type of wired or wireless communication channel or network capable of coupling together computing nodes. This includes, but is not limited to, a local area network, a wide area network, or a combination of networks. In some embodiments, communication network 150 includes the Internet.

There are two types of GPS measurements (i.e., satellite navigation measurements) that are usually made (e.g., by satellite navigation receivers 120 and reference stations 140), pseudorange measurements (also called code measurements) and carrier phase measurements. Code measurements are unbiased but at meter level accuracy, while carrier phase measurements have cm level accuracy but are biased with an unknown integer number of carrier phase cycles. This unknown integer number of carrier phase cycles is referred to as carrier phase ambiguity. The operations used to determine the state of a respective satellite navigation receiver 120 and the operations used to determine the state of the global navigation satellites 110-1 to 110-n based on these satellite navigation measurements are well-known in the art and therefore a detailed explanation of those operations is not provided in this specification.

Figure 2:
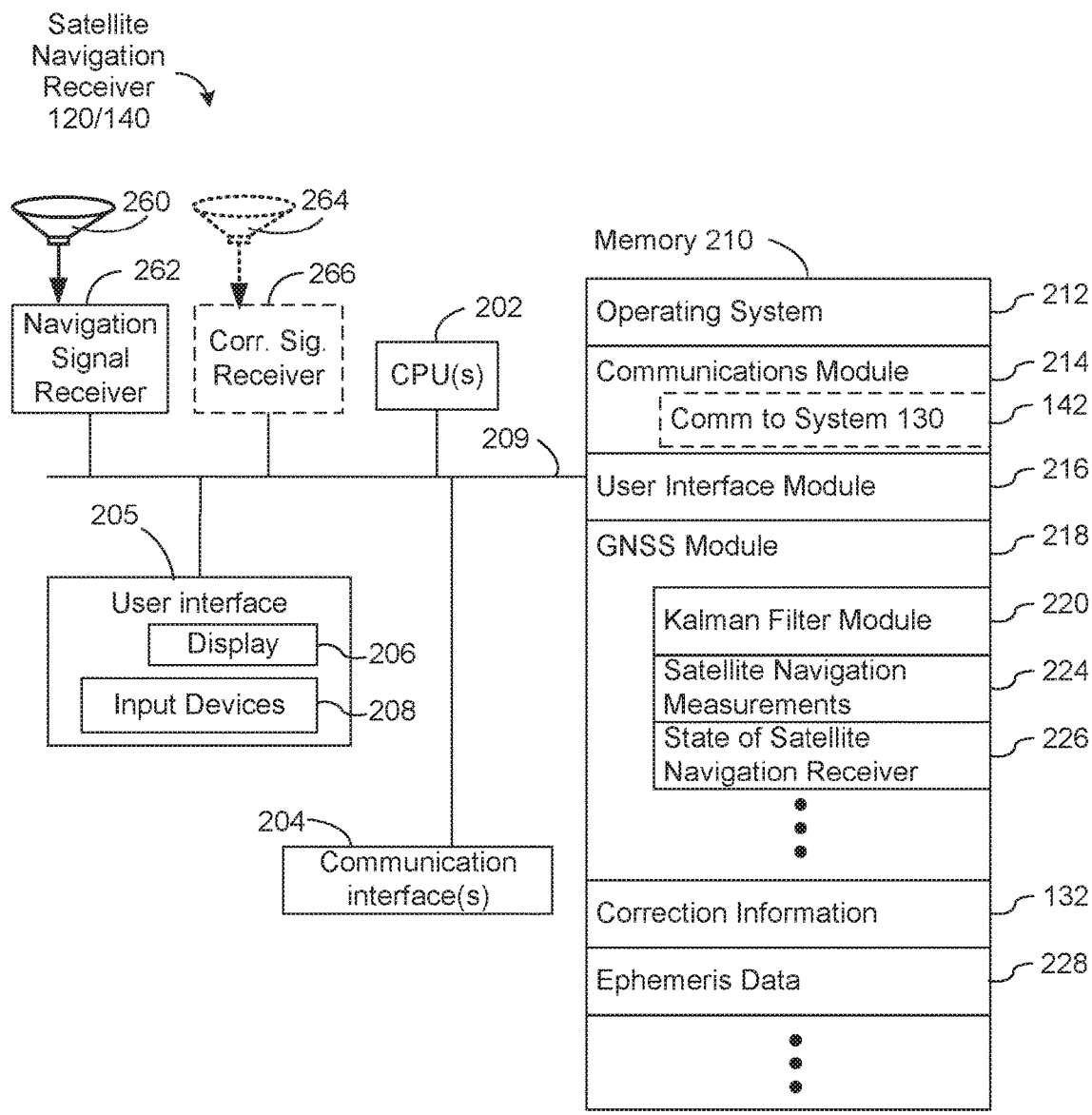
FIG. 2 is a block diagram illustrating a satellite navigation receiver, according to some embodiments.

FIG. 2 is a block diagram illustrating a respective navigation receiver 120, according to some embodiments. This block diagram also illustrates a respective reference receiver 140. Navigation receiver 120 typically includes one or more processing units (CPU's) 202, one or more network or other communications interfaces 204, memory 210, and one or more communication buses 209 for interconnecting these components. The communication buses 209 may include circuitry (sometimes called a chipset) that interconnects and controls communications between system components. Navigation receiver 120 optionally includes a user interface 205 comprising a display device 206 (which optionally includes a touch screen) and one or more input devices 208 (e.g., one or more of a keyboard, mouse, touch pad, keypad, etc.). Navigation receiver 120 also includes one or more GNSS antennas 260 configured to receive signals transmitted by the subset of the global navigation satellites 110-1 to 110-n in view of the GNSS antenna(s) 260, and a satellite signal receiver 262, which typically includes analog signal processing circuitry and a digital signal processor, to determine code measurements and phase measurements for signals received from the global navigation satellites GNSS satellites in view of antenna(s) 260.

Navigation receiver 120 also receives satellite correction information for the plurality of satellites. The correction information is typically broadcast by one or more satellites 160 (FIG. 1) distinct from the GNSS satellites 110, and in some embodiments the satellite correction information is received by navigation receiver 120 using an antenna 264 and signal receiver 266 (see FIG. 2) distinct from antenna 260 and receiver 262 used to receive the satellite navigation signals. However, in some embodiments, the same antenna and receiver are used to receive both satellite navigation signals and satellite correction information.

Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 optionally includes one or more storage devices remotely located from the CPU(s) 202. Memory 210, or alternately the non-volatile memory device(s) within memory 210, comprises a non-transitory computer readable storage medium. In some embodiments, memory 210 or the computer readable storage medium of memory 210 stores the following programs, modules and data structures, or a subset thereof:

an operating system 212 that includes procedures for handling various basic system services and for performing hardware dependent tasks;

a communication module 214 that is used for connecting navigation receiver 120 to other computer systems via the one or more communication interfaces 204 and one or more communication networks (wired or wireless), such as the Internet, other wide area networks, local area networks, metropolitan area networks, and so on;

an optional user interface module 216 that receives commands from a user via input devices 208 and generates a user interface displayed on display device 206;

a GNSS module 218 that receives and processes signals from a subset of the global navigation satellites 110-1 to 110-n via one or more GNSS antennas 260 and navigation signal receiver 262; the GNSS module 218 typically includes a Kalman filter module 220 configured to estimate a state 226 of navigation receiver 120 based on satellite navigation measurements 224 obtained from signals received from the global navigation satellites 110 in view of the receiver's GNSS antenna 260, and also based on navigation satellite correction information 132;

ephemeris data 228, which includes a set of parameters used by the receiver 120 to predict orbits and clocks of the global navigation satellites; and correction information 132 (e.g., navigation satellite correction information received from a service that provides GNSS correction information, as represented by satellite corrections generation system 130 in FIG. 1) for global navigation satellites 110-1 to 110-n; more information on the correction information 132, and in particular satellite wide-lane bias values, satellite narrow-lane bias values, satellite orbit corrections, low latency clock corrections, and quality information, is provided below.

In some embodiments, the correction signals 132 include corrections not only for errors in the predicted orbits (e.g., orbital position and velocity) and clocks of the satellites, but also for corrections to compensate for tropospheric effects and ionospheric effects, satellite wide-lane and narrow-lane phase biases. In each respective reference receiver 140, the communication module 214 includes instructions 142 for sending the measurements made by the respective reference receiver 140 to the satellite corrections generation system 130, via the one or more communication interfaces 204 and communication network 150. Reference stations 140 typically have a more substantial housing than navigation receivers, typically a building or other durable structure that is durably positioned at a known location.

Each of the above identified elements may be stored in one or more of the previously mentioned memory devices, and corresponds to a set of instructions for performing a function described above. The set of instructions can be executed by one or more processors (e.g., CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a "satellite navigation receiver," FIG. 2 is intended more as functional description of the various features which may be present in a satellite navigation receiver than as a structural schematic of the embodiments described herein. In practice, and as recognized by those of ordinary skill in the art, items shown separately could be combined and some items could be separated.

In some embodiments, each of the reference stations 140-1 to 140-M includes a satellite navigation receiver that includes components and modules as described with respect to FIG. 2.

Figure 3A:
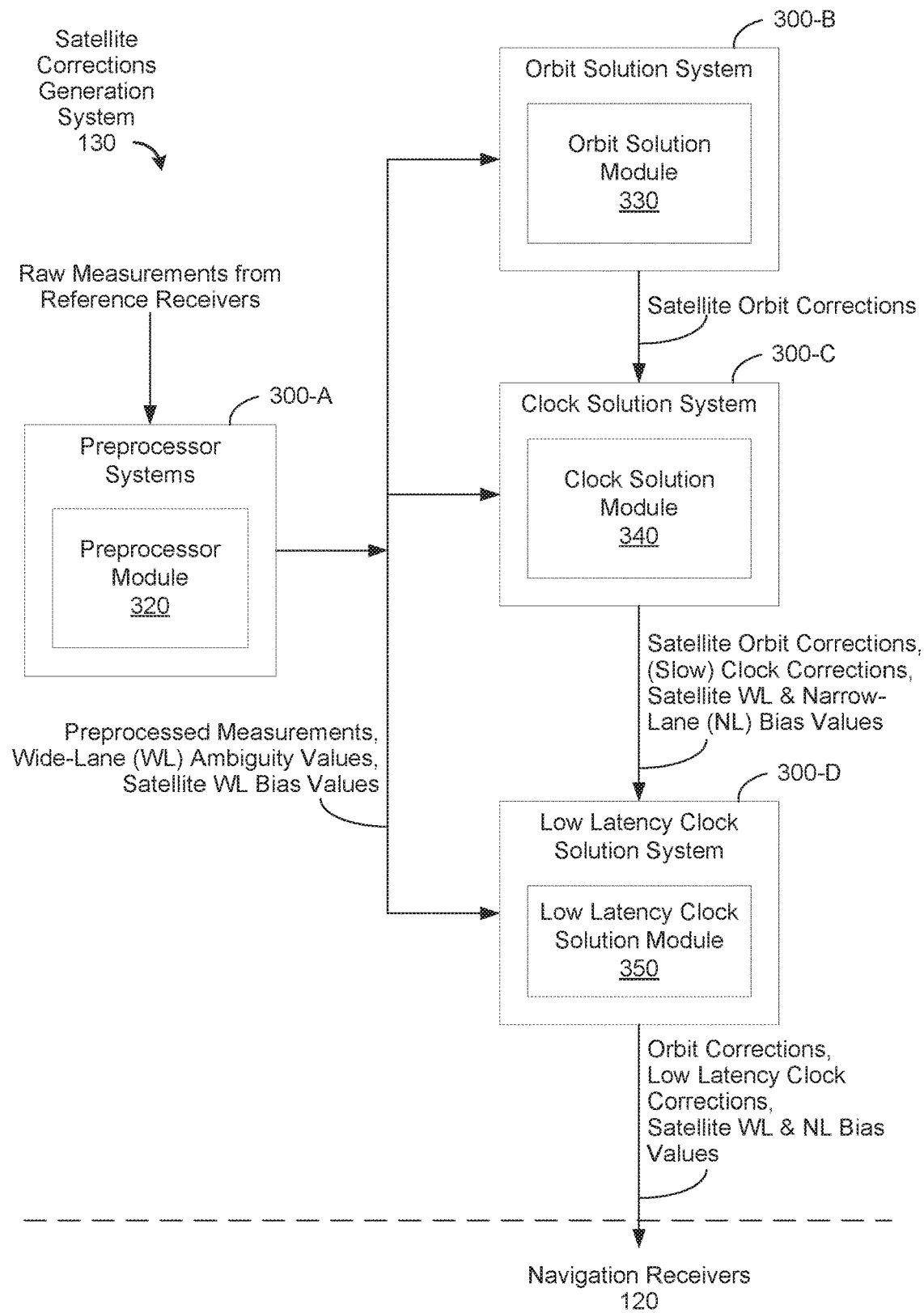
FIG. 3A is a block diagram of a navigation satellite corrections generation system, which optionally includes multiple interconnected computer systems, according to some embodiments.

FIG. 3A is a block diagram illustrating the overall system architecture of satellite corrections generation system 130, according to some embodiments. In some embodiments, satellite corrections generation system 130 includes one or more (and typically several) preprocessor systems 300-A, an orbit solution system 300-B, a clock solution system 300-C and a low latency clock solution system 300-D. Each of these systems has a corresponding computational module, herein called preprocessor module 320, orbit solution module 330, clock solution module 340 and low latency clock solution module 350. The overall architecture of system 300 is explained herein with respect to FIG. 3A, and certain general or architectural aspects of systems 300-A, 300-B, and 300-C are explained with respect to FIGS. 3B and 3C. More detailed explanations of the operation of systems 300-A, 300-B, 300-C and 300-D are provided below with reference to FIGS. 4-7.

Each of the preprocessor systems 300-A receives, from a subset of the reference receivers 140, "raw" measurements of satellite navigation signals, including code measurements (represented by the symbol P in the more detailed explanations provided below) and carrier phase measurements (represented by the symbol Φ in the more detailed explanations provided below), and performs initial processing operations on those measurements. In particular, each preprocessor system 300-A filters the received measurements of satellite navigation signals to remove or reduce the impact of noisy data thereby generated "cleaned" or filtered measurements. Each preprocessor system 300-A also generates double-difference (DD) and single-difference (SD) navigation solutions for refraction corrected wide-lane (WL) signals (as explained in more detail below), thereby generating fixed wide-lane DD and SD wide-lane ambiguities. Furthermore, using at least SD floating wide-lane ambiguities, the preprocessor systems 300-A collectively determine a satellite wide-lane bias value, $b_{WL}^s$, for each satellite s of the n satellites 110-1 to 110-n. A more detailed explanation of how the satellite wide-lane bias value are determined and updated is provided below. In addition, it is noted that the terms "float" and "floating" are used interchangeably in this document with respect to ambiguities that have not yet been fixed.

The orbit solution system 300-B receives from preprocessor systems 300-A, at predefined intervals (e.g., every second), cleaned measurements from each reference site, a fixed wide-lane ambiguity and a satellite wide-lane bias value, $b_{WL}^s$, for each satellite s of the n satellites 110-1 to 110-n. The orbit solution system 300-B combines all satellite WL biases across all the sites from preprocessor systems 300-A and generates a unified set of global wide-lane bias corrections. The orbit system 300-B adjusts the WL fixed ambiguity value for a respective reference receiver 140 (reference site) by an integer cycle if there is an integer cycle WL bias change between the unified WL bias and the individual WL bias for the respective reference receiver. The orbit solution system 300-B has an orbit solution module 330 that processes the received measurements at first fixed intervals, such as 300 seconds, to produce orbit corrections (e.g., corrections to satellite positions, as represented by the satellite-broadcast ephemeris, and which are therefore sometimes called corrections to the satellite-broadcast ephemeris), which are provided to clock solution system 300-C. A more detailed explanation of orbit solution system 300-B is provided below.

The clock solution system 300-C receives orbit corrections from orbit solution system 300-B, and receives from preprocessor systems 300-A cleaned measurements, a fixed wide-lane ambiguity value and a satellite wide-lane bias value, $b_{WL}^s$, for each satellite s of the n satellites 110-1 to 110-n. Similar to orbit solution system 300-B, the clock solution system 300-C combines all satellite WL biases across all the reference sites from preprocessor systems 300-A and generates a unified set of global wide-lane bias corrections. The clock system 300-C adjusts the WL fixed ambiguity value for a respective reference receiver 140 (reference site) by an integer cycle if there is an integer cycle WL bias change between the unified WL bias and the individual WL bias for the respective reference receiver. The clock solution system 300-C has a clock solution module 302-C that processes the received measurements, orbit corrections and wide-lane ambiguities at second fixed intervals, such as 30 seconds or 60 seconds, to produce clock corrections (e.g., corrections to satellite broadcast clocks), which are provided to low latency clock solution system 300-D. In addition, clock solution module 302-C also generates double-difference (DD) and single-difference (SD) navigation solutions for refraction corrected narrow-lane (NL) signals (as explained in more detail below), thereby generating fixed DD and SD narrow-lane ambiguities. Furthermore, using at least SD floating narrow-lane ambiguities, clock solution module 302-C determines a satellite narrow-lane bias value, $b_{NL}^s$, for each satellite s of the n satellites 110-1 to 110-n. A more detailed explanation of clock solution system 300-C, including how the satellite narrow-lane bias values are determined and updated, is provided below.

Finally, low latency clock solution system 300-D receives, from preprocessor systems 300-A, cleaned carrier phase measurements for each satellite s of the n satellites 110-1 to 110-n, and processes those carrier phase measurements to generate estimated satellite clock changes from epoch to epoch of the preprocessor systems 300-A (e.g., at one second intervals). The satellite clock changes are integrated with the clock corrections (sometimes called the clock solution or slow clock solution) produced by clock solution system 300-C to generate updated clock corrections for each of the satellites at predefined intervals (e.g., new, updated clock corrections are produced once per second). In some embodiments, low latency clock solution system 300-D also receives satellite correction information produced by the other systems, 300-A, 300-B and 300-C, and generates sets of navigation satellite corrections for the n satellites, for transmission to navigation receivers via network 152 (FIG. 1), for use in determining locations of the navigation receivers.

Figure 3B:
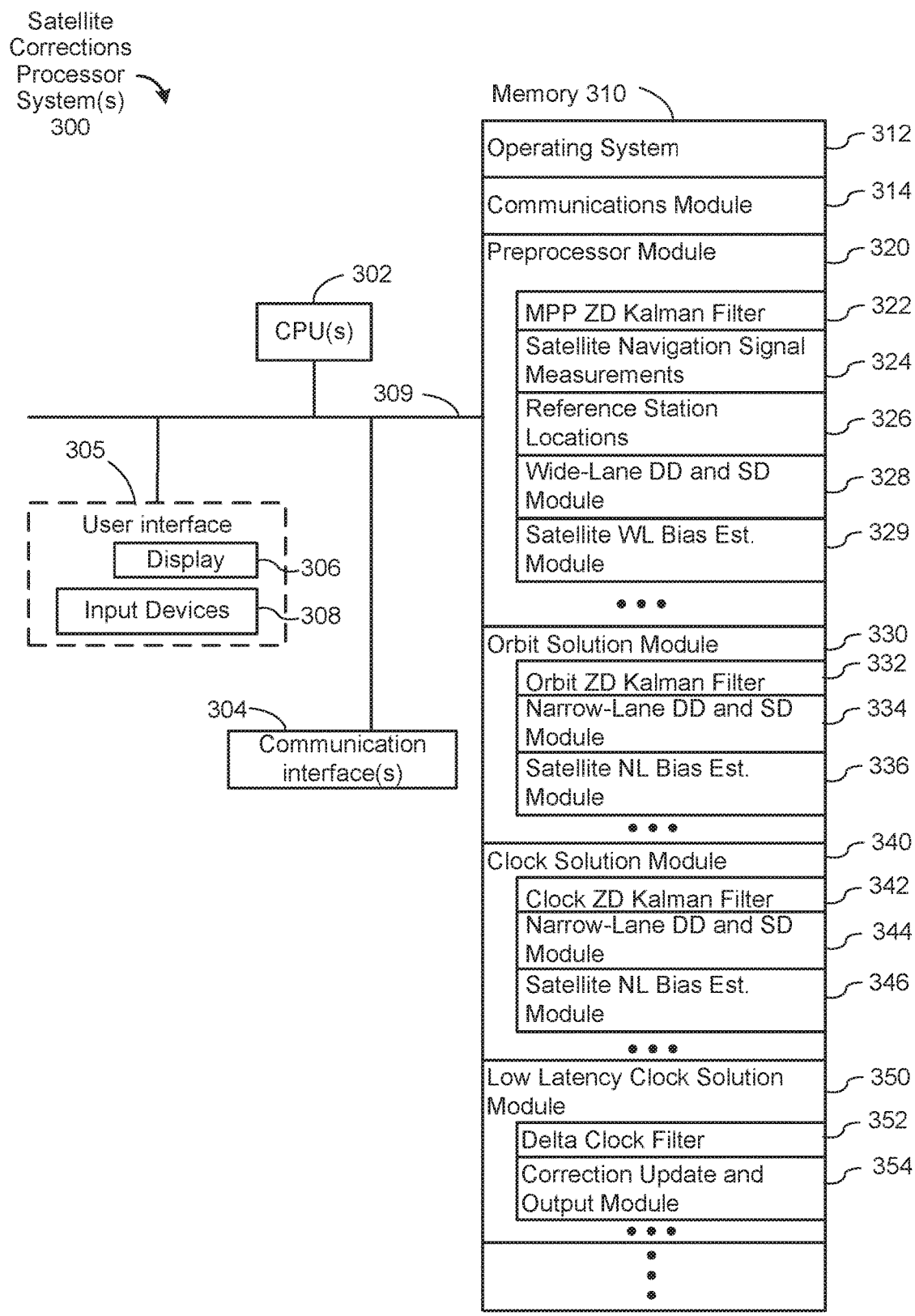
FIG. 3B is block diagram of a satellite corrections processor system, according to some embodiments.

FIG. 3B is block diagram of a satellite corrections processor system 300, corresponding to any one of systems 300-A, 300-B, 300-C or 300-D in FIG. 3A, according to some embodiments. System 300 typically includes one or more processing units (CPU's) 302, one or more network or other communications interfaces 304, memory 310, and one or more communication buses 309 for interconnecting these components. Communication interfaces 304 optionally include an interface to one or more transmitters 360 (sometimes called correction information transmitters) for transmitting correction information (e.g., orbit corrections, clock corrections, satellite bias values and the like) to the one or more communication satellites 160, which in turn transmit correction signals 132 to satellite navigation receivers 120 and reference receivers 140. Satellite corrections processor system 300 optionally includes one or more transmitters (not shown) for transmitting correction information to the one or more communication satellites 160. The communication buses 309 may include circuitry (sometimes called a chipset) that interconnects and controls communications between system components. System 300 optionally includes (but typically does not include) a user interface 305 comprising a display device 306 (which optionally includes a touch screen) and one or more input devices 308 (e.g., one or more of a keyboard, mouse, touch pad, keypad, etc.).

Memory 310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 optionally includes one or more storage devices remotely located from the CPU(s) 302. Memory 310, or alternately the non-volatile memory device(s) within memory 310, comprises a non-transitory computer readable storage medium. In some embodiments, memory 310 or the computer readable storage medium of memory 310 stores the following programs, modules and data structures, or a subset thereof:

an operating system 312 that includes procedures for handling various basic system services and for performing hardware dependent tasks;

a communication module 314 that is used for connecting system 300 to other computer systems via the one or more communication interfaces 304 and one or more communication networks (wired or wireless), such as the Internet, other wide area networks, local area networks, metropolitan area networks, and so on; and at least one of the following modules: preprocessor module 320, orbit solution module 330, clock solution module 340 or low latency clock solution module 350.

Each of preprocessor module 320, orbit solution module 330, and clock solution module 340 includes a corresponding zero difference (ZD) filter 322, 332 and 342, which is a Kalman filter for updating undifferenced (and thus, called, zero difference) ambiguity state variable estimates, satellite wide-lane and narrow-lane biases, as well as other state variables of the Kalman filter. Preprocessor module 320 receives and at least temporarily stores satellite navigation signal measurements 324, and has a database of reference station (also called reference receiver) locations 326, which are surveyed locations known with high precision (e.g., known with centimeter accuracy) of the reference stations. The Melbourne-Wübbena measurements are sequentially processed site by site. The integer constraints of wide-lane double-difference and wide-lane single-difference ambiguities in sub-modules 328 are used to generate wide-lane navigation solutions including wide-lane satellite biases and DD and SD wide-lane fixed integer ambiguity values. A satellite WL bias estimation module 329 determines a satellite wide-lane bias value, $b_{WL}^s$, for each satellite s of the n satellites, in accordance with fractional portions of single-difference wide-lane floating ambiguities determined by the wide-lane double-difference or wide-lane single-difference sub-modules 328.

Orbit solution module 330, the primary purpose of which is to determine orbit corrections, processes refraction-corrected code and carrier phase measurements using narrow-lane double-difference and narrow-lane single-difference sub-modules 334, to resolve narrow-lane double-difference and single-difference ambiguities. Optionally, orbit solution module 330 includes a satellite NL bias estimation module 336 that determines a satellite narrow-lane bias value, $b_{NL}^s$, for each satellite s of the n satellites, which facilitates resolution of the narrow-lane single-difference ambiguities. The orbit solution ZD Kalman filter 332 has state variables that include satellite states (e.g., position, velocity, clock, clock rate, solar radiation parameters, yaw bias, satellite narrow-lane bias value, $b_{NL}^s$, etc.), reference sites states (e.g., receiver clock, troposphere bias and gradients, ambiguity values, etc.) and some common states (e.g., earth rotation parameters). The orbit solution ZD Kalman filter 332, constrained by fixed DD and SD integer ambiguity values, updates the satellite positions, and thereby generates orbit corrections for the satellites. Due to the complexity of the computations, in order to generate accurate orbit corrections, orbit solution module 330 typically integrates its inputs over a relatively long period of time, such as five minutes, but still generates (i.e., predicts) new orbit corrections at a relatively rapid update rate, such as once per second.

Clock solution module 340 also includes narrow-lane double-difference and narrow-lane single-difference sub-modules 344, to resolve narrow-lane double-difference and single-difference ambiguities, but in this case those solutions take into account the orbit corrections determined by orbit solution module 330. Clock solution module 340 further includes a satellite NL bias estimation module 346 that determines a satellite narrow-lane bias value, $b_{NL}^s$, for each satellites of then satellites. The satellite narrow-lane bias values generated by satellite NL bias estimation module 346 take into account the orbit corrections determined by orbit solution module 330. The clock solution ZD Kalman filter 342 has state variables that include satellite states (e.g., clock, clock rate, yaw bias, the satellite narrow-lane bias value, $b_{NL}^s$, etc.) and reference sites states (e.g., receiver clock, troposphere bias and gradients, ambiguities, etc.). The clock solution ZD Kalman filter 342, constrained by fixed DD and SD integer ambiguity values, updates the satellite clocks, and thereby generates clock corrections for the satellites. Due to the complexity of the computations, and in order to generate accurate clock corrections, clock solution module 340 typically integrated its inputs over a moderately long period of time, such as 30 to 60 seconds, and thus generates new clock corrections (and updated satellite narrow-lane bias values) at a moderate update rate (e.g., once each 30 to 60 seconds).

Low latency clock solution module 350 includes a delta clock filter 352, which receives, from preprocessor systems 300-A, cleaned carrier phase measurements for each satellite s of the n satellites 110-1 to 110-*n*, and processes those carrier phase measurements to generate estimated satellite clock changes at predefined intervals (e.g., one second intervals). In some embodiments, low latency clock solution module 350 integrates the satellite clock changes with the clock corrections (sometimes called the clock solution or slow clock solution) produced by clock solution module 340 to generate updated clock corrections for each of the satellites at a predefined rate or at predefined intervals (e.g., new, updated clock corrections are produced once per second). Furthermore, in some embodiments, low latency clock solution module 350 also includes a correction update and output module 354 that receives satellite correction information produced by the modules 320, 330, and 340, and generates sets of navigation satellite corrections for the n satellites, for transmission to navigation receivers via network 152 (FIG. 1), for use in determining locations of the navigation receivers.

Figure 3C:
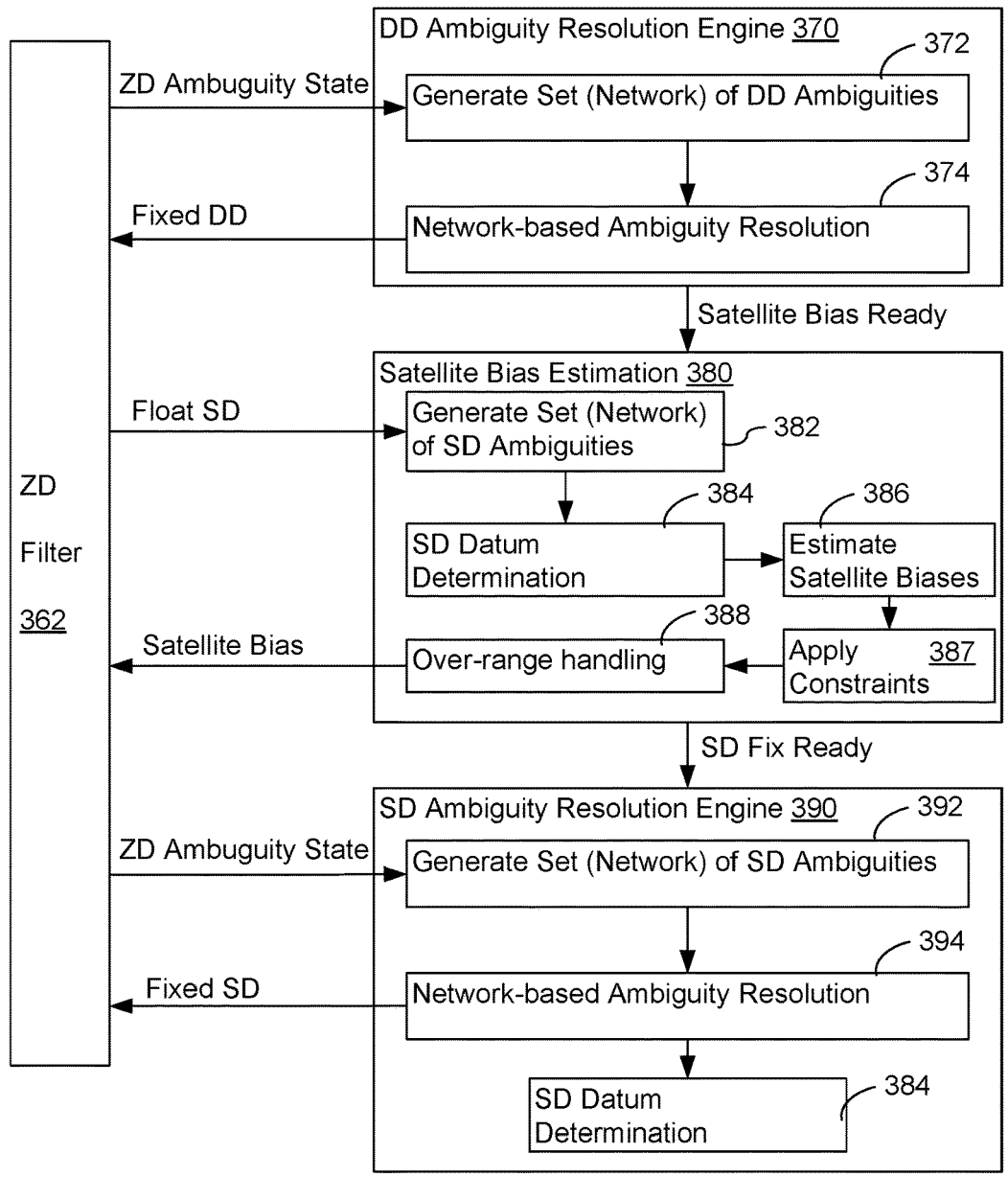
FIG. 3C is a block diagram of the preprocessor, orbit solution and clock solution modules shown in FIG. 3B, according to some embodiments.

FIG. 3C is a block diagram of the preprocessor, orbit solution and clock solution modules 320, 330 and 340 shown in FIG. 3B, according to some embodiments. Each of these modules include a zero difference Kalman filter 362 that generates and updates a zero difference ambiguity state and other state variables (described in more detail below), a double-difference ambiguity resolution engine 370, a satellite bias estimate module 380, and a single-difference ambiguity resolution engine 390. It is noted that in preprocessor module 320, the ambiguities being resolved and the satellite bias values being determined are wide-lane ambiguities and satellite bias values, while in the orbit solution module 330 and clock solution module 340, the ambiguities being resolved and the satellite bias values being determined are narrow-lane ambiguities and satellite bias values.

The double-difference ambiguity resolution engine 370 determines a set of double-difference ambiguities based on ambiguity state variable estimates received from the zero difference Kalman filter 362, determines which of the double-difference ambiguities are ready for resolution in accordance with predefined criteria, and performs a network-based ambiguity resolution process, which determines double-difference fixed ambiguity values.

It is noted that since the satellites are in flight, in orbit, the distance between each reference station and the satellites in view is constantly changing. As a result, the ambiguity state output by the ZD filter 362 is being updated each measurement epoch (e.g., once per second), and the double-difference fixed ambiguity values are also being updated each epoch. Thus the double-difference fixed ambiguity values, each based on a combination of four float ambiguities, are "fixed" in that they have integer values, or an integer property, but the four float ambiguities are not constant due to slowly changing receiver phase bias, and instead are updated at the update rate or epoch rate of the module 330, 340 or 350. As explained in more detail below, the various module each have their own epoch rate. Similarly, the single-difference fixed ambiguity values generated by the single-difference ambiguity resolution engine 390 are updated each epoch. Furthermore, as the sets of satellites in view of the various reference stations change, due to movement of the satellites along their respective orbits, in some embodiments the SD datum, discussed below, is updated, and as needed, new satellite bias estimates are generated and provided to the ZD filter 362. Thus, the computation processes performed by each of the modules are dynamic processes, with the ZD Kalman filter states generated by the ZD Kalman filter 362 of each module 330, 340, 350 being updated once per epoch, and the external "filters" or "engines" 370, 380 and 390, also producing updated solutions to support the operation of the ZD Kalman filter 362.

The satellite bias estimate module 380 is invoked, to determine initial satellite bias values, once a sufficient quantity (e.g., at least half) of the double-difference ambiguities have been resolved (i.e., fixed DD ambiguities have been determined). Using a process described in more detail below, the fixed DD ambiguities are used to estimate (i.e., determine) an initial satellite bias value for each satellite. Once the initial satellite bias value for each satellite has been estimated, the satellite bias values can be separated from the float DD ambiguities, which facilitates resolution of the double-difference ambiguities in subsequence computations (both by the satellite corrections generation system 130, and by navigation receivers 120). Furthermore, once the initial satellite bias values have been determined by satellite bias estimation module 380, the initial satellite bias values are updated by the ZD filter 362 at a predefined rate, for example once per epoch or once per P epochs, where P is an integer greater than one, depending on the implementation. If SD fix is ready for a given satellite, SD ambiguity constraints in SD resolution engine 390 are applied to improve satellite bias values and other state estimation in the ZD filter 362 for that satellite. In some embodiments, satellite wide-lane bias values are updated at a rate of once per minute (i.e., at the update rate of the preprocessor module 320), and satellite narrow-lane bias values are updated at a rate of once per 30 seconds (i.e., at the update rate of the clock solution module 340), but other update rates may be used in other embodiments. Satellite bias estimate module 380 is discussed in further detail below.

In some embodiments, single-difference ambiguity resolution engine 390 is invoked after the satellite bias estimation module 380 has generated a set of initial satellite bias values that satisfy predefined constraints (387) and which have been adjusted (388), as needed, to maintain the satellite bias values within a predefined range of values.

The single-difference ambiguity resolution engine 390 determines a set of single-difference ambiguities based on ambiguity state variable estimates received from the zero difference Kalman filter 362, which in turn have been adjusted based on the fixed double-difference ambiguities determined by the double-difference ambiguity resolution engine 370. Using the determined set of single-difference ambiguities, the single-difference ambiguity resolution engine 390 determines which of the single-difference ambiguities are ready for resolution in accordance with predefined criteria, and performs a network-based ambiguity resolution process, which determines single-difference fixed ambiguity values. It is noted that once an initial set of single-difference fixed ambiguity values have been determined and provided to ZD filter 362, single-difference ambiguity resolution engine 390 updates the set of single-difference fixed ambiguity values in accordance with changes in the zero-difference ambiguity state, as received from the ZD filter 362.

Notation

In the explanations that following the following symbols and notation conventions are used.

General Notation

P is code measurement from satellite to receiver in meter;

$\Phi$ is phase measurement from satellite to receiver in cycle;

B is code bias due to satellite hardware delay and receiver related delay b is phase bias due to satellite hardware delay, receiver related delay and un-modeled satellite phase wind-up errors $b_{IFB}$ is the linear Inter-Frequency code bias, which is only applicable to frequency division multiple access (FDMA) signal, e.g., GLONASS N is the integer ambiguity f is the GNSS carrier signal frequency $\lambda$ is the GNSS carrier signal wavelength Frequency Notation Subscripts denote the applicable frequency associated with a quantity as follows:

$[\ ]_{L1}$ refers to L1 frequency, $[\ ]_{L2}$ refers to L2 frequency, $[\ ]_{WL}$ refers to wide-lane, $L_1 - L_2$, $[\ ]_{NL}$ refers to narrow-lane, $L_1 + L_2$.

Receiver Notation

Subscripts that include the lower case letter r denote quantities associated with a particular receiver (e.g., a reference receiver) as follows:

$[\ ]_{r_1}$ refers to receiver $r_1$, $[\ ]_{r_2}$ refers to receiver $r_2$.

Satellite Notation

Superscripts that include the lower case letter s denote quantities associated with a particular satellite as follows:

$[\ ]^{S_1}$ refers to satellite, $S_1$, $[\ ]^{S_2}$ refers to satellite $S_2$.

Differential Notation $\Delta[\ ]_{r_1 r_2}$ refers to single difference between receiver $r_1$ and $r_2$, $\nabla[\ ]^{S_1-S_2}$ refers to single difference between satellite $S_1$ and $S_2$, $\nabla\Delta[\ ]_{r_1 r_2}^{S_1-S_2}$ refers to double difference between receiver $r_1$ and $r_2$, and satellite $S_1$ and $S_2$.

Ambiguity Notation

The ambiguity scalar or vector form notation follows $\hat{N}$ refers to the float ambiguity (sometimes called floating ambiguities), $\lfloor \hat{N} \rfloor$ refers to the fractional part of the float ambiguity, round($\hat{N}$) refers to the round off integer part of the float ambiguity, N refers to the fixed integer ambiguity.

The ambiguities are often organized in a vector form. The ambiguity vector notation form is as follows:

$\hat{N}_{float}$ refers to the float ambiguity vector $\hat{N}_{float} = \{\hat{N}_1, \ldots, \hat{N}_j, \ldots, \hat{N}_n\}$, where $\hat{N}_j$ is the $j^{th}$ float ambiguity element, $N_{fixed}$ refers to the fixed integer ambiguity vector $N_{fixed}\{N_1, \ldots, N_j, \ldots, N_n\}$, where $N_j$ is the $j^{th}$ fixed integer ambiguity element, $\overline{N}_i$ refers to the $i^{th}$ integer ambiguity candidate vector, as various ambiguity candidate vectors trials are made during the ambiguity search process, $\hat{N}^j$ refers to the partial float ambiguity vector with the $j^{th}$ ambiguity element or more $\hat{N}_j$ removed. For example, when the full ambiguity vector cannot be fixed, a partial fix is attempted by removing some ambiguity elements.

GLONASS Inter-Frequency Bias (IFB)

All signals transmitted by GLONASS satellites are derived from two fundamental frequencies, 1602 MHz for the L1 band, and 1246 MHz for the L2 band. Each GLONASS satellite s transmits a first satellite navigation signal with a center frequency $f_{L_1}^s$ in the L1 band of $$f_{L_1}^s = 1602 \text{ MHz} + n^s \times 0.5625 \text{ MHz} \quad (1)$$

and a second satellite navigation signal with a center frequency $f_{L_2}^s$ in the L2 band of $$f_{L_2}^s = 1246 \text{ MHz} + n^s \times 0.4375 \text{ MHz} \quad (2)$$

where $n^s$ is a frequency channel number assigned to satellite s, wherein the frequency channel number assigned to each satellite has an integer value between −7 and +6, inclusive.

The majority of GLONASS inter-frequency bias (IFB) in code measurements is assumed to be linear or sinusoidal functions with respect to the GLONASS satellite frequency number. The linear model is approximated as, $$IFB_r^s \approx k_r \cdot n^s \quad (3)$$

where $k_r$ is the IFB coefficient(s) for reference receiver r. The IFB varies from receiver to receiver, and also varies from one siting (e.g., antenna and cabling setup) to another siting. It should be noted that the inter-channel phase bias may exist between receivers with different manufacturers if differential operation between receivers is used. However, inter-channel phase bias can be ignored when the reference receivers are homogeneous. Returning to the discussion of inter-frequency bias (IFB), if, for example, $k_r$=0.1, the zero difference IFB can be as large as 0.7 cycle for wide-lane measurements for signals received from a satellite with frequency number −7, and furthermore, the single difference IFB can be as large as 1.3 cycles for a differential wide-lane measurement between signals received from two satellites with frequency numbers of −7 and 6, respectively.

Raw Measurements

The basic GNSS observables are the code and carrier phase measurements between a GNSS satellite s and a receiver r:

$$P_{r,L_1}^s = D_r^s + I_{r,L_1}^s + B_{r,L_1} - B_{L_1}^s + b_{IFB_{r,L_1}}^s + \varepsilon_{P_{r,L_1}^s} \quad (4)$$

$$\Phi_{r,L_1}^s \lambda_{L_1} = D_r^s + \delta_{pwu} \lambda_{L_1} - I_{r,L_1}^s + N_{r,L_1}^s \lambda_{L_1} + b_{r,L_1} - b_{L_1}^s + \varepsilon_{\Phi_{r,L_1}^s}$$

$$P_{r,L_2}^s = D_r^s + \frac{f_1^2}{f_2^2} I_{r,L_1}^s + B_{r,L_2} - B_{L_2}^s + b_{IFB_{r,L_2}}^s + \varepsilon_{P_{r,L_2}^s}$$

$$\Phi_{r,L_2}^s \lambda_{L_2} = D_r^s + \delta_{pwu} \lambda_{L_2} - \frac{f_1^2}{f_2^2} I_{r,L_1}^s + N_{r,L_2}^s \lambda_{L_2} + b_{r,L_2} - b_{L_2}^s + \varepsilon_{\Phi_{r,L_2}^s}$$

where

I is ionospheric delay error,

ε is measurement noise including any un-modeled multipath etc.

$D_r^s$, represents the common terms $$D_r^s = \rho_r^s + \tau_r - \tau^s + T_r^s + \delta_{pcv/pco} + \delta_{tides} + \delta_{rel} + \delta \text{shapiro} \quad (5)$$

where $\rho_r^s$ is the geometry distance from the receiver phase center to the satellite phase center;

$\tau_r$ is the receiver clock error;

$\tau^s$ is the satellite clock error;

$T_r^s$ is the tropospheric effect;

$\delta_{pcv/pco}$ is the antenna phase delay due to receiver phase center offset and variation, and satellite antenna phase center variation;

$\delta_{pwu}$ is the phase wind up due to relative changing orientation between satellite and receiver antennas;

$\delta_{tides}$ is the tidal effect including solid earth tide, ocean tides loading, polar tide loading, etc.;

$\delta_{rel}$ is relativistic effect on satellite clock; and $\delta_{shapiro}$ is relativistic effect on signal propagation, i.e., Shapiro delay.

The satellite-receiver geometric distance ρ is obtained by solving so-called light-time equation, for example the Equation shown below. The equation contains the satellite movement effect during signal propagation and the received time offset by the receiver clock bias. The satellite position is represented in inertial coordinates (ECI) and the station position is presented, in earth-center earth-fixed (ECEF) coordinates.

$$\rho = |r^s(t-\tau_r-\rho/c) + \delta_{apcs} - U(t-dt)^T(r_r + \delta_{sdisp})| \quad (6)$$

where $r^s(t)$ is satellite s position in ECI;

$r_r$ is the reference receiver site r position in ECEF;

U(t) is an ECI to ECEF transformation matrix;

$\delta_{apcs}$ is the satellite antenna offset between phase center and mass center;

$\delta_{sdisp}$ is the site displacement, including solid earth tide, ocean loading, etc.

Coordinates can be transformed between ECI and ECEF using the matrix U(t), which can be expressed as follows:

$$U(t) = R_y(-x_p)R_x(-y_p)R_z(GAST)N(t)P(t) \quad (7)$$

$$GAST = GMST + \Delta\psi \cos \varepsilon \quad (8)$$

$$GMST = GMST(0^hUT1) + r(t_{UTC} + (UT1-UTC)) \quad (9)$$

where $R_y, R_x, R_z$ are coordinate rotation matrix around x/y/z axis $x_p, y_p$ are polar motion offsets GAST is Greenwich Apparent Sidereal Time GMST is Greenwich Mean Sidereal Time N(t), P(t) are nutation and precession matrix Δψ, ε are nutation in longitude, obliquity r is ratio of universal to sidereal time UT1-UTC is earth rotation angle offset

Melbourne-Wübbena Wide-Lane Measurement

In order for satellite corrections generation system 130 to provide global differential corrections, ambiguities need be resolved across the global network of reference stations. Ambiguity resolution is typically divided into two steps. Wide-lane ambiguity is resolved first, followed by narrow-lane ambiguity resolution.

The Melbourne-Wübbena linear combination $L_{r,WL}{}^s$, a predefined linear combination of code and phase measurements of satellite navigation signals having two frequencies, can be used for wide-lane ambiguity resolution. Given the code and phase measurements from two frequencies, e.g., L1 and L2 for GPS, or G1 and G2 for GLONASS, the Melbourne-Wübbena linear combination $L_{WL}$ can be formed as below.

$$L_{r,WL}^s = \left( \frac{f_{L_1}}{f_{L_1}+f_{L_2}} P_{r,L_1}^s + \frac{f_{L_2}}{f_{L_1}+f_{L_2}} P_{r,L_2}^s \right) - \left( \frac{f_{L_1}}{f_{L_1}-f_{L_2}} \Phi_{r,L_1}^s \lambda_{L_1} - \frac{f_{L_2}}{f_{L_1}-f_{L_2}} \Phi_{r,L_2}^s \lambda_{L_2} \right) \quad (10)$$

By expanding the above equation it can be shown that the geometric range related term D and the phase wind-up term are cancelled, as shown in Equation:

$$L_{r,WL}{}^s = N_{r,WL}{}^s \lambda_{WL} + b_{r,WL} + b_{WL}{}^s + b_{IFBr,WL}{}^s + \varepsilon_{L_r,WL}{}^s \quad (11)$$

where $b_{IFBr,WL}{}^s$ is the wide-lane inter-frequency bias, which is only applicable to FDMA carrier signals, e.g., GLONASS satellite signals; there is no such item in the case of GPS, GALILEO, BEIDOU and QZSS satellite signals, $b_{r,WL}$ is receiver wide-lane bias (one per receiver and constellation for all visible satellites), which is a wide-lane combination of L1 and L2 receiver code bias and receiver carrier phase bias, as follows:

$$b_{r,WL} = \left( \frac{f_{L_1}}{f_{L_1}+f_{L_2}} B_{r,L_1} + \frac{f_{L_2}}{f_{L_1}+f_{L_2}} B_{r,L_2} \right) - \left( \frac{f_{L_1}}{f_{L_1}-f_{L_2}} b_{r,L_1} - \frac{f_{L_2}}{f_{L_1}-f_{L_2}} b_{r,L_2} \right) \quad (12)$$

$b_{WL}{}^s$ is satellite wide-lane bias (one per satellite for all receivers), which is a wide-lane combination of L1 and L2 satellite code bias and satellite phase bias, both satellite and receiver wide-lane biases are not constant over time.

$$b_{WL}^s = -\left( \frac{f_{L_1}}{f_{L_1}+f_{L_2}} B_{L_1}^s + \frac{f_{L_2}}{f_{L_1}+f_{L_2}} B_{L_2}^s \right) + \left( \frac{f_{L_1}}{f_{L_1}-f_{L_2}} b_{L_1}^s - \frac{f_{L_2}}{f_{L_1}-f_{L_2}} b_{L_2}^s \right) \quad (13)$$

$\lambda_{WL}$ is the wide-lane wavelength, about 86.4 cm for GPS, $$\lambda_{WL} = \frac{c}{f_{L_1}-f_{L_2}} \quad (14)$$

$N_{r,WL}{}^s$ is the integer wide-lane ambiguity $$N_{r,WL}{}^s = (N_{r,L_1}{}^s - N_{r,L_2}{}^s) \quad (15)$$

According to Equation (3), the wide-lane IFB $b_{IFBr,WL}{}^s$ can be modelled as $$b_{IFBr,WL}^s \approx k_{r,WL} \cdot n^s \quad (16)$$

where $k_{r,WL}$ is the GLONASS wide-lane IFB linear frequency coefficient and is unique for each individual receiver and site.

Equation 11 can be re-written as $$L_{r,WL}{}^s = N_{r,WL}{}^s \lambda_{WL} + b_{r,WL} + b_{WL}{}^s + k_{r,WL} \cdot n^s + \varepsilon_{L_r,WL}{}^s \quad (17)$$

For the FDMA GLONASS constellation of satellites, this additional wide-lane IFB linear frequency coefficient needs to be estimated for each receiver.

For simplicity, the abbreviation WL will sometimes be used herein to mean wide-lane measurements, ambiguities and the like, and the Melbourne-Wübbena linear combination will be referred to herein as simply the WL measurement. The GLONASS WL IFB linear frequency coefficient will be referred as simply the IFB coefficient.

Refraction Corrected Narrow-Lane Measurements

Refraction corrected (RC) measurements are formed to eliminate first order ionospheric effects. The RC code measurement is formed as shown below, which has meter-level accuracy but is unbiased.

$$P_{r,RC}^s = \frac{f_{L_1}^2}{f_{L_1}^2 - f_{L_2}^2} P_{r,L_1}^s - \frac{f_{L_2}^2}{f_{L_1}^2 - f_{L_2}^2} P_{r,L_2}^s \quad (18)$$
$$= D_r^s + B_{r,NL} - B_{NL}^s + \varepsilon_{P_{r,RC}^s}$$

The RC carrier phase measurement is formed as shown below, which is in cm-level accuracy but is biased with an ambiguity term $\hat{N}_{r,NL}{}^s \lambda_{NL}$.

$$\Phi_{r,RC}^s \lambda_{NL} = \frac{f_{L_1}^2}{f_{L_1}^2 - f_{L_2}^2} \Phi_{r,L_1}^s \lambda_{L_1} - \frac{f_{L_2}^2}{f_{L_1}^2 - f_{L_2}^2} \Phi_{r,L_2}^s \lambda_{L_2} \quad (19)$$
$$= D_r^s + \delta_{pwu} \lambda_{NL} + AMB_{r,RC}^s + b_{r,NL} - b_{NL}^s + \varepsilon_{\Phi_{r,RC}^s}$$

where:

$B_{r,NL}$ is the receiver r narrow-lane code bias (one per receiver and constellation for all visible satellites), which is an RC combination of L1 receiver code bias and L2 receiver code bias. $B_{r,NL}$ is lumped into the receiver clock and will be estimated together as receiver clock nuisance parameters. In some embodiments, for simplicity, the bias $B_{r,NL}$ in Equation (18) can be ignored.

$B_{NL}{}^s$ is satellite s narrow-lane code bias (one per satellite for all receivers), which is a RC combination of L1 satellite code bias and L2 satellite code bias. $B_{NL}{}^s$ is lumped into satellite clock and will be estimated together as satellite clock corrections. In some embodiments, for simplicity, the bias $B_{NL}{}^s$ in equation (18) can be ignored.

$b_{r,NL}$ is the receiver r narrow-lane phase bias (one per receiver and constellation for all visible satellites), which is a RC combination of L1 receiver phase bias and L2 receiver phase bias. If $^B{}_{r,NL}$ is lumped into the ambiguity bias, $b_{r,NL}$ in Equation (19) can be ignored, but as a result, individual ambiguities do not have integer values (sometimes expressed as "no longer having the integer property"). However, single differenced ambiguities between satellites still keep as an integer (sometimes expressed as still having the integer property).

$b_{NL}{}^s$ is the satellite s narrow-lane phase bias (one per satellite for all receivers), which is an RC combination of L1 satellite phase bias and L2 satellite phase bias. Both satellite and receiver narrow-lane biases are not constant over time. The satellite s narrow-lane bias also represents the fractional part of the difference between a code-based clock and integer phase-based clock. If the $B_{NL}{}^s$ is lumped into the satellite clock, the $b_{NL}{}^{s\,L}$ in Equation (19) becomes the difference $b_{NL}{}^s$-$B_{NL}{}^s$.

$AMB_{r,RC}{}^s$ is the RC carrier phase ambiguity term, as below $$AMB_{r,RC}^s = \frac{f_{L_1}^2}{f_{L_1}^2 - f_{L_2}^2} N_{r,L_1}^s \lambda_{L_1} - \frac{f_{L_2}^2}{f_{L_1}^2 - f_{L_2}^2} N_{r,L_2}^s \lambda_{L_2} \quad (20)$$

$\lambda_{NL}$ is narrow-lane wavelength, about 10.7 cm for GPS, which is much smaller than WL wavelength $\lambda_{WL}$ $$\lambda_{NL} = \frac{c}{f_{L_1} + f_{L_2}} \quad (21)$$

The RC carrier phase ambiguity term $AMB_{r,RC}{}^s$ can be further divided into two integer ambiguity terms. There are three equivalent combination forms, as shown in Equation (22): 1) a combination of integer WL ambiguity $N_{r,WL}{}^s$ and integer NL ambiguity, $N_{r,NL}{}^s$ where $N_{r,NL}{}^s=(N_{r,L_1}{}^s+N_{r,L_2}{}^s)$; 2) a combination of integer WL ambiguity $N_{r,WL}{}^s$ and integer L1 carrier phase ambiguity $N_{r,L_1}{}^s$; and 3) a combination of integer WL ambiguity $N_{r,WL}{}^s$ and integer L2 carrier phase ambiguity $N_{r,L_2}{}^s$:

$$AMB_{r,RC}^s = = \frac{N_{r,WL}^s}{2}\lambda_{WL} + \frac{N_{r,NL}^s}{2}\lambda_{NL} \quad (22)$$

$$= \lambda_{NL}\left(N_{r,L_1}^s + \frac{f_{L_2}}{f_{L_1} - f_{L_2}} N_{r,WL}^s\right)$$

$$= \lambda_{NL}\left(N_{r,L_2}^s + \frac{f_{L_1}}{f_{L_1} - f_{L_2}} N_{r,WL}^s\right)$$

In some embodiments, the third combination shown above is used. Using that form, both the WL ambiguity integer $N_{r,WL}{}^s$ and L2 carrier phase ambiguity integer $N_{r,L_2}{}^s$ need to be resolved in order to remove the bias term from the RC carrier phase measurement. As long as the bias terms are removed from the RC phase measurements, the high accuracy carrier phase measurement can be used to provide centimeter-level positioning.

The narrow-lane (NL) wavelength is much smaller than the wide-lane (WL) wavelength. In the case of GPS, the NL wavelength is about 10.7 cm, while the WL wavelength is about 86.4 cm. Therefore, in comparison with $N_{r,L_2}{}^s$, the GPS WL ambiguity integer $N_{r,WL}{}^s$ can be resolved easily. Moreover, in order to recover the integer property of the L1 and L2 ambiguities, $N_{r,L_1}{}^s$ and $N_{r,L_2}{}^s$ (see ambiguity terms in equation 22), the WL ambiguity integer $N_{r,WL}{}^s$ is resolved first because the GPS WL ambiguity is much easier to resolve than the NL ambiguity.

When the WL ambiguity integer $N_{r,WL}{}^s$ has been resolved, using the ambiguity combination form shown in Equation (22), Equation (19) for a refraction-corrected narrow-lane measurement can be rewritten as:

$$\Phi_{r,RC}^s \lambda_{NL} - \frac{f_{L_1}}{f_{L_1} - f_{L_2}} N_{r,WL}^s \lambda_{NL} = \quad (23)$$

$$D_r^s + \delta_{pwu}\lambda_{NL} + N_{r,L_2}^s \lambda_{NL} + b_{r,NL} - b_{NL}^s + \varepsilon_{\Phi_{r,NL}^s}$$

For simplicity, the abbreviation NL will sometimes be used herein to mean narrow-lane measurements, ambiguities and the like. Since the RC measurements are formed to resolve NL ambiguity, the RC measurement is sometimes herein referred to as the NL measurement. Since the L2 carrier phase ambiguity $N_{r,L_2}{}^s$ cycle is measured in units of the NL wavelength, the L2 ambiguity $N_{r,L_2}{}^s$ is sometimes herein referred to as the NL ambiguity. It should be noted that the un-differenced (sometimes herein called the zero difference) ambiguity is not an integer if the receiver carrier phase bias $b_{r,NL}$ is lumped into the ambiguity term in order to reduce the number of estimated parameters to be resolved. However, single differenced ambiguities can still be estimated as integers.

Differential Wide-Lane and Narrow-Lane Ambiguities

Differential ambiguities are useful for determining navigation solutions because receiver bias and/or satellite bias terms are cancelled when using such differential ambiguities. There are two main forms of differential ambiguities: single difference (SD) and double difference (DD) ambiguities.

Single Difference Wide-Lane and Narrow-Lane Ambiguities

In the case that the difference of measurements is formed between a satellite pair $s_1$ and $s_2$ from the same constellation and tracked by the same receiver r, the common part of the receiver bias is removed when forming the difference value. The single difference (SD) WL measurement can be modelled as:

$$\nabla L_{r,WL}^{s_1 s_2} = L_{r,WL}^{s_1} - L_{r,WL}^{s_2} = N_{r,WL}^{s_1 s_2}\lambda_{WL} + (b_{WL}^{s_1} - b_{WL}^{s_2}) + k_{r,WL} \cdot (n^{s_1} - n^{s_2}) \quad (24)$$

The SD NL measurement can be modelled as $$\nabla \Phi_{r,RC}^{s_1 s_2} \lambda_{NL} = D_r^{s_1 s_2} + \left(N_{r,L_2}^{s_1 s_2} + \frac{f_{L_1}}{f_{L_1} - f_{L_2}} N_{r,WL}^{s_1 s_2}\right)\lambda_{NL} - (b_{NL}^{s_1} - b_{NL}^{s_2}) \quad (25)$$

In the case that SD measurements are formed between a receiver pair $r_1$ and $r_2$ tracking the same satellite, the common part of satellite bias $b^s$ can be removed.

Double Difference Wide-Lane and Narrow-Lane Ambiguities

By forming Double Difference (DD) measurements between a satellite pair $s_1$ and $s_2$, and a receiver pair $r_1$ and $r_2$, the remaining terms left are the DD integer ambiguity term, and the inter-frequency code bias when the satellite signals being processed are GLONASS WL signals. The DD operation cancels the receiver and satellite bias terms, but not the IFB term. The DD WL measurement can be modeled as $$\Delta\nabla L_{r_1 r_2, WL}^{s_1 s_2} = (L_{1,WL}^{s_1} - L_{1,WL}^{s_2}) - (L_{2,WL}^{s_1} - L_{2,WL}^{s_2}) = \quad (26)$$

$$N_{r_1 r_2, WL}^{s_1 s_2}\lambda_{WL} + (k_{r_1,WL} - k_{r_2,WL})\cdot(n^{s_1} - n^{s_2}) + \varepsilon_{\Delta\nabla L_{r_1 r_2,WL}^{s_1 s_2}}$$

The DD NL measurement can be modeled as $$\Delta\nabla\Phi_{r_1r_2,NL}^{s_1s_2} = \tag{27}$$
$$D_{r_1r_2}^{s_1s_2} + \left(N_{r_1r_2,L_2}^{s_1s_2} + \frac{f_{L_1}}{f_{L_1}-f_{L_2}}N_{r_1r_2,WL}^{s_1s_2}\right)\lambda_{NL} + \varepsilon_{\Delta\nabla\Phi_{r_1r_2,NL}^{s_1s_2}}$$

Ambiguity Search
Least-Squares AMBiguity Decorrelation Adjustment Method (LAMBDA)

Least-squares AMBiguity Decorrelation Adjustment method (LAMBDA) is a common technique used to search for the carrier phase ambiguity integer values. The inputs to the LAMBDA methods are:
  a set of float ambiguity estimates, $\hat{N}_{float} = \{\hat{N}_{r_1r_2}^{s_1s_2}\}$, and its associated variance co-variance $Q_{\hat{N}_{float}}$.

The ambiguity quadratic form R for the $i^{th}$ integer ambiguity candidate set is defined as $$R_i = (\overline{N}_i - \hat{N}_{float})^T Q_{\hat{N}_{float}}^{-1} (\overline{N}_i - \hat{N}_{float}) \tag{28}$$

where
  $\hat{N}_{float}$ is the float ambiguity set which is n by 1 vector, n is the vector size of float ambiguity set $\hat{N}_{float}$, each ambiguity element is a real number,
  $Q_{\hat{N}_{float}}$ is the variance co-variance matrix of $\hat{N}_{float}$, which is n by n matrix,
  $\overline{N}_i$ is the $i^{th}$ best integer ambiguity candidate set, which is n by 1 vector, each ambiguity element is an integer number,
  $R_i$ is the ambiguity quadratic form of $\overline{N}_i$, which is a scalar value.

All the integer ambiguity candidate sets $\overline{N}_i$ are sorted in terms of $R_i$ from smallest to largest. Accordingly, $\overline{N}_1$ has the smallest quadratic form $R_1$. As shown below by condition (29), the ratio between the smallest quadratic form $R_1$ and the second smallest $R_2$ is used as one criterion to determine whether to accept the best candidate set of ambiguity integer values.

$$R_2/R_1 > c \tag{29}$$

where c is an empirical threshold whose value depends on the number of ambiguities and the largest acceptable failure rate, as well as other factors.

If the condition (29) is satisfied, $\overline{N}_1$ is regarded as the resolved ambiguity integer set N.

Partial LAMBDA Search

If the condition (29) is not satisfied, for example because $R_1$ is significantly larger than would normally be expected, this indicates that one or more of the integer ambiguity candidate sets could be significantly biased from integer numbers. In some embodiments, in this case a partial fix procedure is used. As described in more detail below, one or more problematic/biased ambiguity elements are identified and removed before the partial ambiguity subset can be resolved. The resulting partial subset will have a smaller R and a larger ratio $R_2/R_1$. The partial search is an iterative process that is repeated until the partial ambiguity vector is resolved (e.g., by satisfying condition (29)), or the search fails for the current epoch and is resumed in the next epoch.

Preprocessor ZD Kalman Filter

The ZD Kalman filter 322 of the preprocessor module 320 uses the Melbourne-Wübbena linear combination $L_{r,WL}^s$, described above, for each satellite as the zero difference measurements that are filtered by the ZD Kalman filter 322. In some embodiments, for this ZD Kalman filter 322, the Melbourne-Wübbena linear combination $L_{r,WL}^s$, is modeled as:

$$L_{r,WL}^s = N_{r,WL}^s \lambda_{WL} + b_{r,WL} + b_{WL}^s + k_{r,WL} \cdot n^s \tag{30}$$

In some embodiments, the preprocessor ZD Kalman filter state variables are:
  One WL integer ambiguity per visible satellite and site pair, $N_{WL}$, and one receiver wide-lane bias per receiver $b_{r,WL}$, which are combined as one state variable as ZD float WL ambiguity $(AMB)_{r,WL}^s$. Its sensitivity coefficient is $\lambda_{WL}$.

$$(AMB)_{r,WL}^s = N_{r,WL}^s \lambda_{WL} + b_{r,WL} \tag{31}$$

One satellite wide-lane bias per satellite $b_{WL}^s$. Its sensitivity coefficient is 1.
  One GLONASS IFB WL coefficient per tracked site, $k_{r,WL}$. This state variable only exists for embodiments where the satellite signals are GLONASS satellite signals. Its sensitivity coefficient is the satellite frequency number $n^s$.

Wide-lane ambiguities are initially resolved by the preprocessor module 320 in DD and SD form. In these forms, the receiver WL bias $b_{r,WL}$ is cancelled, which reduces the number of parameters to be resolved. Before an initial wide-lane satellite bias is estimated or SD ambiguity is fixed, the SD float ambiguity contains both receiver and satellite wide-lane bias. Therefore, this combined float WL ambiguity term $\nabla\hat{N}_{r,WL}^{s_is_j}$ is in essence the SD WL ambiguity $\nabla N_{r,WL}^{s_is_j}$ plus satellite SD WL bias $\nabla b_{WL}^{s_is_j}$, which is why initial bias estimation is required in order to fix SD wide-lane ambiguity.

$$\nabla\hat{N}_{r,WL}^{s_is_j} = \hat{N}_{r,WL}^{s_i} - \hat{N}_{r,WL}^{s_j} \tag{32}$$
$$= (N_{r,WL}^{s_i}\lambda_{WL} + b_{r,WL} + b_{WL}^{s_i}) - (N_{r,WL}^{s_j}\lambda_{WL} + b_{r,WL} + b_{WL}^{s_j})$$
$$= (N_{r,WL}^{s_i} + N_{r,WL}^{s_j})\lambda_{WL} + b_{WL}^{s_i} - b_{WL}^{s_j}$$
$$= \nabla N_{r,WL}^{s_is_j}\lambda_{WL} + \nabla b_{WL}^{s_is_j}$$

Furthermore, the DD WL ambiguity $\Delta\nabla\hat{N}_{r_mr_n,WL}^{s_is_j}$ is in essence the DD WL ambiguity $\nabla N_{r_mr_n,WL}^{s_is_j}$.

$$\Delta\nabla\hat{N}_{r_mr_n,WL}^{s_is_j} = \nabla\hat{N}_{r_m,WL}^{s_is_j} - \nabla\hat{N}_{r_n,WL}^{s_is_j} \tag{33}$$
$$= \nabla N_{r_m,WL}^{s_is_j}\lambda_{WL} + \nabla b_{WL}^{s_is_j} - (\nabla N_{r_n,WL}^{s_is_j}\lambda_{WL} + \nabla b_{WL}^{s_is_j})$$
$$= (\nabla N_{r_m,WL}^{s_is_j} - \nabla N_{r_n,WL}^{s_is_j})\lambda_{WL}$$

In order to make the computation effective, the ZD Melbourne-Wübbena measurements for each reference receiver site are averaged over an interval such as 60 seconds, with well-known additional handling when there is a cycle slip. For each interval, averaged ZD Melbourne-Wübbena measurements are processed in the ZD Kalman filter 322 on a site-by-site basis.

In some embodiments, the same satellite corrections processor system processes signals from the satellites of more than one GNSS constellation (e.g., from the satellites of two or more of the following GNSS constellations: GPS, GLONASS, GALILEO, BEIDOU and QZSS), and in such embodiments the satellite corrections generation system 130 uses a separate wide-lane filter for each GNSS constellation for which signals are being processed. It is noted the reference receiver bias $b_{r,WL}$ is not used by the navigation receivers to determine their positions. Accordingly, in order to reduce filter size and computation complexity, the reference receiver WL bias is not explicitly estimated and instead it is combined into the ZD float ambiguity state. Given that the actual ZD float ambiguity state variable for each reference receiver is the sum of the ZD integer ambiguity and the receiver bias, the receiver bias variance covariance dynamic update is included as follows:

$$Q^n_{(AMB)^s_{r,WL}} = Q^{n-1}_{(AMB)^s_{r,WL}} + \begin{pmatrix} 1 & \cdots & 1 \\ \vdots & \ddots & \vdots \\ 1 & \cdots & 1 \end{pmatrix} q_{b_r,WL} \cdot \Delta t_{n-1,n} \quad (34)$$

where q is the process noise, and $\Delta t_{n-1,n}$ is the time interval between time $t_{n-1}$ and $t_n$.

The satellite WL bias and IFB variance covariance dynamic update are as follows:

$$Q_{b_{WL}^s}^n = Q_{b_{WL}^s}^{n-1} + q_{b_{WL}^s} \cdot \Delta t_{n-1,n}$$

$$Q_{k_{r,WL}}^n = Q_{k_{r,WL}}^{n-1} + q_{k_{r,WL}} \cdot \Delta t_{n-1,n} \quad (35)$$

Orbit Solution ZD Kalman Filter

The orbit solution module 330 processes measurements at a fixed interval, such as 300 seconds. Its products, which are estimated satellite positions and velocities, or equivalently, corrections to previously established (e.g., published) satellite positions and velocities, are provided to the clock solution module 340.

The orbit solution uses the refraction-corrected code and carrier phase measurement in Equations 18-19, above. The refraction-corrected code measurement can be modelled as $$P_{r,RC}^s = \rho_r^s + \tilde{\tau}_r - \tilde{\tau}^s + T_r^s + \delta_{pcv/pco} + \delta_{tides} + \delta_{rel} \quad (36)$$

The refraction-corrected carrier phase measurement can be modelled as $$\Phi_{r,RC}^s \lambda_{NL} = \rho_r^s + \tilde{\tau}_r - \tilde{\tau}^s + T_r^s + AMB_{r,RC}^s + b_{r,NL} - b_{NL}^s + \delta_{pcv/pco} + \delta_{tides} + \delta_{rel} + \delta_{pwu} \lambda_{NL} \quad (37)$$

where:

$\rho_r^s$ is the satellite true range, which can be further modelled as explained below. The satellite orbit position $[x^s \; y^s \; z^s]$, velocity and other parameters such as solar radiation pressure are to be estimated, the reference station coordinates are $[x_r \; y_r \; z_r]$, which are pre-surveyed as known coordinates or estimated as unknown parameters.

$$\rho_r^s = \sqrt{(x^s-x_r)^2+(y^s-y_r)^2+(z^s-z_r)^2} \quad (38)$$

$\tilde{\tau}_r$ is the receiver clock and bias term, which is the combination of receiver clock error $\tau_r$ and receiver code bias $B_{r,NL}$:

$$\tilde{\tau}_r = \tau_r + B_{r,NL} \quad (39)$$

The receiver clock and bias term for GLONASS satellite signal processing is further modelled as:

$$\tilde{\tau}_{r,GLN} = \tilde{\tau}_{r,GPS} + \Delta \tilde{\tau}_{r,GLN\_GPS} \quad (40)$$

where $\Delta \tilde{\tau}_{r,GLN\_GPS}$ is the difference of receiver clock and bias term between GPS and GLONASS.

$\tilde{\tau}^s$ is the satellite clock and bias term, which is the combination of satellite clock error $\tau^s$ and satellite code bias $B_{NL}^s$:

$$\tilde{\tau}^s = \tau^s + B_{NL}^s \quad (41)$$

$T_r^s$ is the tropospheric delay, and is divided into a dry component $T_{r,dry}^s$ and a wet component $T_{r,wet}^s$:

$$T_r^s = T_{r,dry}^s + T_{r,wet}^s \quad (42)$$

The dry component can be accurately pre-calculated. The remaining wet component, $T_{r,wet}^s$, can be further modelled as below, where $\Delta_{dry}M_{wet}$ is the wet mapping function, e is the elevation angle, and a is the azimuth, all of which can be calculated:

$$T_{r,wet}^s = M_{wet} \cdot Z_{wet} + M_{wet} ctg(e) \cos(a) \cdot G_{NS} + M_{wet} \, ctg(e) \sin(a) \cdot G_{EW} \quad (43)$$

In the above equation for the wet component, $T_{r,wet}^s$, there are three unknowns to solve: 1) the tropospheric zenith delay wet component $Z_{wet}$, 2) the tropospheric wet component horizontal gradient for the north-south direction $G_{NS}$, and 3) the tropospheric wet component horizontal gradient for the east-west direction $G_{EW}$.

Similar to the processing of WL measurements by the preprocessor module 320, in the orbit solution module, the reference receiver NL phase bias is not explicitly estimated, but instead is combined into the NL float ambiguity state. The ambiguity term and receiver narrow-lane phase bias per receiver, $b_{r,NL}$, are combined as one state in the RC float ambiguity term $(AMB)_{r,RC}^s$:

$$(AMB)_{r,RC}^s = AMB_{r,RC}^s + b_{r,NL} \quad (44)$$

From equation (22), $AMB_{r,RC}^s$ is a combination of WL and NL ambiguities, $\hat{N}_{r,WL}^s$ and $\hat{N}_{r,L_2}^s$, as follows:

$$AMB_{r,RC}^s = \lambda_{NL}\left[\hat{N}_{r,L_2}^s + \frac{f_1}{f_1-f_2}\hat{N}_{r,WL}^s\right].$$

In the case that the WL ambiguity has been resolved, for example by the preprocessor module 320, as would typically be the case for signal processing by the orbit solution module 330, the combined RC float ambiguity term $(AMB)_{r,RC}^s$ can be rewritten as $$(AMB)_{r,RC}^s = \lambda_{NL}\left[\hat{N}_{r,L_2}^s + \frac{f_1}{f_1-f_2}\hat{N}_{r,WL}^s\right] + b_{r,NL} \quad (45)$$

$$= [\hat{N}_{r,L_2}^s \lambda_{NL} + b_{r,NL}] + \frac{f_1}{f_1-f_2}\hat{N}_{r,WL}^s \lambda_{NL}$$

In the case that the SD WL ambiguity has already been resolved, as would typically be the case for signal processing by the orbit solution module 330, only the quantity $[\hat{N}_{r,L_2}^s \lambda_{NL} + b_{r,NL}]$ needs to be solved for. This quantity is defined as the modified RC float ambiguity term:

$$(AMB)_{r,RC}^{s*} = \hat{N}_{r,L_2}^s \lambda_{NL} + b_{r,NL} \quad (46)$$

The RC float ambiguity is resolved in DD and SD form by the narrow-lane DD and SD module 332 of the orbit solution module 320 (FIG. 3B), or equivalently the DD ambiguity resolution engine 370 and SD ambiguity resolution engine 390 (FIG. 3C) of the orbit solution module, where the receiver NL bias $b_{r,NL}$ is cancelled. Before the initial satellite narrow-lane bias is estimated, the RC float ambiguity contains both receiver and satellite narrow-lane bias. It is for this reason that initial NL bias estimation is required in order to fix SD narrow-lane ambiguity. Therefore, the SD modified RC float ambiguity term $\nabla(AMB)_{r,RC}^{s_i s_j *}$ is in essence the SD NL ambiguity $\nabla N_{r,L_2}^{s_i s_j}$, plus satellite NL bias $\nabla b_{NL}^{s_i s_j}$, as shown here:

$$\nabla(AMB)_{r,RC}^{s_i s_j} = (AMB)_{r,RC}^{s_i *} - (AMB)_{r,RC}^{s_j *} \quad (47)$$

$$= [N_{r,L_2}^{s_i}\lambda_{NL} + b_{r,NL} + b_{NL}^{s_i}] - [N_{r,L_2}^{s_j}\lambda_{NL} + b_{r,NL} + b_{NL}^{s_j}]$$

-continued $$= [N_{r,L_2}^{s_i} - N_{r,L_2}^{s_j}]\lambda_{NL} + b_{NL}^{s_i} - b_{NL}^{s_j}$$

$$= \nabla N_{r,L_2}^{s_i s_j}\lambda_{NL} + \nabla b_{NL}^{s_i s_j}$$

Similarly, the DD modified RC float ambiguity term is in essence the DD NL ambiguity, $\Delta\nabla N_{r_m r_n, L_2}^{s_i s_j}\lambda_{NL}$, as shown here:

$$\Delta\nabla(AMB)_{r_m r_n, RC}^{s_i s_j^*} = \nabla(AMB)_{r_m, RC}^{s_i s_j^*} - \nabla(AMB)_{r_n, RC}^{s_i s_j^*} \quad (48)$$

$$= \nabla N_{r_m, L_2}^{s_i s_j}\lambda_{NL} + \nabla b_{NL}^{s_i s_j} - \nabla N_{r_n, L_2}^{s_i s_j}\lambda_{NL} - \nabla b_{NL}^{s_i s_j}$$

$$= \Delta\nabla N_{r_m, r_n, L_2}^{s_i s_j}\lambda_{NL}$$

It is noted that all the δ offset items (see, for example, Equations 4 and 5, above) included in the code and carrier phase measurements, such as $\delta_{pcv/pco}$, $\delta_{pwu}$, $\delta_{tides}$, $\delta_{rel}$, can be pre-calculated.

The orbit solution equation for code measurements, implemented by the orbit ZD Kalman filter 332 (FIG. 3B), can be written as $$P_{r,RC}^s - (\delta_{pcv/pco} + \delta_{tides} + \delta_{rel}) - T_{r,dry}^s = \quad (49)$$

$$\rho_r^s + \tilde{\tau}_{r,GPS} + \Delta\tilde{\tau}_{r,GLN\_GPS} - \tilde{\tau}^s + T_r^s =$$

$$\sqrt{(x^s - x_r)^2 + (y^s - y_r)^2 + (z^s - z_r)^2} + \tilde{\tau}_{r,GPS} + \Delta\tilde{\tau}_{r,GLN\_GPS} - \tilde{\tau}^s +$$

$$M_{wet} \cdot Z_{wet} + M_{wet} ctg(e) \cos(\alpha) \cdot G_{NS} + M_{wet} ctg(e) \sin(\alpha) \cdot G_{EW}$$

and the orbit solution equation for carrier phase measurements, implemented by the orbit ZD Kalman filter 332 (FIG. 3B), can be written as $$\Phi_{r,RC}^s \lambda_{NL} - (\delta_{pcv/pco} + \delta_{tides} + \delta_{rel} + \delta_{pwu}\lambda_{NL}) = \quad (50)$$

$$\rho_r^s + \tilde{\tau}_{r,GPS} + \Delta\tilde{\tau}_{r,GLN\_GPS} - \tilde{\tau}^s + T_r^s + AMB_{r,RC}^s + b_{r,NL} - b_{NL}^s =$$

$$\sqrt{(x^s - x_r)^2 + (y^s - y_r)^2 + (z^s - z_r)^2} + \tilde{\tau}_{r,GPS} +$$

$$\Delta\tilde{\tau}_{r,GLN\_GPS} - \tilde{\tau}^s + M_{wet} \cdot Z_{wet} + M_{wet} ctg(e) \cos(\alpha) \cdot G_{NS} +$$

$$M_{wet} ctg(e) \sin(\alpha) \cdot G_{EW} + (AMB)_{r,RC}^s - b_{NL}^s$$

In the case that the WL ambiguity has been resolved, for example by the preprocessor module 320, as would typically be the case for signal processing by the orbit solution module 330, according to equation (45) the carrier phase measurement can be modelled as:

$$\Phi_{r,RC}^s \lambda_{NL} - (\delta_{pcv/pco} + \delta_{tides} + \delta_{rel} + \delta_{pwu}\lambda_{NL}) - \frac{f_1}{f_1 - f_2} N_{r,WL}^s \lambda_{NL} = \quad (51)$$

$$\sqrt{(x^s - x_r)^2 + (y^s - y_r)^2 + (z^s - z_r)^2} + \tilde{\tau}_{r,GPS} +$$

$$\Delta\tilde{\tau}_{r,GLN\_GPS} - \tilde{\tau}^s + M_{wet} \cdot Z_{wet} + M_{wet} ctg(e) \cos(\alpha) \cdot G_{NS} +$$

$$M_{wet} ctg(e) \sin(\alpha) \cdot G_{EW} + (AMB)_{r,RC}^{s^*} - b_{NL}^s$$

The state variables in the orbit solution ZD Kalman filter 332 variables are:

Satellite orbit position $\lfloor x^s \ y^x \ z^s \rfloor$, for which the sensitivity coefficients are $$\left[\frac{x^s - x_r}{\rho_r^s} \quad \frac{y^s - y_r}{\rho_r^s} \quad \frac{z^s - z_r}{\rho_r^s}\right] \quad (52)$$

Satellite clock and bias term $\tilde{\tau}^s$, for which the sensitivity coefficient is −1.

Receiver clock and bias term $\tilde{\tau}_r$, for which the sensitivity coefficient is 1, Receiver dependent GLONASS bias (with respect to GPS receiver clock) $\Delta\tilde{\tau}_{r,GLN\_GPS}$ which is for the case of GLONASS only, for which the sensitivity coefficient is 1; it can also be estimated as one receiver clock for GLONASS system signal processing, Tropospheric zenith delay wet component $Z_{wet}$, for which the sensitivity coefficient is the tropospheric delay mapping function for the wet component $M_{wet}$, Tropospheric horizontal gradients for the north-south direction, for which the sensitivity coefficient is $$M_{wet} ctg(e) \cos(\alpha) \quad (53)$$

Tropospheric horizontal gradients for the east-west direction, for which the sensitivity coefficient is $$M_{wet} ctg(e) \sin(\alpha) \quad (54)$$

RC float ambiguity term $(AMB)_{r,Rc}^s$, or $(AMB)_{r,RC}^{s^*}$ for the case in which the WL ambiguity has already been resolved, for which the sensitivity coefficient is $\lambda_{NL}$.

Satellite NL bias $b_{NL}^s$, for which the sensitivity coefficient is −1.

In some embodiments, GPS and GLONASS signals are integrated in one filter, in which case the float ambiguity variance covariance matrix update, for a common receiver phase bias error, is as follows:

$$Q_{\hat{N}_{NL}}^n = Q_{\hat{N}_{NL}}^{n-1} + \begin{pmatrix} 1 & \cdots & 1 \\ \vdots & \ddots & \vdots \\ 1 & \cdots & 1 \end{pmatrix} q_{b_{r,NL}} \cdot \Delta t_{n-1,n} \quad (55)$$

The satellite NL bias variance is also updated as following:

$$Q_{b_{NL}^s}^n = Q_{b_{NL}^s}^{n-1} + q_{b_{NL}^s} \cdot \Delta t_{n-1,n} \quad (56)$$

Clock Solution ZD Kalman Filter

The clock solution module's ZD Kalman filter 342 uses the same measurements as the orbit solution module's ZD Kalman filter 332, and uses the same update equations, except as follows:

The clock solution ZD Kalman filter 342 is run at a different update rate (e.g., an update rate of once per 30 seconds or once per 60 seconds) than the orbit solution ZD Kalman filter 332, because clock corrections vary more quickly than orbit corrections;

In the clock solution ZD Kalman filter 342, all the state variables remain the same as in the orbit solution module's ZD Kalman filter 332 (as described above), except satellite orbit related states, which are not estimated but instead use the orbit estimation results from the orbit solution module. In the clock solution ZD Kalman filter 342, the code measurement is modelled as:

$$P_{r,RC}^s - (\delta_{pcv/pco} + \delta_{tides} + \delta_{rel}) - T_{r,dry}^s - \rho_r^s = \tilde{\tau}_{r,GPS} + \Delta\tilde{\tau}_{r,GLN\_GPS} - \tilde{\tau}^s + M_{wet} \cdot Z_{wet} + M_{wet} ctg(e) \cos(\alpha) \cdot G_{NS} + M_{wet} ctg(e) \sin(\alpha) \cdot G_{EW} \quad (57)$$

and the carrier phase measurement is modelled as $$\Phi_{r,RC}{}^s \lambda_{NL} - (\delta_{pcv/pcg} + \delta_{tides} + \delta_{rel} + \delta_{pwu} \lambda_{NL}) - \rho_r{}^s = \bar{\tau}_{r,GPS} + \Delta \tau_{r,GLN\_GPS} - \tau^s + M_{wet} \cdot Z_{wet} + M_{wet} \, ctg(e) cos(\alpha) \cdot G_{NS} + M_{wet} \, ctg(e) sin(\alpha) \cdot G_{EW} + (AMB)_{r,RC}{}^s - b_{NL}{}^s \quad (58)$$

In some embodiments, the clock solution module 340 outputs the complete set of global difference corrections, including satellite orbit corrections, satellite clock corrections, satellite WL biases, satellite NL biases, and quality information. These corrections and estimated tropospheric parameters are sent to the low latency clock solution module 350. Note that the biases discussed herein are satellite WL and NL biases, and not receiver biases, unless receiver biases are being specifically discussed, because receiver biases of the reference receivers 140 are not used by the navigation receivers 120 to determine their positions, and thus are not resolved by the satellite corrections generation system 130.

Satellite Bias and SD Ambiguity Determination

Once the DD ambiguities have been fixed in preprocessor module 320, orbit solution module 330, or clock solution module 340, the next task is to separately solve for both satellite biases (WL and NL) and SD ambiguities (WL and NL). However, for any individual reference receiver, solving for both satellite biases and SD ambiguities is a "rank deficiency" problem, as there are an insufficient number of independent equations to solve for both. In order to remove the rank deficiency, the satellite biases are resolved using a networked solution, as described herein, and as part of that process, a "SD ambiguity datum" is determined. The SD ambiguity datum, and it's use in resolving the satellite biases, are described below.

Once the DD ambiguities for most or all of the satellites are fixed, some of the corresponding SD ambiguities need be fixed into integer values, or initial integer values, to resolve the rank deficiency. These initially fixed SD ambiguity values are defined as the SD ambiguity datum set $\nabla N_{datum}$, which is shown here in equation form:

$$\nabla N_{datum} = \{\nabla N_{r_1, fixed}{}^{s_1 s_2}, \nabla N_{r_2, fixed}{}^{s_2 s_3}, \ldots, \nabla N_{r_m, fixed}{}^{s_{N-1} s_N}\} \quad (59)$$

in which the floating ambiguity SD pairs $\nabla \hat{N}_{r_1}{}^{s_1 s_2}$, $\nabla \hat{N}_{r_2}{}^{s_2 s_3}, \ldots, \nabla \hat{N}_{r_m}{}^{s_{N-1} s_N}$ are initially fixed to their round-off integer numbers or at other arbitrarily determined values (e.g., round up or round down values):

$$\nabla N_{r_1, fixed}^{s_1 s_2} = \text{round}(\nabla \hat{N}_{r_1}^{s_1 s_2}) \quad (60)$$

$$\nabla N_{r_2, fixed}^{s_2 s_3} = \text{round}(\nabla \hat{N}_{r_2}^{s_2 s_3})$$

...

$$\nabla N_{r_m, fixed}^{s_{N-1} s_N} = \text{round}(\nabla \hat{N}_{r_m}^{s_{N-1} s_N})$$

where round($\nabla \hat{N}_r{}^{s_i s_j}$) is the round-off integer value of $\nabla \hat{N}_r{}^{s_i s_j}$, and $\nabla N_{r, fixed}{}^{s_1 s_2}$ is the fixed ambiguity value for the float SD ambiguity $\nabla \hat{N}_r{}^{s_1 s_2}$. The SD ambiguity datum is therefore the initial integer fix for the SD ambiguities, and subsequently determined fixes are based on the SD ambiguity datum.

It is noted that the preprocessor module 320 forms an SD ambiguity datum for WL ambiguities, while orbit solution module 330 and clock solution module 340 each form an SD ambiguity datum for NL ambiguities. Thus, the following explanations concerning the SD ambiguity datum, ambiguity clusters, and satellite bias value determination, are applicable to both WL measurement processing by preprocessor module 320, and NL measurement processing by orbit solution module 330 and clock solution module 340.

Ambiguity Clusters

For any given fixed DD ambiguity $\nabla \Delta N_{r_m r_n}{}^{S_i S_j}$, two float SD ambiguities can be formed as follows:

$$\nabla \hat{N}_{r_m}{}^{S_i S_j} = \hat{N}_{r_m}{}^{S_i} - \hat{N}_{r_m}{}^{S_j} \quad (61)$$

$$\nabla \hat{N}_{r_n}{}^{S_i S_j} = \hat{N}_{r_n}{}^{S_i} - \hat{N}_{r_n}{}^{S_j} \quad (62)$$

where $\hat{N}_{r_m}{}^{S_i}$, $\hat{N}_{r_m}{}^{S_j}$, $\hat{N}_{r_n}{}^{S_i}$, $\hat{N}_{r_n}{}^{S_j}$ are the ZD Kalman filter float ambiguity state variable estimates, and the ZD Kalman filter is the ZD Kalman filter of preprocessor module 320, orbit solution module 330 or clock solution module 340, whose carrier phase measurement modeling equation is equation (30), (51), or (58) respectively.

These two float SD ambiguities $\nabla \hat{N}_{r_m}{}^{S_i S_j}$ and $\nabla \hat{N}_{r_n}{}^{S_i S_j}$ have the same ambiguity fractional parts and variances, as indicated in equation (63), below, because their associated DD ambiguity is $\nabla \Delta N_{r_m r_n}{}^{S_i S_j}$ has already been fixed into an integer value:

$$\lfloor \nabla \hat{N}_{r_m}{}^{S_i S_j} \rfloor = \lfloor \nabla \hat{N}_{r_n}{}^{S_i S_j} \rfloor Q_{r_m r_n}{}^{S_i S_j} = Q_{r_m r_n}{}^{S_i S_j} = Q_{r_m r_n}{}^{S_i S_j} \text{ or } -Q_{r_m r_n}{}^{S_i S_j}, \quad (63)$$

where the term $\lfloor \nabla \hat{N}_r{}^{S_i S_j} \rfloor$ means the fractional part of the float ambiguity $\nabla \hat{N}_r{}^{S_i S_j}$.

Based on the fixed DD ambiguities between satellite pair $s_i$ and $s_j$ among all site pairs, the SD ambiguity set $\{\nabla \hat{N}_{r_m}{}^{s_i s_j}, \nabla \hat{N}_{r_n}{}^{s_i s_j}, \ldots\}$ can be formed for all reference stations that have both satellites $s_i$ and $s_j$ in view of their GNSS antennae and which satisfy equation (63). This SD ambiguity set is defined as the SD ambiguity cluster $\nabla \hat{N}_{cluster}{}^{s_i s_j}$:

$$\nabla \hat{N}_{cluster}{}^{s_i s_j} = \{\nabla \hat{N}_{r_m}{}^{s_i s_j}, \nabla \hat{N}_{r_n}{}^{s_i s_j}, \ldots\} \quad (64)$$

The number of SD ambiguity pairs in the cluster is defined as the cluster size. It should be noted that there could be several clusters for a given satellite pair $s_i$ and $s_j$. The ambiguity cluster with the maximum cluster size is selected as $\nabla \hat{N}_{cluster}{}^{s_i s_j}$.

SD Ambiguity Datum Determination

Figure 7:
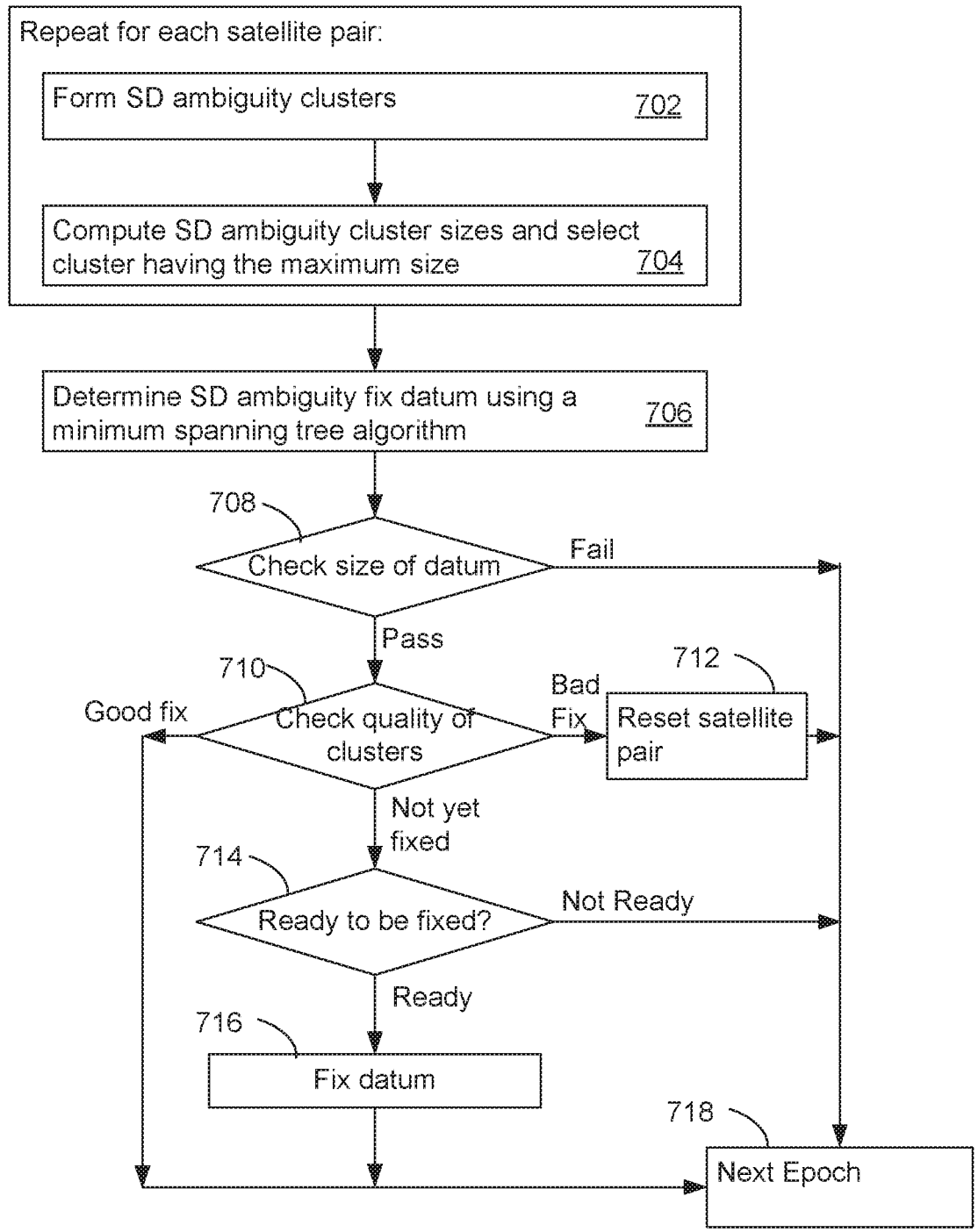
FIG. 7 is a flowchart of a process for determining the SD ambiguity datum in a respective module.

FIG. 7 is a flowchart of a process 700 (also herein called a method) for determining the SD ambiguity datum in a respective module. See also FIG. 4A, 408, and FIGS. 5A and 5B, 530/530B. For all possible satellite pairs (e.g., for satellites $s_i$ and $s_j$) that are candidates for having a cluster to be included in the datum, an SD ambiguity set $\hat{N}_{cluster}{}^{s_i s_j}$ is formed (702) using SD ambiguities for all reference stations in view of both satellites. The sizes of the ambiguity clusters are determined, the cluster having the maximum size is selected (704). Alternatively, if an ambiguity cluster $\hat{N}_{cluster}{}^{s_i s_j}$ is already fixed (e.g., during a prior epoch), that ambiguity cluster is selected as the first cluster in the datum. In the example shown in FIG. 8, the sizes of the ambiguity clusters between all the satellite pairs are determined in Table 1, which illustrates a GPS ambiguity cluster matrix. Additional clusters are added to the datum using a minimum spanning tree algorithm (706), to form the SD ambiguity datum, $\nabla N_{datum}$, after which the datum is tested to determine if it is ready for use in determining satellite bias values.

In some embodiments, the minimum spanning tree algorithm for adding clusters to the datum is as follows. Start with the largest ambiguity cluster $\nabla \hat{N}_{cluster}{}^{s_1 s_2}$ for example satellite pair PRN20 and PRN24 in Table 1 of FIG. 8, which has a cluster size of 15, or more generally the cluster selected to be the first cluster in the list of ambiguity datum, an example of which is shown as Table 2 in FIG. 8. Given that all the SD ambiguities in this cluster $\nabla \hat{N}_{cluster}{}^{s_1 s_2}$ have exactly the same fractional part and variance, as indicated by equation (63), it is equivalent to select any one ambiguity within the cluster for inclusion in the datum. Therefore we can select any one of the SD ambiguities $\nabla\hat{N}_r^{s_1 s_2}$ in this cluster, and fix it into an integer $\nabla N_{r,fixed}^{s_1 s_2}$ as the initial element of the datum, where r can be any reference receiver within the first cluster:

$$\nabla N_{datum} = \{\nabla N_{r,fixed}^{s_1 s_2}\} \quad (65)$$

The datum is expanded one additional ambiguity cluster at a time, using the next largest cluster, $\nabla\hat{N}_{cluster}^{s_2 s_3}$, but with the constraint that satellite $s_2$ is already in the SD ambiguity datum $\nabla N_{datum}$ and $s_3$ is not yet in the SD ambiguity datum $\nabla N_{datum}$. For example, in Table 1 of FIG. 8, the second largest cluster is for satellite pair PRN15 and PRN20, which has a cluster size of 14. After the inclusion a second cluster, $\nabla\hat{N}_{cluster}^{s_2 s_3}$, in the SD ambiguity datum, the expanded datum is represented as:

$$\nabla N_{datum} = \{\nabla N_{r,fixed}^{s_1 s_2}, \nabla N_{r,fixed}^{s_2 s_3}\} \quad (66)$$

The expansion of the datum is repeated until there are no further satellite pairs that can be included in the datum. For example, in Table 2 of FIG. 8, there are a total of 29 SD ambiguity datum from 30 satellites. Given a constellation of n satellites, a fully determined SD ambiguity datum has n−1 clusters:

$$\nabla N_{datum} = \{\nabla N_{r,fixed}^{s_1 s_2}, \nabla N_{r,fixed}^{s_2 s_3}, \ldots, \nabla N_{r,fixed}^{s_{n-1} s_n}\} \quad (67)$$

The size of the datum is checked (708). In particular, if the SD ambiguity datum is not fully determined, i.e., the number of SD ambiguity clusters in the datum is less than n−1, the process of generating the datum resumes during the next epoch, and succeeding epochs as needed, until the number of SD ambiguity clusters in the datum is equal to n−1.

Initially, if number of qualified SD ambiguity clusters accounts more than half number of satellites in the constellation (or for each constellation, if satellite correction information is being determined for more than one constellation), this is an indicator that the network is ready for determining the quality of the SD ambiguity clusters. Otherwise, formation of the SD ambiguity datum resumes during the next epoch (718). For any satellite not included in the list of ambiguity datum, the SD ambiguity WL or NL constraints are not applied in the ZD filter.

After the ambiguity datum for most satellites in the same constellation is determined, the quality of the SD ambiguity clusters for a particular satellite pair in the datum is checked repeatedly every epoch (710). See also FIG. 4A, 428, and FIGS. 5A and 5B, 530/530B. In some embodiments, if the quantity of the SD ambiguities corresponding to an SD ambiguity cluster for the satellite pair in the datum fails to meet predefined criteria for example, because the quantity is less than 2, the SD ambiguity cluster for the satellite pair is reset (e.g., removed from the datum), and the process of forming the SD ambiguity datum resumes during the next epoch (718). If the quality of ambiguity datum is validated and ready to be fixed (714), each SD ambiguity pair $\nabla N_{r,fixed}^{s_{n-1} s_n}$ in the list of datum is fixed as an integer SD WL ambiguity in preprocessor module or NL ambiguity in orbit solution module or clock solution module (716). See also FIG. 4A, 430, and FIGS. 5A and 5B, 532/532B. In some embodiments, the ambiguity datum includes a list of SD ambiguity pairs, where each pair contains two satellites. All the satellites included in the list of the ambiguity datum will be marked as SD fix ready, or equivalently marked as a SD fix ready set. The SD WL or NL ambiguity constraints for these satellites, marked as a SD fix ready set, can be applied in the preprocessor module, orbit solution module and clock solution module to improve further filter state estimation including satellite WL/NL biases, orbit and clock corrections, etc. Any satellites not included in the list of the ambiguity datum, or that are removed from the list, are not SD fix read and thus are not marked as SD fix ready. It should be noted that DD or SD NL ambiguity constraints can be only applied for a particular pair of satellites after the corresponding SD WL ambiguity is fixed.

Data Preparation and Identifying Problematic Ambiguity Sets

For a global set of reference receivers, the potentially fixable float ambiguity set, $\hat{N}_{float}$, will typically have hundreds of ambiguities (e.g., DD or SD ambiguities), including ambiguities for both WL and NL values. In some embodiments, possibly fixable DD/SD ambiguity sets are identified (see FIG. 4A, 424 and 430 for WL ambiguity resolution, and FIG. 5A, 5B, 526/526B and 532/532B for NL ambiguity resolution), redundant ambiguities are removed, ambiguity fix constraints are applied to identify potentially problematic ambiguities (i.e., a subset of the potentially fixable ambiguity sets), and variance values for the applicable ZD Kalman filter are updated for the identified ambiguities to facilitate those ambiguities being fixed during the next epoch.

Data Preparation: Removing Redundant Ambiguities

The following discussions regarding removing redundant ambiguities, detecting problematic ambiguity elements or subsets, and removing or remediating the problematic ambiguity elements or subsets are applicable to both WL and NL ambiguities.

A cluster of ambiguities is redundant if all the ambiguities in the cluster have the same fractional parts and variance and covariance. If any ambiguity in the cluster is fixed, all the other ambiguities in the cluster are fixed. Therefore only one ambiguity in the cluster needs to be fixed, and in some embodiments the remaining ambiguity elements in the cluster are redundant and are removed from the float ambiguity vector $\hat{N}_{float}$. In some embodiments, removing the redundant ambiguity elements is needed to enable the LAMBDA search process. From a variance covariance matrix perspective, if there is any redundant ambiguity element in $\hat{N}_{float}$, its associated variance co-variance $Q_{\hat{N}_{float}}$ is not symmetric positive definite. Accordingly, the redundancy is removed via LDL decomposition of the variance co-variance $Q_{\hat{N}_{float}}$.

$$Q_{\hat{N}_{float}} = LDL^T \quad (68)$$

where L is lower triangular matrix, and D is a diagonal matrix:

$$D = \begin{bmatrix} d_1 & & & & \\ & \ldots & & & \\ & & d_i & & \\ & & & \ldots & \\ & & & & d_n \end{bmatrix} \quad (69)$$

In some embodiments, during LDL decomposition, if a diagonal component $d_i$ has a value close to zero, e.g., smaller than $1 \times e^{-10}$, the corresponding ambiguity element $N_i$ is regarded as redundant, and is therefore removed from the ambiguity vector:

$$\forall N_i, d_i < 1 \times e^{-10} \hat{N}_{float} = [\hat{N}_1 \ldots \hat{N}_{i-1} \hat{N}_{i+1} \ldots \hat{N}_n] \quad (70)$$

LAMBDA Search

Figure 4:
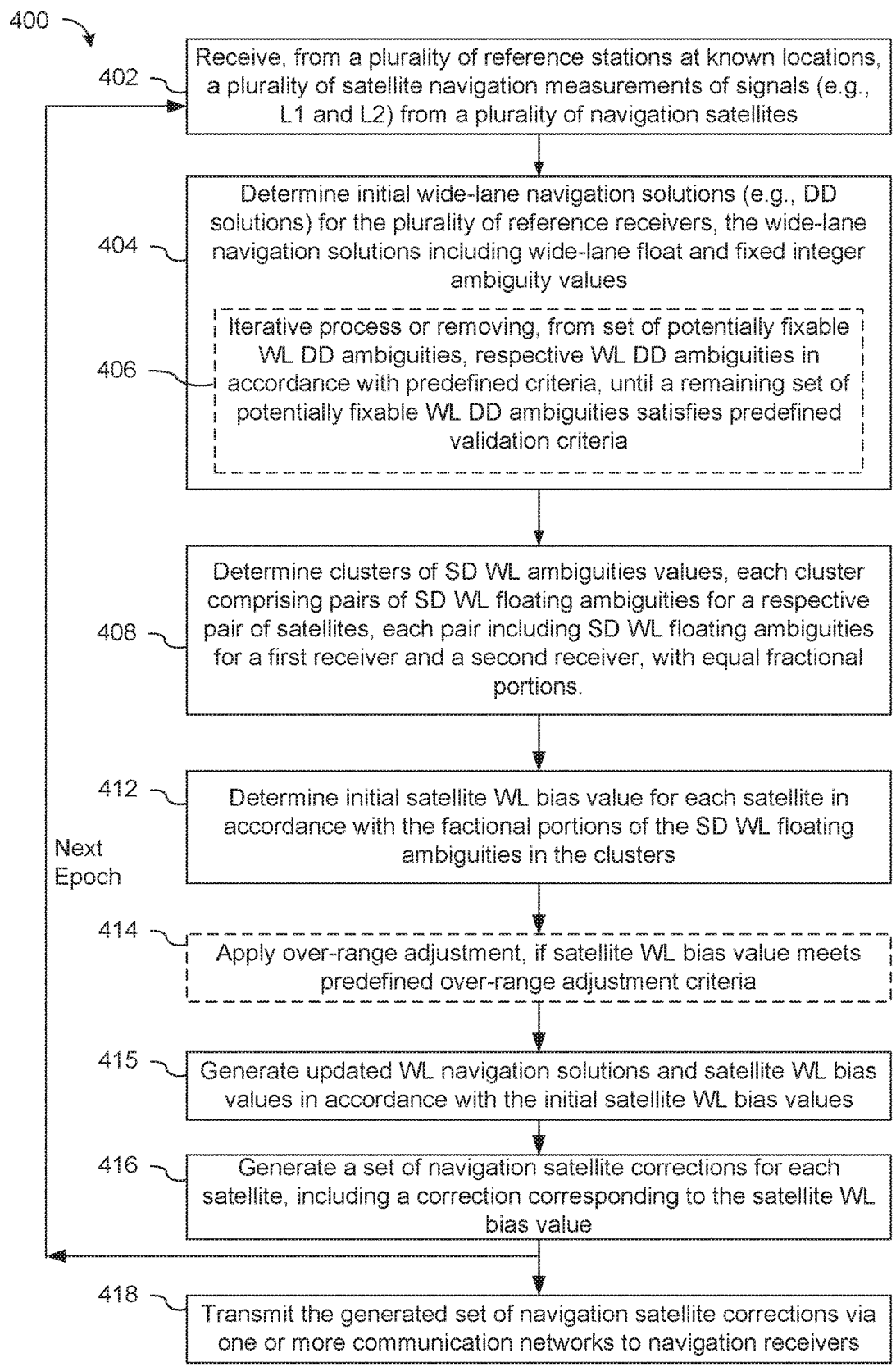
FIG. 4 is a flowchart of a process for generating navigation satellite corrections, include a correction corresponding to a satellite wide-lane bias for each satellite in a plurality of satellites, and for providing the generated navigation satellite corrections to navigation receivers, according to some embodiments.
Figure 4A:
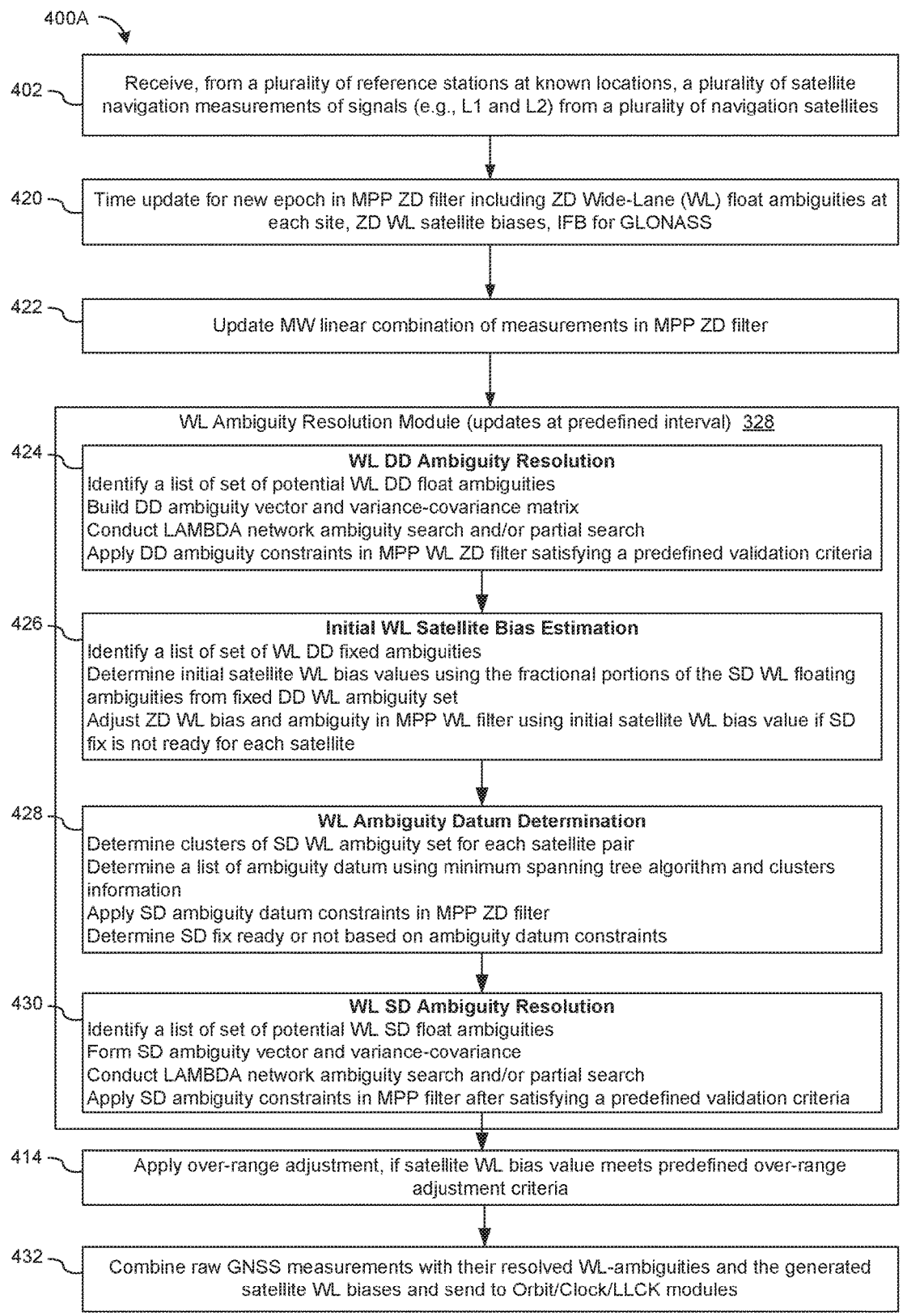
FIG. 4A is a flowchart of a process for resolving wide-lane double-difference and single-difference ambiguities in a measurement preprocessor module, and providing those solutions to orbit, clock and low latency clock modules, according to some embodiments.

After forming or determining the non-redundant ambiguity vector $\hat{N}_{float}$ and its associated variance covariance matrix $Q_{\hat{N}_{float}}$ (see FIG. 4A, 424 and 430 for WL ambiguity resolution, and FIGS. 5A and 5B, 526/526B and 532/532B for NL ambiguity resolution), which is a positive definitive matrix, the LAMBDA method is used to search for the $n^{th}$ best ambiguity set, and that ambiguity set is checked to see if passes the validation condition shown in Equation (29) (see FIG. 4A, 424 and 430 for WL ambiguity resolution, and FIGS. 5A and 5B, 526 and 532 for NL ambiguity resolution). If equation (29) is satisfied, which means that the ambiguity resolution is validated, a constraint is applied for each fixed ambiguity set, as indicated below by equation (71) for DD ambiguities and by equation (72) for SD ambiguities. In the event that the validation fails, an iterative partial fix search process is performed, as described in more detail below.

Apply Ambiguity Fix Constraint

For all the fixed ambiguities or partial fixed ambgiuities in the fixed set $N_{fixed}$, ambiguity constraints are sequentially updated for the ZD Kalman filter. For DD ambiguities, according to equations (27) and (48), $$\Delta \nabla \hat{N}^{s_i s_j}_{r_m r_n, fixed} = (\hat{N}^{s_i}_{r_m} - \hat{N}^{s_j}_{r_m}) - (\hat{N}^{s_i}_{r_n} - \hat{N}^{s_j}_{r_n}) \quad (71)$$

$$\sigma^2_{\Delta \nabla \hat{N}^{s_i s_j}_{r_m r_n, fixed}} = 0$$

where $\Delta \nabla N_{r_m r_n, fixed}^{s_i s_j}$ is the fixed DD ambiguity integer determined by the LAMBDA search process, which is used as a virtual measurement;

$$\sigma^2_{\Delta \nabla \hat{N}^{s_i s_j}_{r_m r_n, fixed}}$$

is the measurement variance, which is set to zero since the DD ambiguity has been fixed into an integer; and $\hat{N}$ is the ambiguity state variable in the ZD filter, which can be a float WL ambiguity or float NL ambiguity.

For SD WL or NL ambiguities between satellites when their ambiguity datum are fixed, the constraint applied is:

$$\Delta \nabla \hat{N}^{s_i s_j}_{r_m, fixed} = \hat{N}^{s_i}_{r_m} - \hat{N}^{s_j}_{r_m} \quad (72)$$

$$\sigma^2_{\nabla \hat{N}^{s_i s_j}_{r_m, fixed}} = 0$$

where $\nabla N_{r_m, fixed}^{s_i s_j}$ is the SD fixed ambiguity value (i.e., integer value) determined by the LAMBDA search process, which is used as a virtual measurement; and $$\sigma^2_{\nabla \hat{N}^{s_i s_j}_{r_m, fixed}}$$

is the measurement variance, which is set to zero since the SD ambiguity has been fixed into an integer.

Once the ambiguity fix constraint is applied, the variance of that fixed ambiguity becomes zero. Therefore, all the fixed ambiguity information is preserved in the variance-covariance matrix, and no additional bookkeeping logic is required when processing the ambiguities sets in the next epoch.

Detect Problematic Ambiguity Subsets

From the LAMBDA search described above (see equation (28), the best ambiguity candidate has the smallest quadratic form as $$R_1 = (\overline{N}_1 - \hat{N}_{float})^T Q_{\hat{N}_{float}}^{-1} (\overline{N}_1 - \hat{N}_{float}) \quad (73)$$

where $\hat{N}_{float}$ is the float ambiguity SD or DD vector, and $\overline{N}_1$ is the best ambiguity vector candidate. If the smallest quadratic form is greater than a predefined threshold, for example $$R_1 > c \quad (74)$$

that condition indicates that one or more ambiguity elements in $\hat{N}_{float}$ is significantly biased from the integer assumption or from statistical information that is inappropriate. Those ambiguities are not yet fixable into integer values, and need to be identified.

Identify Problematic Ambiguity Element(s)

Two identification procedures for identifying problematic ambiguity elements are discussed next.

Problematic Ambiguity Element Identification Procedure

In some embodiments, the identication procedure includes the following operations.

(1) Select k best ambgiutiy vector candidates. Among all the ambguity candidates from the network LAMBDA search, after sorting the candidates by the smallest quadratic form R, the first k best candidate sets (e.g., the first 15 candidates of 300 candidates) $\overline{N}_i$ (i.e., $\{\overline{N}_1, \overline{N}_2, \ldots, \overline{N}_{k-1}, \overline{N}_k\}$) with smallest $R_i$ stored during the search in order to pursue the partial search process.

(2) Form a partial ambiguity candidate set $\overline{N}_i^{-j}$. For each candidate set $\overline{N}_i$, the partial set $\overline{N}_i^{-j}$ is formed by removing one ambiguity element $N_j$ at a time, where $j=1, \ldots, n$, and n is the size of the ambiguity vector.

(3) Compute the partial ambiguity quadratic form for the partial ambiguity candidate set $\overline{N}_i^{-j}$. For each partial set $\overline{N}_i^{-j}$, the partial ambiguity quadratic form is calculated as below.

$$R_i^{-j} = (\overline{N}_i^{-j} - \hat{N}_{float}^{-j})^T Q_{\hat{N}_{float}^{-j}}^{-1} (\overline{N}_i^{-j} - \hat{N}^{-j}) \quad (75)$$

where:

$\hat{N}_{float}^{-j}$ is the partial float ambiguity set, i.e., a sub-vector of $\hat{N}$ with ambiguity element $N_j$ removed, which is an (n−1) by 1 vector;

$Q_{\hat{N}_{float}^{-j}}$ is the variance co-variance of $\hat{N}_{float}^{-j}$ which is an (n−1) by (n−1) matrix, $\overline{N}_i^{-j}$ is the $i^{th}$ integer candidate set with ambiguity element $N_j$ removed, which is an (n−1) element vector, and $R_i^{-j}$ is the ambiguity quadratic form of $\hat{N}_{float}^{-j}$, which is a scalar value.

(4) Identify the problematic ambiguity element. The partial search will be based on sorting the partial float ambiguity sets based on their quadratic forms $R_i^{-j}$. For the partial float ambiguity set $\overline{N}_i^{-j}$ having the smallest quadratic form $R_i^{-j}$, the ambiguity element $\hat{N}_j$ is identified as problematic.

In some embodiments, after each ambiguity element identified as problematic is removed, the process of detecting whether any ambiguity elements are problematic is repeated, until no problematic ambiguity elements remain.

Gain Computation—an Alternative Computationally Efficient Approach

The computation of quadratic form $R_i^{-j}$ is computationally intensive, as it involves matrix inversion. In some embodiments, in order to avoid matrix inversion for each ambiguity element removal trial, the gain of the entire partial set $\overline{N}_i^{-j}$ is computed.

$$GAIN = R_1 - R_i^{-j} \quad (76)$$

Instead of searching for the smallest partial quadratic form $R_i^{-j}$, a search is performed for the partial ambiguity having the largest gain. If $\overline{N}_i^{-j}$ has the largest gain, the problematic ambiguity element is identified as $\hat{N}_j$. Note that $\hat{N}_j$ can be a DD or SD ambiguity set, depending on whether the DD or SD ambiguities are being resolved.

As shown in following derivation, to compute the gain for a partial set, there is no need to re-compute the matrix inversion for each potentially problematic ambiguity element.

$$\text{GAIN} = R_1 - R_1^{-j} \tag{77}$$

$$= R_1 - R_i + R_i - R_1^{-j}$$

$$= R_1 - R_i + (\overline{N}_i - \hat{N}_{float})^T Q_{\hat{N}_{float}}^{-1} (\overline{N}_i - \overline{N}_{float}) -$$

$$(\overline{N}_i^{-j} - \hat{N}_{float}^{-j})^T Q_{\hat{N}_{float}^{-j}}^{-1} (\overline{N}_i^{-j} - \hat{N}_{float}^{-j})$$

For simplicity, the right two terms of the above equation can be written as $$(\Delta N_a \ \Delta N_b)^T \begin{pmatrix} Q_{aa} & Q_{ab} \\ Q_{ba} & Q_{bb} \end{pmatrix}^{-1} (\Delta N_a \ \Delta N_b) - \Delta N_a^T Q_{aa}^{-1} \Delta N_a \tag{78}$$

Given the matrix formula, $$\begin{pmatrix} A & B \\ C & D \end{pmatrix}^{-1} = \tag{79}$$

$$\begin{pmatrix} A^{-1} + A^{-1}B(D - CA^{-1}B)^{-1}CA^{-1} & -A^{-1}B(D - CA^{-1}B)^{-1} \\ -(D - CA^{-1}B)^{-1}CA^{-1} & (D - CA^{-1}B)^{-1} \end{pmatrix},$$

the inverse of the matrix can be rewritten as $$\begin{pmatrix} Q_{aa} & Q_{ab} \\ Q_{ba} & Q_{bb} \end{pmatrix}^{-1} = \begin{pmatrix} Q_{aa}^{-1} + Q_{aa}^{-1}Q_{ab}(Q_{bb} - Q_{ba}Q_{aa}^{-1}Q_{ab})^{-1}Q_{ba}Q_{aa}^{-1} & -Q_{aa}^{-1}Q_{ab}(Q_{bb} - Q_{ba}Q_{aa}^{-1}Q_{ab})^{-1} \\ -(Q_{bb} - Q_{ba}Q_{aa}^{-1}Q_{ab})^{-1}Q_{ba}Q_{aa}^{-1} & (Q_{bb} - Q_{ba}Q_{aa}^{-1}Q_{ab})^{-1} \end{pmatrix} \tag{80}$$

$$= \begin{pmatrix} P_{aa} & P_{ab} \\ P_{ba} & P_{bb} \end{pmatrix}$$

Accordingly, Equation (78) can be simplified as $$(\Delta N_a \ \Delta N_b)^T \begin{pmatrix} Q_{aa} & Q_{ab} \\ Q_{ba} & Q_{bb} \end{pmatrix}^{-1} (\Delta N_a \ \Delta N_b) - \Delta N_a^T Q_{aa}^{-1} \Delta N_a = \tag{81}$$

$$\Delta N_a^T Q_{aa}^{-1} \Delta N_a + \Delta N_b^T P_{bb} \Delta N_b + \Delta N_a^T P_{ab} \Delta N_b + \Delta N_b^T P_{ba} \Delta N_a +$$

$$\Delta N_a^T P_{ab} P_{bb}^{-1} P_{ba} \Delta N_a - \Delta N_a^T Q_{aa}^{-1} \Delta N_a = \Delta N_b^T P_{bb} \Delta N_b +$$

$$\Delta N_a^T P_{ab} \Delta N_b + \Delta N_b^T P_{ba} \Delta N_a + \Delta N_a^T P_{ab} P_{bb}^{-1} P_{ba} \Delta N_a =$$

$$(P_{ba} \Delta N_a + P_{bb} \Delta N_b)^T P_{bb}^{-1} (P_{ba} \Delta N_a + P_{bb} \Delta N_b) =$$

$$\frac{(P_{bb} \Delta N_b + P_{ba} \Delta N_a)^2}{P_{bb}}$$

Finally the gain can be computed by simply using all scalar values, available from Equation (81), as:

$$\text{GAIN} = R_{1st} - R_{1th} + \frac{(P_{bb}\Delta N_b + P_{ba}\Delta N_a)^2}{P_{bb}} \tag{82}$$

Confirm Problematic Ambiguity Subset

For each removed ambiguity element, a ratio test is performed as below $$\frac{\lfloor \hat{N}_j \rfloor \cdot \lfloor \hat{N}_j \rfloor}{Q_{\hat{N}_j}} > c_1 \tag{83}$$

where $\lfloor \hat{N}_j \rfloor$ is the fractional part of $\hat{N}_j$. If the ratio test is satisfied (e.g., with $c_1$ equal to 10), the problematic ambiguity element $\hat{N}_j$ is identified and confirmed.

Once the problematic ambiguity element $\hat{N}_j$ is identified and confirmed, a partial float ambiguity set $\hat{N}_{float}^{-j}$ is formed by removing ambiguity element $\hat{N}_j$ from the original float ambiguity set $\hat{N}_{float}$.

The LAMBDA search is performed to search for the best ambiguity candidate. The best ambiguity candidate is validated by comparing the quadratic forms of the best candidate set and the second best candidate set, as below $$\frac{R_2^{-j}}{R_1^{-j}} > c, \tag{84}$$

where the best candidate has the smallest quadratic form and the second best candidate has the second smallest quadratic form. If the validation fails, that is an indication that an additional problematic ambiguity element needs be identified and removed. In that case, the partial ambiguity search continues as long as predefined criteria are satisfied, for example: the partial set quadratic form $R_1^{-j}$ is larger than a predefined value, and no more than a predefined number of the ambiguity elements have been removed (e.g., nor ore than twenty percent of the ambiguity element have been removed).

Treat Problematic Ambiguity Sets

In some embodiments, after all the constraints have been applied, a final check is conducted. For each ambiguity element $\hat{N}_{r_m}^{s_i s_j}$ removed from the original float ambiguity set $\hat{N}_{float}$, or otherwise excluded from the LAMBDA search, a statistical check is performed as follows:

$$\frac{\lfloor \hat{N}_{r_m}^{s_i s_j} \rfloor \cdot \lfloor \hat{N}_{r_m}^{s_i s_j} \rfloor}{Q_{\hat{N}_{r_m}^{s_i s_j}}} > c_2 \tag{85}$$

where $C_2$ is an empirical value, such as 50. In some embodiments, if the above statistical check is satisfied by the removed ambiguity element $\hat{N}_{r_m}^{s_i s_j}$, the variance used in the ZD Kalman filter for the ZD ambiguity $\hat{N}_{r_m}^{s_j}$ is inflated in accordance with the following equation for the "second" (non-reference) satellite $S_j$, $$Q_{\hat{N}_{r_m}^{s_j}}^{inflated} = Q_{\hat{N}_{r_m}^{s_j}} + 0.01 \frac{\lfloor \hat{N}_{r_m}^{s_i s_j} \rfloor \cdot \lfloor \hat{N}_{r_m}^{s_i s_j} \rfloor}{Q_{\hat{N}_{r_m}^{s_i s_j}}} \quad (86)$$

but the variance of the ZD ambiguity $\hat{N}_{r_m}^{s_i}$ for the reference satellite $S_i$ (e.g., the satellite having the highest elevation, without cycle slips during the relevant time period, is selected as a reference satellite for each reference receiver $r_m$) is not inflated.

It is noted that for each ambiguity element removed from the original float ambiguity set $\hat{N}_{float}$, the corresponding ZD ambiguity is not removed from the ZD Kalman filter state, but instead its variance is inflated to enable the possibility of fixing that ambiguity during the next epoch.

DD Ambiguity Resolution Engine

The DD ambiguity resolution engine 370 (FIG. 3C) in the preprocessor module 320, orbit solution module 330 and clock solution module 340, performs two major operations: generating a set of networked DD ambiguities (372) and resolving the networked DD ambiguities (374).

Generating a Set of Networked DD Ambiguities

Given N globally distributed reference stations, a minimum spanning tree is used to form a network of independent baselines. All possible baseline distances are computed and sorted from shortest to longest. A network of independent baselines T starts from the shortest baseline ($r_m$, $r_n$), and expands one additional baseline at a time with the shortest baseline distance edge ($r_n$, $r_p$) such that $r_n$ is in T and $r_p$ is not yet in T. This expansion continues until all the reference receivers are in T.

For each independent baseline ($r_m$, $r_n$), a reference satellite $s_i$ is determined based on ambiguity fixing status, satellite elevation, and the postfit residual RAIM (receiver autonomous integrity monitoring) ratio. For each independent baseline, double difference ambiguity values $\Delta \nabla N_{r_m r_n}^{s_i s_j}$ are formed between the reference satellite $s_i$ and all other tracked satellites for that baseline ($r_m$, $r_n$).

ZD filter float ambiguity state variable estimates are used to form DD ambiguity estimates. For WL ambiguities processed by the preprocessor module 320, ZD float ambiguity state estimates can be retrieved from the preprocessor module's ZD Kalman filter 322, described above with reference to equation (30), and the DD float WL ambiguity term for each independent baseline is formed according to equation (33), as follows:

$$\Delta \nabla (AMB)_{r_m r_n, WL}^{s_i s_j} = [(AMB)_{r_m, WL}^{s_i} - (AMB)_{r_m, WL}^{s_j}] - \quad (87)$$
$$[(AMB)_{r_n, WL}^{s_i} - (AMB)_{r_n, WL}^{s_j}]$$
$$= [(N_{r_m, WL}^{s_i} \lambda_{WL} + b_{r_m, WL}) - (N_{r_m, WL}^{s_j} \lambda_{WL} + b_{r_m, WL})] -$$
$$[(N_{r_n, WL}^{s_i} \lambda_{WL} + b_{r_n, WL}) - (N_{r_n, WL}^{s_j} \lambda_{WL} + b_{r_n, WL})]$$
$$= [(N_{r_m, WL}^{s_i} - N_{r_m, WL}^{s_j}) - (N_{r_n, WL}^{s_i} - N_{r_n, WL}^{s_j})] \lambda_{WL} =$$
$$\nabla N_{r_m r_n, WL}^{s_i s_j} \lambda_{WL}$$

where $(AMB)_{r_m, WL}^{s_i}$, $(AMB)_{r_m, WL}^{s_j}$, $(AMB)_{r_n, WL}^{s_i}$, $(AMB)_{r_n, WL}^{s_j}$ are the combined WL ambiguity state estimates from the preprocessor module's ZD Kalman filter 322.

For NL ambiguities processed by the orbit solution module 330 and clock solution module 340, ZD Kalman filter float ambiguity state estimates can be retrieved from the ZD Kalman filter 332 of the orbit solution module or the ZD Kalman filter 342 of the clock solution module 340, described above with reference to equations (51) and (58), and the DD float NL ambiguity term for each independent baseline are formed according to equation (48), as follows:

$$\Delta \nabla (AMB)_{r_m r_n, RC}^{s_i s_j *} = [(AMB)_{r_m, RC}^{s_i *} - (AMB)_{r_m, RC}^{s_j *}] - \quad (88)$$
$$[(AMB)_{r_n, RC}^{s_i *} - (AMB)_{r_n, RC}^{s_j *}]$$
$$= [(N_{r_m, L_2}^{s_i} \lambda_{NL} + b_{r_m, NL}) - (N_{r_m, L_2}^{s_j} \lambda_{NL} + b_{r_m, NL})] -$$
$$[(N_{r_n, L_2}^{s_i} \lambda_{NL} + b_{r_n, NL}) - (N_{r_n, L_2}^{s_j} \lambda_{NL} + b_{r_n, NL})]$$
$$= [(N_{r_m, L_2}^{s_i} - N_{r_m, L_2}^{s_j}) - (N_{r_n, L_2}^{s_i} - N_{r_n, L_2}^{s_j})] \lambda_{NL} =$$
$$\Delta \nabla N_{r_m r_n, L_2}^{s_i s_j} \lambda_{NL}$$

where $(AMB)_{r_m, RC}^{s_i *}$, $(AMB)_{r_m, RC}^{s_j *}$, $(AMB)_{r_n, RC}^{s_i *}$, $(AMB)_{r_n, RC}^{s_j *}$ are the modified RC float ambiguity state estimates from ZD Kalman filter 332 of the orbit solution module or the ZD Kalman filter 342 of the clock solution module 340.

Resolving Networked DD Ambiguities

The input to the DD ambiguity resolution process is a vector of all DD float network ambiguities, which is $\{\Delta \nabla \hat{N}_{r_m r_n, WL}^{s_i s_j}\}$ for DD wide-lane ambiguity resolution, and $\{\Delta \nabla \hat{N}_{r_m r_n, L_2}^{s_i s_j}\}$ for DD narrow-lane ambiguity resolution. Once the respective DD ambiguity resolution engine 370 resolves the ambiguities as fixed WL ambiguity vector $\{\Delta \nabla N_{r_m r_n, WL}^{s_i s_j}\}$ or fixed NL ambiguity vector $\{\Delta \nabla N_{r_m r_n, L_2}^{s_i s_j}\}$, the fixed ambiguity constraint is applied to the applicable ZD Kalman filter, as described above with reference to equation (71).

Initial Satellite Bias Estimation

Once some DD ambiguities are fixed, the initial satellite bias can be estimated (see FIG. 4A, 426, and FIGS. 5A and 5B, 528/528B) in an external filter, shown in FIG. 3C as satellite bias estimation module 380, which is separate from the main ZD Kalman filter 362. In some embodiments, the initial satellite bias estimation procedure includes the following operations.

A network of independent SD ambiguities is generated (382) based on the fixed DD ambiguities. For each fixed DD ambiguity $\Delta \nabla N_{r_m r_n}^{s_i s_j}$, a pair of SD ambiguities can be obtained from the ZD Kalman filter 362, using Equation (32) for the $\{\nabla \hat{N}_{r_m}^{s_i s_j}, \nabla \hat{N}_{r_n}^{s_i s_j}\}$ preprocessor module's ZD Kalman filter 322, or Equation (47) for ZD Kalman filter 332 or 342 of the orbit solution module 330 or clock solution module 340, respectively. The formed SD ambiguities $\{\nabla \hat{N}_{r_m}^{s_i s_j}, \nabla \hat{N}_{r_n}^{s_i s_j}\}$ are float ambiguities, while the associated DD ambiguities $\Delta \nabla N_{r_m r_n}^{s_i s_j}$ are fixed (i.e., integer) ambiguities. As explained above, important properties of the pair of SD ambiguities $\{\nabla \hat{N}_{r_m}^{s_i s_j}, \nabla \hat{N}_{r_n}^{s_i s_j}\}$ are that their fractional parts are equal and their variances are the same, as explained above with reference to equation (63). The fractional part of each SD ambiguity value $\lfloor \nabla \hat{N}_r^{s_i s_j} \rfloor$ is formed primarily from the corresponding satellite biases, and in some embodiments the value of the fractional part of each SD ambiguity value $\lfloor \nabla \hat{N}_r^{s_i s_j} \rfloor$ is used to determine the initial satellite bias estimate for each satellite.

Among the network of SD ambiguities, an SD ambiguity datum is determined (384), as described above. Once the SD ambiguity datum is established, the SD ambiguity datum is weighed heavily in the satellite bias filter measurement update. In particular, the initial estimate of the satellite biases (386), as determined by the satellite bias estimation module 380, satisfies:

$$[\nabla \hat{N}_{r_m}^{s_i s_j}] = \hat{b}^{s_i} - \hat{b}^{s_j}, \sigma_z^2 = 0.0001 \tag{89}$$

where $\hat{b}^{s_i}$ and $\hat{b}^{s_j}$ are satellite bias state variables of the satellite bias estimation module 380. The Kalman filter measurement update starts from the SD ambiguity corresponding to the largest cluster weights and smallest measurement noise.

For a constellation of n satellites, the number of independent SD satellite biases is n−1. Stated another way, the system has sufficient information to resolve n−1 of the n satellite biases. In order to obtain a ZD satellite bias for each individual satellite, an additional constraint is applied (387) by setting the sum of all the satellite biases to zero:

$$\sum_{i=1}^{n} \hat{b}^{s_i} = 0 \tag{90}$$

$$\sigma_z^2 = 1.0$$

In some embodiments, this constraint is a loose constraint, because measurement noise is set to 1 cycle. The loose constraint does not cause abrupt bias value changes as a new satellite bias state is added or an old satellite bias state become obsolete, but it does drive the sum of the satellite biases to zero.

In some embodiments, after estimates of the satellite biases have been generated (386, 387), a next step is to adjust the satellite biases (e.g., by over-range handling module 388), so that each satellite bias does not exceed a predefined range, as discussed in more detail below.

After over-range handling (e.g., by over-range handling module 388), the satellite bias estimates are assigned to the satellite bias state of the ZD Kalman filter 362, and all the float ambiguities associated with each satellite bias estimate are adjusted by subtracting the same bias estimate. For satellite WL bias, this is represented by:

$$b_{WL}^{s_i} = \hat{b}^{s_i} \tag{91}$$

where $b_{WL}^{s}$ is the satellite WL bias state of the preprocessor module's ZD Kalman filter (see equation (30), above). For satellite NL bias, this is represented by:

$$b_{NL}^{s_i} = \hat{b}^{s_i} \tag{92}$$

where $b_{NL}^{s}$ is the satellite NL bias state of the ZD Kalman filter in the orbit solution module 330 or clock solution module 340 (see equation (51), above).

Satellite Bias Over-Range Adjustment

As part of the satellite correction information sent to navigation receivers, satellite WL bias and NL bias are encoded into a message and broadcast to the navigation receivers. Since the satellite bias correction message is encoded into a fixed number of bits, each satellite bias value must be bounded within a predefined range, typical in units of cycles, such as (−2, 2). The reason for choosing the range (−2, 2) is that a 2-cycle wide-lane bias corresponds to nine narrow-lane cycles for GLONASS and approximately 9.06 narrow-lane cycles for GPS. Hence there is no phase bias change needed for the GLONASS satellite constellation and a small (approximately 0.06 cycle) phase bias adjustment for the GPS satellite constellation when the value of a satellite WL bias is increased or decreased by 2, and the corresponding integer WL ambiguities are decreased or increased by 2. When a respective satellite bias value is updated and as a result have a value outside the predefined range, a series of over-range handling operations are performed. In particular, the satellite bias is adjusted by an integer amount (e.g., 2) so that it falls within the predefined range, and all the ambiguities related to the satellite for which the satellite bias is being adjusted are adjusted accordingly (e.g., by subtracting the same adjustment amount added to the satellite bias). In some embodiments, if the bias being adjusted is a satellite WL bias, the corresponding satellite NL bias and all associated WL and NL ambiguities are also adjusted.

The satellite bias over-range adjustment procedure described below is applicable to both satellite WL bias and satellite NL bias over-range adjustment. In some embodiments, the satellite bias over-range adjustment procedure is performed by a sub-module, over-range handling module 388, of satellite bias estimate module 380. However, in some other embodiments, over-range handling module 388 is integrated into the ZD Kalman filter 362 of each module 330, 340, 350. In yet other embodiments, both satellite bias estimate module 380 and ZD Kalman filter 362 include instructions for performing over-range handling. It is noted that, in all of these embodiments, range constraints and over-range handling are applied both to the initial satellite bias estimates generated by satellite bias estimation module 380, and to updated satellite bias values generated by ZD Kalman filter 362.

From the solution input/output perspective, the preprocessor module 320 outputs satellite WL bias and fixed WL ambiguities for respective reference receivers, which are used as inputs to both the orbit solution module 330 and clock solution module 340. When the preprocessor module 320 adjusts the satellite WL for a respective satellite bias, because it falls outside a predefined range of values, both the orbit solution module and clock solution module also perform a bias over-range adjustment, as discussed in more detail below.

For each satellite, bias consistency is maintained and carried through all solutions from the preprocessor module, through the orbit solution module, to the clock solution module. In the following explanation of satellite bias over-range adjustment, the following terminology and notation is used:

$b_{MPP}^{s}$ refers to the satellite bias produced by preprocessor module for satellite s, where MPP stands for measurement preprocessor (preprocessor module 320), and $b_{OC}^{s}$ refers to the satellite bias currently used in the orbit solution module 330 or clock solution module 340.

The satellite biases are handled in two levels: system network bias and measurement bias, as follows:

System network bias is the uniform bias across the global network in a specific solution, such as a particular solution determined by the preprocessor module, the orbit solution module or the clock solution module, with a subscript notation as $b_{SYS}^{s}$. It will be referred as network bias.

Measurement bias is the satellite bias associated with a specific ambiguity measurement, for a specific reference receiver r. Measurement bias has a subscript notation as $b_{r,MEAS}^{s}$.

Figure 9:
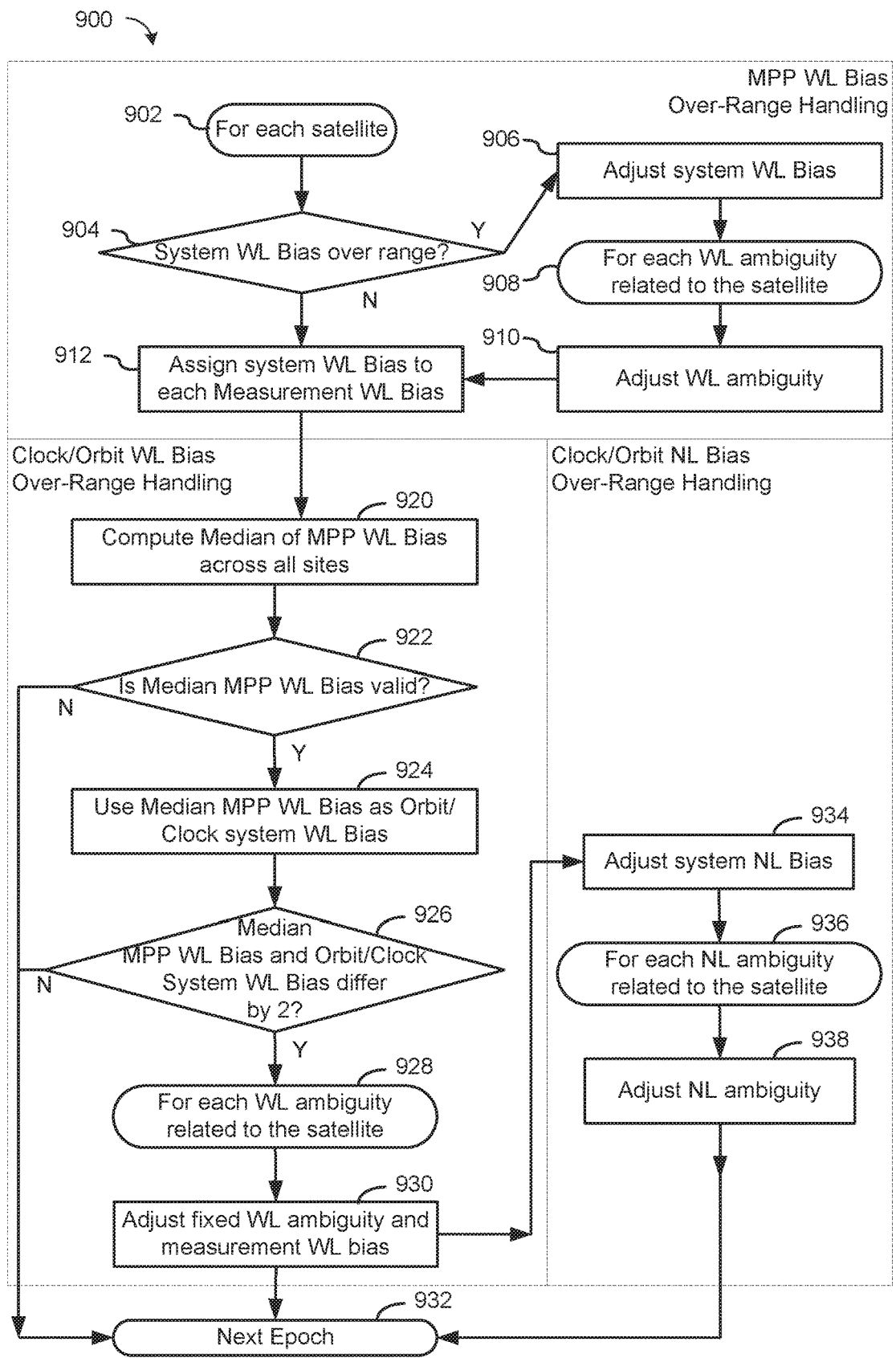
FIG. 9 is a flow chart of a process for adjusting wide-lane and narrow-lane biases and ambiguities when predefined over-range criteria are met, according to some embodiments.

As shown in FIG. 9, over-range handling (process 900) starts with satellite WL bias over-range handling by the preprocessor module (MPP) 320, followed by orbit/clock solution WL bias over-range handling by the orbit solution module 330 and clock solution module 340, and then orbit/clock solution NL bias over-range handling by the orbit solution module 330 and clock solution module 340.

Preprocessor satellite WL Bias Over-Range Handling

In some embodiments, for each satellite s, over-range handling module 388 of preprocessor module 320 handles satellite biases that are outside the predefined range (902, 904), sometimes herein called bias over-ranges, in two levels, the network level and the measurement level. In particular, if the preprocessor network level bias, $b_{WL\_MPP\_SYS}^s$, for satellite s is over-range (i.e., outside the predefined range allowed for bias values) (904-Yes), an adjustment is made (906) to the network bias as follows:

$$b_{WL\_MPP\_SYS,adj}^s = b_{WL\_MPP\_SYS}^s - \text{round}(b_{WL\_MPP\_SYS}^s) \quad (93)$$

and an adjustment is made (908, 910) for each satellite s related ambiguity $N_{r,WL}^s$ as follows:

$$N_{r,WL,adj}^s = N_{r,WL}^s + \text{round}(b_{WL\_MPP\_SYS}^s) \quad (94)$$

In addition, for each measurement ambiguity related to satellite s, the adjusted network level bias $b_{WL\_MPP\_SYS,adj}^s$ is assigned (912) to the corresponding measurement bias for each reference receiver r that is in view of satellite s (or, more specifically, that is reporting measurements of signals from satellite s to the preprocessor system 300-A), as follows:

$$b_{r,WL\_MPP\_MEAS}^s = b_{WL\_MPP\_SYS,adj}^s \quad (95)$$

Otherwise, if $b_{WL\_MPP\_SYS}^s$ is within the predefined range for bias values (904-No), for each measurement related to satellite s, the network bias $b_{WL\_MPP\_SYS}^s$ is assigned (912), without adjustment, to the corresponding measurement bias, as follows:

$$b_{r,WL\_MPP\_MEAS}^s = b_{WL\_MPP\_SYS}^s \quad (96)$$

As explained above with reference to equation (31), each such measurement bias is treated by the MPP ZD Kalman filter 322 as part of the ZD float WL ambiguity state variable $(AMB)_{r,WL}^s$ for the respective reference receiver r, and that state variable is updated at a predefined rate (e.g., once per minute) by MPP ZD Kalman filter 322.

The outputs of the preprocessor module are a vector set of the fixed WL ambiguities $\{N_{r,WL}^s\}$ and associated measurement level WL biases $b_{WL\_MPP\_MESA}^s = \{b_{r,WL\_MPP\_MEAS}^s\}$.

Orbit/Clock Solution Satellite WL and NL Bias Over-Range Handling

In the orbit solution module 330 and clock solution module 340, bias consistency is handled as follows. A median value of all the measurement level preprocessor WL biases (for a particular satellite s, with respect to all reference receivers reporting measurements of navigation signals received from satellite s) is computed (920):

$$b_{WL\_MPP\_MEAS\_MEDIAN}^s = \text{median}(b_{WL\_MPP\_MEAS}^s) \quad (97)$$

and the resulting median WL bias is checked to see if it is valid (922). In particular, if the variance of $b_{WL\_MPP\_MEAS\_MEDIAN}^s$ is within specific threshold, for example $$\sigma_{b_{WL\_MPP\_MEAS\_MEDIAN}^s}^2 < c \quad (98)$$

it is regarded as valid and is used (924) as the new system network bias in the orbit solution module or clock solution module:

$$b_{WL\_OC\_SYS}^s = b_{WL\_MPP\_MEAS\_MEDIAN}^s \quad (99)$$

Otherwise, if the median value of all the measurement level preprocessor WL biases (for a particular satellite s) is determined not to be valid, there is no valid WL bias for satellite s in the orbit solution module 330 or clock solution module 340, and the determination of the satellite WL bias for satellite s, by the orbit solution module 330 or clock solution module 340 resumes in next epoch (932), and all the following steps of the over-range handling process are skipped for satellite s.

Next, if the median preprocessor WL bias $b_{WL\_MPP\_MEAS\_MEDIAN}^s$ and the current orbit/clock solution network WL bias $b_{WL\_OC\_SYS}^s$ differ by 2 WL integer cycles (926), as defined by:

$$\text{round}(|b_{WL\_MPP\_MEAS\_MEDIAN}^s - b_{WL\_OC\_NETWORK}^s|) \geq 2 \quad (100)$$

an over-range adjustment will be performed for both the WL bias (928, 930) and the corresponding NL bias (934, 936, 938). The over-range adjustment performed for the WL bias includes, for each measurement related to satellite s, update its corresponding WL ambiguity as follow:

$$N_{r,WL,adj}^s = N_{r,WL}^s - \text{round}(b_{WL\_MPP\_MEAS}^s - b_{WL\_OC\_SYS}^s) \quad (101)$$

and setting the associated measurement level wide-lane bias to the newly determined orbit solution or clock solution system bias, as follows:

$$b_{r,WL\_MPP\_MEAS}^s = b_{WL\_OC\_SYS}^s \quad (102)$$

The over-range adjustment for the NL bias is as follows. If the WL bias is adjusted by 2 WL cycles, the corresponding NL bias $b_{NL}^s$ is adjusted by a small amount (e.g., by approximately 0.0588 NL cycle) if the satellites for which biases are being determined are GPS satellites, and need not adjusted at all if the satellites for which biases are being determined are GLONASS satellites. If there is NL bias change for satellite s in the amount of $\delta b_{NL}^s$, all the satellite related NL ambiguities need be adjusted to compensate for the NL bias adjustment as follows:

$$N_{r,NL}^s = N_{r,NL}^s - \delta b_{NL}^s \quad (103)$$

In some embodiments, independent of any over-range adjustments made to satellite WL biases, satellite NL biases (denoted as $b_{NL}^s$ for satellite s), as determined by the orbit solution module 330 and clock solution module 340, are also limited to a predefined range, such as (−2, 2), and when any of the satellite NL biases fall outside the predefined range, those satellite NL biases (including updated satellite NL biases generated by the orbit ZD Kalman filter 322 of orbit solution module 330 and the clock ZD Kalman filter 342 of clock solution module 340) are adjusted by a predefined value (e.g., round($b_{NL}^s$)), for example $$b_{NL,adj}^s = b_{NL}^s - \text{round}(b_{NL}^s),$$

which is typically equal to 2 or −2, and a corresponding adjustment is made for each satellite s related ambiguity $N_{r,NL}^s$, as follows:

$$N_{r,NL,adj}^s = N_{r,NL}^s + \text{round}(b_{NL}^s)$$

Thus, range constraints 387 and over-range handling 388 (FIG. 3C) are applied to both initial estimates of satellite narrow-lane biases generated by satellite bias estimation module 380 (i.e., satellite bias estimation module 336 of orbit solution module 330 and satellite bias estimation module 346 of clock solution module 340), and to updated satellite narrow-lane biases generated by ZD Kalman filter 362 (e.g., ZD Kalman filter 322 of orbit solution module 330 and the clock ZD Kalman filter 342 of clock solution module 340).

Initial Satellite Wide-Lane Bias Determination

FIG. 4 is a flowchart of a process 400 (also herein called method 400) for determining satellite wide-lane (WL) biases for a plurality of satellites, comprising n satellites, to facilitate navigation by navigation receivers that receive satellite navigation signals from various subsets of the plurality of satellites. FIG. 4A is a flowchart of a process 400A for resolving wide-lane double-difference and single-difference ambiguities in a measurement preprocessor module (e.g., module 320), and providing those solutions to orbit, clock and low latency clock modules (see FIGS. 3A and 3B), according to some embodiments. Process 400 and 400A are related, with process 400 concerning wide-lane bias determination, and process 400A concerning operation of measurement preprocessor module 320 to resolve wide-lane ambiguities and provide those solutions to the other modules (e.g., orbit, clock and low latency clock modules).

Method 400 and 400A both include receiving (402) reference receiver measurement information, including receiving, from a plurality of reference receivers (e.g., reference receivers 140, FIG. 1) at established locations, measurements of satellite navigation signals received by each of the reference receivers, wherein the satellite navigation signals received by each reference receiver of the plurality of reference receivers include satellite navigation signals at first (L1) and second (L2) frequencies. Typically, each reference receiver receives signals from at least four or five satellites that are within view of the reference receiver's GNSS antenna (e.g., antenna 260, FIG. 2). As shown in FIG. 4A, in process 400A, the received values are used to update (420), for a next epoch, the measurement preprocessor's zero-difference (ZD) filter, and in particular the ZD wide-lane float ambiguities for each reference receiver and the ZD wide-land satellite biases. For systems using signals from GLONASS satellites, the wide-lane inter-frequency bias (IFB) for each receiver is updated for the next epoch using the received measurements of satellite navigation signals.

Method 400 includes, in accordance with the received reference receiver measurement information, and in accordance with the established locations of the plurality of reference receivers, determining (404) initial wide-lane navigation solutions for the plurality of reference receivers. For example, as discussed above, in some embodiments (and typically) the Melbourne-Wübbena linear combination $L_{r,WL}^s$ is used for wide-lane ambiguity resolution. As shown in FIG. 4A, the Melbourne-Wübbena linear combination is updated (422) by the ZD filter of preprocessor module (MPP) 320, using the received measurements of satellite navigation signals.

The initial wide-lane navigation solutions include double-difference (DD) wide-lane fixed integer ambiguity values and single-difference (SD) wide-lane floating ambiguities. Further, in accordance with the initial wide-lane navigation solutions, for a constellation of n satellites in the plurality of satellites, method 400 includes determining (408) m clusters of single-difference (SD) wide-lane floating ambiguities, where m is an integer greater than one (see also FIG. 4A, 428). Each cluster of SD wide-lane ambiguity values comprises pairs of SD wide-lane floating ambiguities, $\nabla \hat{N}_{r_m}^{S_i S_j}$ and $\nabla \hat{N}_{r_n}^{S_i S_j}$ for a respective pair of satellites (e.g., satellites i and j). Each pair of SD wide-lane floating ambiguities includes first and second SD wide-lane floating ambiguities for a first reference receiver, $r_m$, and a second receiver, $r_n$, respectively, that receive satellite navigation signals from both satellites in the respective pair of satellites. Furthermore, the SD wide-lane floating ambiguities in each pair of SD floating ambiguities have equal fractional portions, $\lfloor \nabla \hat{N}_{r_m}^{S_i S_j} \rfloor = \lfloor \nabla \hat{N}_{r_n}^{S_i S_j} \rfloor$. For example, see the above discussions concerning ambiguity clusters, and SD ambiguity datum determination.

Method 400 also includes, determining (412) an initial satellite wide-lane bias value, $b_{WL}^s$, for each satellite s of the n satellites, in accordance with fractional portions of the SD wide-lane floating ambiguities in the m clusters. For example, see the above discussion of satellite bias estimation.

Furthermore, method 400 includes, in accordance with the determined initial satellite wide-lane bias value, $b_{WL}^s$, for each satellite s of the n satellites, generating (415) updated wide-lane navigation solutions for the plurality of reference receivers, including SD wide-lane fixed integer ambiguity values for the plurality of reference receivers. For example, as explained above, in some embodiments, MPP ZD Kalman filter 322 of preprocessor module 320 generates updated satellite wide-lane bias values and wide-lane navigation solutions at predefined intervals, often called epochs, using the initial satellite wide-lane bias values and initial wide-lane navigation solutions as initial values (e.g., as initial values for state variables corresponding to the DD wide-lane ambiguities and satellite wide-lane bias values).

Further, method 400 includes generating (416) a set of navigation satellite corrections for each satellite of the n satellites, the set of navigation satellites corrections for each satellite s including a correction corresponding to the satellite wide-lane bias value, $b_{WL}^s$, determined for satellite s wherein the sets of navigation satellite corrections for the n satellites are for transmission to navigation receivers for use in determining locations of the navigation receivers.

In some embodiments, the sets of navigation satellite corrections for the n satellites are for transmission to navigation receivers for use in determining locations of the navigation receivers using an absolute mode of navigation, such as precise point positioning (PPP). Furthermore, in some embodiments, method 400 includes transmitting the generated set of navigation satellite corrections for each satellite of the n satellites via one or more communication networks to navigation receivers for use in determining current locations of the navigation receivers using an absolute mode of navigation.

In some embodiments, method 400A, performed by orbit solution system 300-B, includes, combining raw GNSS measurements with information regarding detected phase slips and code outliers (i.e., clean GNSS measurements), resolved WL ambiguities (e.g., SD fixed ambiguities) in the MPP ZD filter 322, and the generated satellite WL biases, and sends the combined information to orbit, clock and (optionally) low-latency clock systems 300-B, 300-C, and 300-D, or orbit solution, clock solution and low latency clock solution modules 330, 340 and 350.

In some embodiments, the number of clusters (see discussion of operations 408, 412, above), m, is equal to n −1, the satellite wide-lane bias value, $b_{WL}^s$, for each satellite s is a wide-lane phase bias value, and determining n−1 clusters of single-difference (SD) ambiguity values includes determining a set of fixed wide-lane double-difference (DD) ambiguity values with respect to the reference receivers and the plurality of satellites, each fixed wide-lane DD ambiguity value corresponding to a pair of the reference receivers and a pair of the satellites in the plurality of satellites. Further, each pair of SD wide-lane floating ambiguities, $\nabla \hat{N}_{r_m}^{S_i S_j}$ and $\nabla \hat{N}_{r_n}^{S_i S_j}$ for a pair of satellites $S_i$ and $S_j$ corresponds to a respective DD wide-lane fixed ambiguity value in the determined set of DD wide-lane fixed ambiguity values.

In some embodiments, determining (404) the initial set of fixed wide-lane DD ambiguity values with respect to the reference receivers and the plurality of satellites includes performing (406) an iterative process of removing respective float wide-lane ambiguities from a set of potentially fixable float wide-lane DD ambiguities in accordance with pre-defined criteria for identifying problematic float wide-lane DD ambiguities, until a remaining set of potentially fixable float wide-lane DD ambiguities satisfies predefined validation criteria. For example, see the above discussions of the LAMBDA search process, the partial LAMBDA search process, and identifying and removing problematic ambiguity elements.

In some embodiments, method 400 further includes periodically determining an updated set of fixed wide-lane double-difference (DD) ambiguity values with respect to the reference receivers and the plurality of satellites, and determining updates to the determined satellite wide-lane bias values for the n satellites in accordance with updated set of fixed wide-lane DD ambiguity values. For example, as described above, computations by preprocessor module 320 are repeated or updated periodically, during successive time intervals sometimes called epochs.

In some embodiments of method 400, determining a satellite wide-lane bias value, $b_{WL}^s$, for a respective satellite includes determining a median satellite wide-lane bias value from a set of satellite wide-lane bias values, determining whether a corresponding variance meets predefined criteria, and in accordance with a determination that the variance meets the predefined criteria, setting the satellite wide-lane bias value, $b_{WL}^s$, to the determined median satellite wide-lane bias value. For example, see the above discussion of over-range handling for satellite WL biases in the orbit solution module 330 and clock solution module 340.

In some embodiments, method 400 includes applying (414) an over-range adjustment to a respective satellite wide-lane bias value if the respective satellite wide-lane bias value meets predefined over-range adjustment criteria. For example, in some such embodiments, determining (412) a satellite wide-lane bias value, $b_{WL}^s$, for a respective satellite includes determining whether the satellite wide-lane bias value meets over-range adjustment criteria, and in accordance with a determination that the satellite wide-lane bias value meets the over-range adjustment criteria, adjusting the satellite wide-lane bias value by a predefined number of wide-lane cycles, and adjusting corresponding SD wide-lane ambiguity values by the predefined number of wide-lane cycles. For example, as explained above with respect to preprocessor satellite WL bias over-range handling, when a respective satellite WL bias value falls outside a predefined range, such as (−2, 2), the satellite WL bias value is decreased by an amount represented by $$\text{round}(b_{WL\_MPP\_SYS}^s),$$

which is typically equal to 2 or −2, and an corresponding adjustment is made for each satellite s related ambiguity $N_{r,WL}^s$ by adding the same amount.

In some embodiments of method 400, determining (412) the initial satellite wide-lane bias value, $b_{WL}^s$, for each satellite s of the n satellites includes comparing the determined satellite wide-lane bias value for each satellite s of the n satellites with a corresponding satellite wide-lane bias value determined when generating orbit and clock corrections for the n satellites, and adjusting the determined satellite wide-lane bias value for a respective satellite by an integer number of wide-lane cycles when an absolute value of a difference between the determined satellite wide-lane bias value and the corresponding satellite wide-lane bias value exceeds a predefined threshold. For example, see the above discussion of over-range handling for satellite WL biases in the orbit solution module 330 and clock solution module 340.

In some embodiments, determining the satellite wide-lane bias value, $b_{WL}^s$, for each satellite s of the n satellites includes the setting the satellite wide-lane bias values for the n satellites such that a sum of the satellite wide-lane bias values for the n satellites is equal to zero. For example, see the above discussion concerning satellite bias estimation.

In some embodiments, the plurality of satellites are GLONASS satellites, which each transmit satellite navigation signals on first and second frequencies, L1 and L2, wherein different ones of the GLONASS satellites transmit satellite navigation signals in different first and second frequency bands, L1 and L2, wherein each GLONASS satellite s transmits a first satellite navigation signal with a center frequency $f_{L_1}^s$ in the L1 band of $$f_{L_1}^s = 1602 \text{ MHz} + n^s \times 0.5625 \text{ MHz}$$

and a second satellite navigation signal with a center frequency $f_{L_2}^s$ in the L 2 band of $$f_{L_2}^s = 1246 \text{ MHz} + n^s \times 0.4375 \text{ MHz}$$

where $n^s$ is a frequency channel number assigned to satellite s, and the frequency channel number assigned to each satellite has an integer value between −7 and +6, inclusive. In such embodiments, method 400 includes determining, for each reference receiver in at least a subset of the plurality of reference receivers, a wide-lane inter-frequency bias (IFB) coefficient $k_r$, and for each satellite for which measurements of satellite navigation signals are received from the reference receiver, an inter-frequency bias value corresponding to a product of the wide-lane inter-frequency bias (IFB) coefficient $k_r$ for the reference receiver multiplied by the frequency channel number assigned to satellite s. Furthermore, in such embodiments, the satellite wide-lane bias value, $b_{WL}^s$, for each satellite s of the n satellites is determined in accordance with the inter-frequency bias values determined for at least a subset of the reference receivers.

In another aspect, a system, such as satellite corrections generation system 130, described above with respect to FIGS. 3A, 3B and 3C, includes a plurality of interconnected computer systems that are configured to, collectively, execute a plurality of navigation satellite correction modules, which causes the plurality of navigation satellite correction modules to perform method 400.

In yet another aspect, a non-transitory computer readable storage medium (e.g., memory 310 of satellite corrections processor systems 300) stores one or more programs for execution by one or more processors of a plurality of interconnected computer systems. The one or more programs include instructions that when executed by the one or more processors of the system cause the system to perform method 400.

Satellite Wide-Lane Bias Determination and Over-Range Adjustment

In some embodiments, a process for determining satellite wide-lane (WL) biases for a plurality of satellites, comprising n satellites, to facilitate navigation by navigation receivers that receive satellite navigation signals from various subsets of the plurality of satellites includes receiving (402, FIG. 4) reference receiver measurement information, including receiving, from a plurality of reference receivers (e.g., reference receivers 140, FIG. 1) at established locations, measurements of satellite navigation signals received by each of the reference receivers, wherein the satellite navigation signals received by each reference receiver of the plurality of reference receivers include satellite navigation signals at first (L1) and second (L2) frequencies. Typically, each reference receiver receives signals from at least four or five satellites that are within view of the reference receiver's GNSS antenna (e.g., antenna 260, FIG. 2).

The process includes, in accordance with the received reference receiver measurement information, and in accordance with the established locations of the plurality of reference receivers, determining (404) refraction-corrected wide-lane navigation solutions for the plurality of reference receivers. For example, as discussed above, the Melbourne-Wübbena linear combination $L_{r,WL}^s$ can be used for wide-lane ambiguity resolution.

In accordance with the wide-lane navigation solutions, for a constellation of n satellites in the plurality of satellites, the process includes determining m clusters of single-difference (SD) wide-lane ambiguity values, where m is an integer greater than one, and determining a satellite wide-lane bias value, $b_{WL}^s$, for each satellite s of the n satellites, in accordance with fractional portions of the SD wide-lane floating ambiguities in the m clusters.

Further, in this process, determining a satellite wide-lane bias value, $b_{WL}^s$, for a respective satellite includes determining whether the satellite wide-lane bias value meets over-range adjustment criteria (414), and in accordance with a determination that the satellite wide-lane bias value meets the over-range adjustment criteria, adjusting the satellite wide-lane bias value by a predefined number of wide-lane cycles, and adjusting corresponding SD wide-lane ambiguity values by the predefined number of wide-lane cycles. For example, see the above discussion of over-range handling for satellite WL biases in preprocessor module 320, orbit solution module 330 or clock solution module 340.

The process also includes generating a set of navigation satellite corrections for each satellite of the n satellites, the set of navigation satellites corrections for each satellite s including a correction corresponding to the satellite wide-lane bias value, $b_{WL}^s$, determined for satellite s. The sets of navigation satellite corrections for the n satellites are for transmission to navigation receivers for use in determining locations of the navigation receivers.

In some embodiments of the process, determining the satellite wide-lane bias value, $b_{WL}^s$, for each satellite s of the n satellites includes comparing the determined satellite wide-lane bias values for each satellite s of the n satellites with a corresponding satellite wide-lane bias value determined when generating orbit and clock corrections for the n satellites, and adjusting the determined satellite wide-lane bias value for a respective satellite by an integer number of wide-lane cycles when an absolute value of a difference between the determined satellite wide-lane bias value and the corresponding satellite wide-lane bias value exceeds a predefined threshold.

In some embodiments of the process, determining the satellite wide-lane bias value, $b_{WL}^s$, for each satellite s of the n satellites includes the setting the satellite wide-lane bias values for the n satellites such that a sum of the satellite wide-lane bias values for the n satellites is equal to zero.

In some embodiments, the sets of navigation satellite corrections for the n satellites are for transmission to the navigation receivers for use in determining locations of the navigation receivers using an absolute mode of navigation. And in some embodiments, the process includes transmitting the generated set of navigation satellite corrections for each satellite of the n satellites via one or more communication networks to navigation receivers for use in determining current locations of the navigation receivers using an absolute mode of navigation.

In some embodiments, the process further includes determining n−1 clusters of single-difference (SD) wide-lane ambiguity values, wherein the satellite wide-lane bias value, $b_{WL}^s$, for each satellite s is a wide-lane phase bias value, each cluster of SD wide-lane ambiguity values comprises pairs of SD wide-lane floating ambiguities, $\nabla \hat{N}_{r_m}^{S_iS_j}$ and $\nabla \hat{N}_{r_n}^{S_iS_j}$ for a respective pair of satellites, and each pair of SD wide-lane floating ambiguities comprises first and second SD wide-lane floating ambiguities for a first reference receiver, $r_m$, and a second receiver, $r_n$, respectively, that receive satellite navigation signals from both satellites in the respective pair of satellites. Furthermore, determining n−1 clusters of single-difference (SD) ambiguity values includes determining a set of fixed wide-lane double-difference (DD) ambiguity values with respect to the reference receivers and the plurality of satellites, each fixed wide-lane DD ambiguity value corresponding to a pair of the reference receivers and a pair of the satellites in the plurality of satellites.

In some embodiments of the process, determining the set of fixed wide-lane DD ambiguity values with respect to the reference receivers and the plurality of satellites includes performing an iterative process of removing respective float wide-lane ambiguities from a set of potentially fixable float wide-lane DD ambiguities in accordance with predefined criteria for identifying problematic float wide-lane DD ambiguities, until a remaining set of potentially fixable float wide-lane DD ambiguities satisfies predefined validation criteria.

In some embodiments, the process further includes periodically determining an updated set of fixed wide-lane double-difference (DD) ambiguity values with respect to the reference receivers and the plurality of satellites, and determining updates to the determined satellite wide-lane bias values for the n satellites in accordance with updated set of fixed wide-lane DD ambiguity values.

In some embodiments of the process, determining a satellite wide-lane bias value, $b_{WL}^s$, for a respective satellite includes determining a determining a median satellite wide-lane bias value from a set of satellite wide-lane bias values, determining whether a corresponding variance meets predefined criteria, and in accordance with a determination that the variance meets the predefined criteria, setting the satellite wide-lane bias value, $b_{WL}^s$, to the determined median satellite wide-lane bias value.

In some embodiments of the process, the plurality of satellites are GLONASS satellites. In such embodiments, the process includes determining, for each reference receiver in at least a subset of the plurality of reference receivers, a wide-lane inter-frequency bias (IFB) coefficient $k_r$, and for each satellite for which measurements of satellite navigation signals are received from the reference receiver, an inter-frequency bias value corresponding to a product of the wide-lane inter-frequency bias (IFB) coefficient $k_r$ for the reference receiver multiplied by the frequency channel number assigned to satellite s. Furthermore, in such embodiments, the satellite wide-lane bias value, $b_{WL}^s$, for each satellite s of the n satellites is determined in accordance with the inter-frequency bias values determined for at least a subset of the reference receivers.

In another aspect, a system, such as satellite corrections generation system 130, described above with respect to FIGS. 3A, 3B and 3C, includes a plurality of interconnected computer systems that are configured to, collectively, execute a plurality of navigation satellite correction modules, which causes the plurality of navigation satellite correction modules to perform the aforementioned process.

In yet another aspect, a non-transitory computer readable storage medium (e.g., memory 310 of satellite corrections processor systems 300) stores one or more programs for execution by one or more processors of a plurality of interconnected computer systems. The one or more programs include instructions that when executed by the one or more processors of the system cause the system to perform the aforementioned process.

Networked Satellite Narrow-Lane Bias Determination

Figure 5:
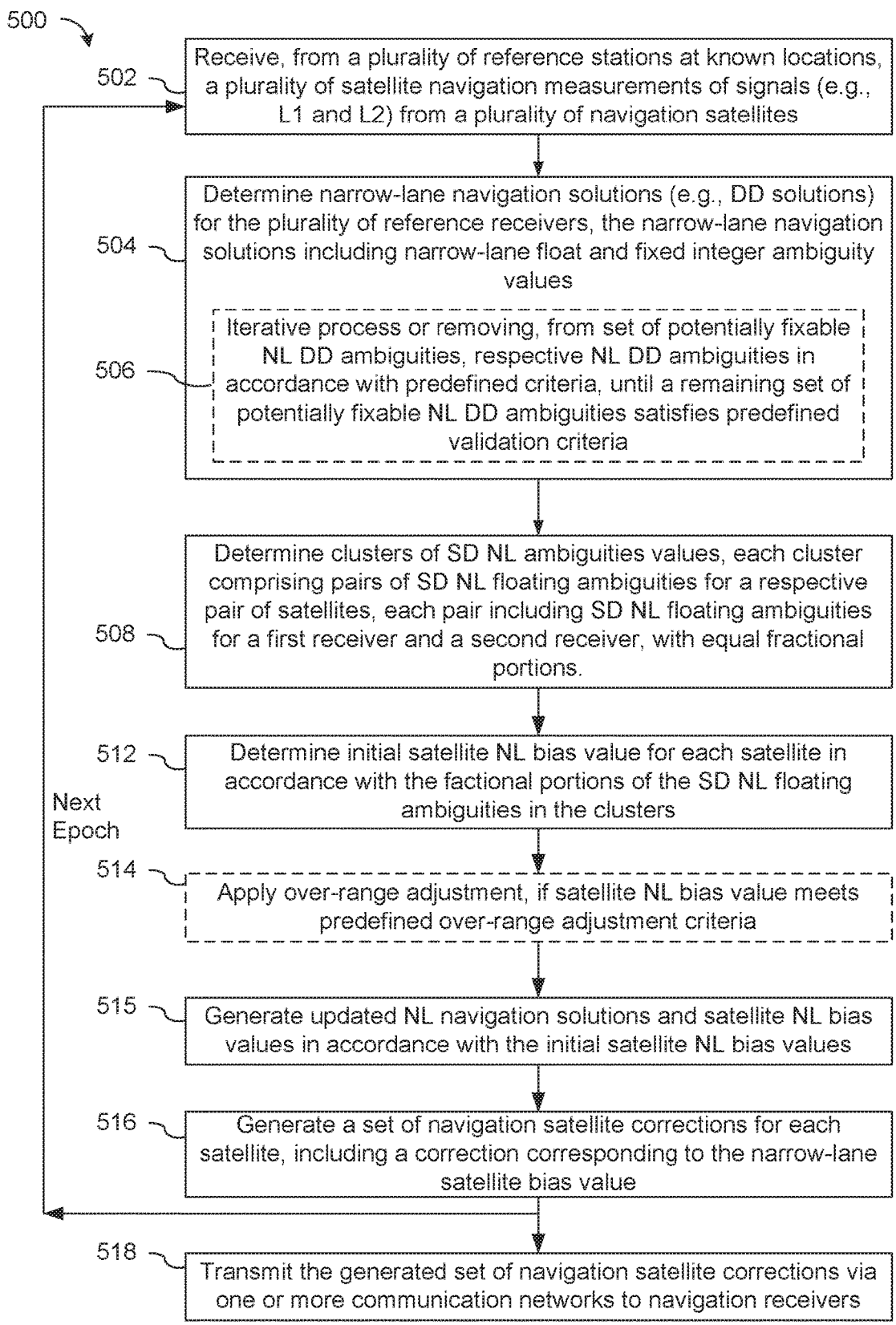
FIG. 5 is a flowchart of a process for generating navigation satellite corrections, include a correction corresponding to a satellite narrow-lane bias for each satellite in a plurality of satellites, and for providing the generated navigation satellite corrections to navigation receivers, according to some embodiments.
Figure 5A:
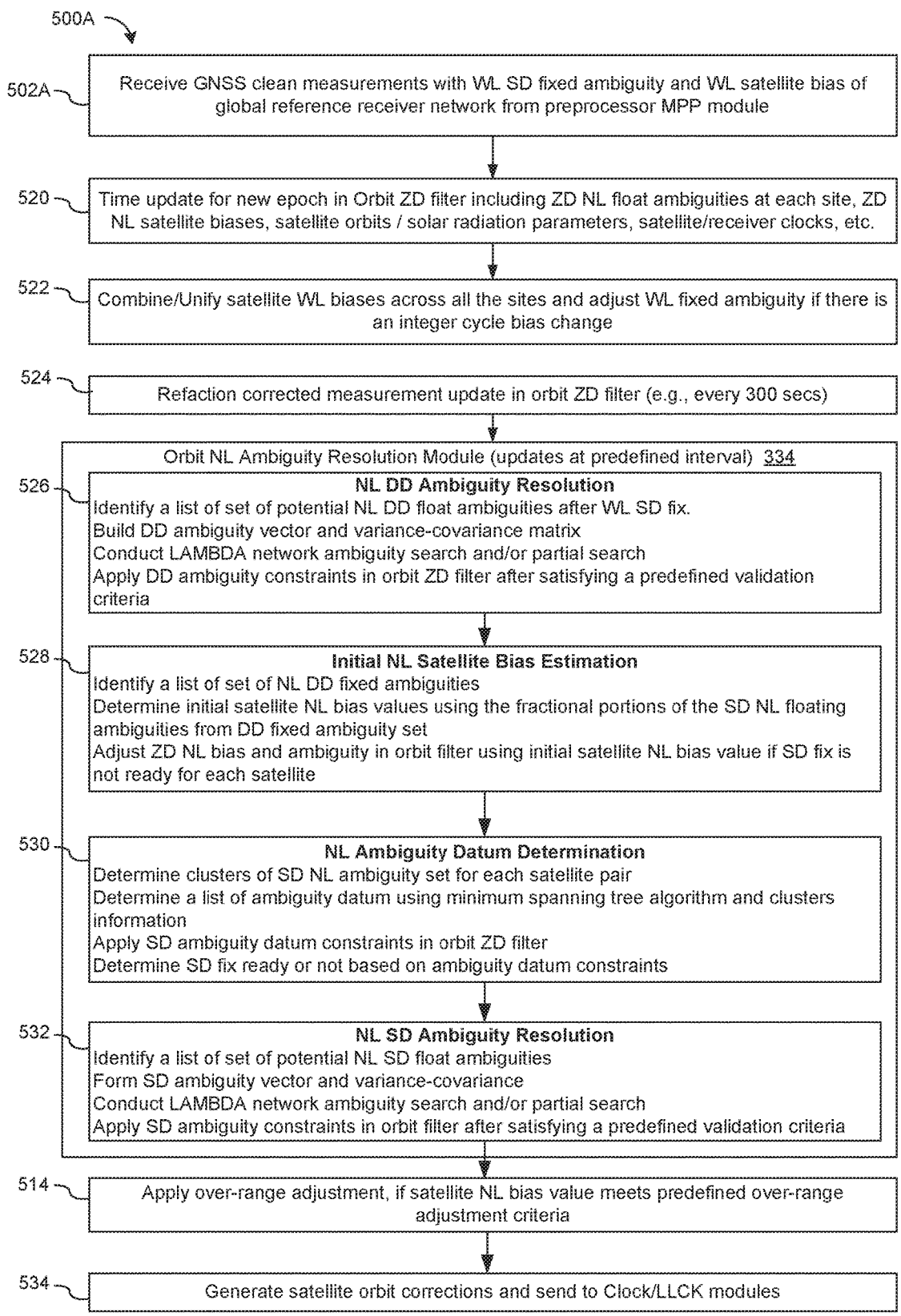
FIG. 5A is a flowchart of a process for resolving narrow-lane double-difference and single-difference ambiguities in an orbit narrow-lane ambiguity resolution module, and providing those solutions to clock and low latency clock modules, according to some embodiments.
Figure 5B:
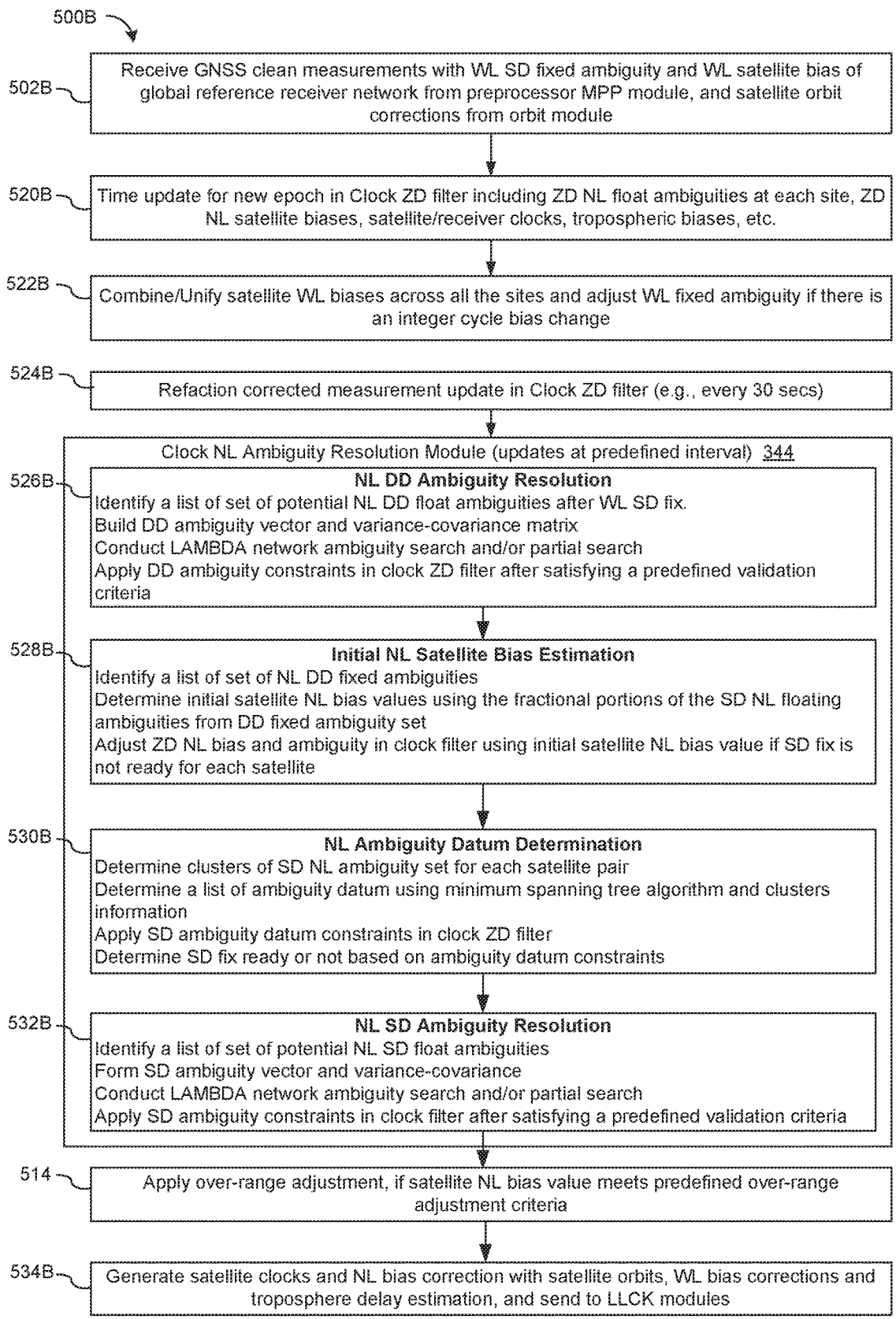
FIG. 5B is a flowchart of a process for resolving narrow-lane double-difference and single-difference ambiguities in a clock narrow-lane ambiguity resolution module, and providing those solutions to a low latency clock module, according to some embodiments.

FIG. 5 is a flowchart of a process 500 (also herein called method 500) for determining satellite narrow-lane (NL) biases for a plurality of satellites, comprising n satellites, to facilitate navigation by navigation receivers that receive satellite navigation signals from various subsets of the plurality of satellites. FIGS. 5A and 5B are flowcharts of related processes 500A and 500B, with method 500A concerning NL processing by orbit solution module 330, particularly NL DD and SD module 334, and method 500B concerning NL processing by clock solution module 340, particularly NL DD and SD module 344.

Method 500 includes receiving (502) reference receiver measurement information, including receiving, from a plurality of reference receivers (e.g., reference receivers 140, FIG. 1) at established locations, measurements of satellite navigation signals received by each of the reference receivers, wherein the satellite navigation signals received by each reference receiver of the plurality of reference receivers include satellite navigation signals at first (L1) and second (L2) frequencies. Typically, each reference receiver receives signals from at least four or five satellites that are within view of the reference receiver's GNSS antenna (e.g., antenna 260, FIG. 2).

In accordance with the received reference receiver measurement information, and in accordance with the established locations of the plurality of reference receivers, method 500 determines (504) an initial narrow-lane navigation solution for the plurality of reference receivers. The initial narrow-lane navigation solution includes double-difference (DD) narrow-lane fixed integer ambiguity values and single-difference (SD) narrow-lane floating ambiguities. For example, as discussed above, the Melbourne-Wübbena linear combination $L_{r,WL}^s$ can be used for wide-lane ambiguity resolution, after which narrow-lane ambiguities are resolved, consistent with the resolved wide-lane ambiguities.

Further, for a constellation of n satellites in the plurality of satellites, method 500 includes determining (508) m clusters of single-difference (SD) wide-lane floating ambiguities, where m is an integer greater than one (see also FIGS. 5A and 5B, 530/530B). Each cluster of SD wide-lane ambiguity values comprises pairs of SD narrow-lane floating ambiguities, $\nabla \hat{N}_{r_m}^{S_iS_j}$ and $\nabla \hat{N}_{r_n}^{S_iS_j}$ for a respective pair of satellites (e.g., satellites i and j). Each pair of SD narrow-lane floating ambiguities includes first and second SD wide-lane floating ambiguities for a first reference receiver, $r_m$, and a second receiver, $r_n$, respectively, that receive satellite navigation signals from both satellites in the respective pair of satellites. Furthermore, the SD narrow-lane floating ambiguities in each pair of SD floating ambiguities have equal fractional portions, $\lfloor \nabla \hat{N}_{r_m}^{S_iS_j} \rfloor = \lfloor \nabla \hat{N}_{r_n}^{S_iS_j} \rfloor$. For example, see the above discussions concerning ambiguity clusters, and SD ambiguity datum determination.

Method 500 also includes, determining (512) an initial satellite narrow-lane bias value, $b_{NL}^s$, for each satellite s of the n satellites, in accordance with fractional portions of the SD narrow-lane floating ambiguities in the m clusters. For example, see the above discussion of satellite bias estimation.

Furthermore, method 500 includes, in accordance with the determined initial satellite narrow-lane bias value, $b_{NL}^s$, for each satellite s of the n satellites, generating (515) updated narrow-lane navigation solutions for the plurality of reference receivers, including SD narrow-lane fixed integer ambiguity values for the plurality of reference receivers. For example, as explained above, in some embodiments, orbit ZD Kalman filter 332 of orbit solution module 330 and clock ZD Kalman filter 342 of clock solution module 340 generate updated satellite narrow-lane bias values and narrow-lane navigation solutions at predefined intervals, often called epochs, using the initial satellite narrow-lane bias values and initial narrow-lane navigation solutions as initial values (e.g., as initial values for state variables corresponding to the DD narrow-lane ambiguities and satellite narrow-lane bias values).

Further, method 500 includes generating (516) a set of navigation satellite corrections for each satellite of the n satellites, the set of navigation satellites corrections for each satellite s including a correction corresponding to the satellite narrow-lane bias value, $b_{NL}^s$, determined for satellite s wherein the sets of navigation satellite corrections for the n satellites are for transmission to navigation receivers for use in determining locations of the navigation receivers.

In some embodiments, method 500 includes applying (514) an over-range adjustment to a respective satellite narrow-lane bias value if the respective satellite narrow-lane bias value meets predefined over-range adjustment criteria. For example, in some such embodiments, determining (512) a satellite narrow-lane bias value, $b_{WL}^s$, for a respective satellite includes determining whether the satellite narrow-lane bias value meets over-range adjustment criteria, and in accordance with a determination that the satellite narrow-lane bias value meets the over-range adjustment criteria, adjusting the satellite narrow-lane bias value by a predefined number of narrow-lane cycles, and adjusting corresponding SD narrow-lane ambiguity values by the predefined number of narrow-lane cycles. For example, as explained above with respect to satellite NL bias over-range handling, when a respective satellite NL bias value falls outside a predefined range, such as (−2, 2), the satellite NL bias value is decreased by an amount represented by $$\text{round}(b_{NL}^s),$$

which is typically equal to 2 or −2, and an corresponding adjustment is made for each satellite s related ambiguity $N_{r,NL}^s$ by adding the same amount.

In some embodiments, the sets of navigation satellite corrections for the n satellites are for transmission (518) to navigation receivers for use in determining locations of the navigation receivers using an absolute mode of navigation, such as precise point positioning (PPP). Furthermore, in some embodiments, method 500 includes transmitting the generated set of navigation satellite corrections for each satellite of the n satellites via one or more communication networks to navigation receivers for use in determining current locations of the navigation receivers using an absolute mode of navigation.

In some embodiments, method 500 includes determining, in accordance with the received reference receiver measurement information, and in accordance with the established locations of the plurality of reference receivers, refraction-corrected wide-lane navigation solutions for the plurality of reference receivers, where the wide-lane navigation solutions include wide-lane fixed integer ambiguity values, and then determining the refraction-corrected narrow-lane navigation solutions for the plurality of reference receivers in accordance with the received reference receiver measurement information, the established locations of the plurality of reference receivers, and the wide-lane navigation solutions.

In some embodiments, the number of clusters, m, is equal to n−1, the satellite narrow-lane bias value, $b_{NL}^s$, for each satellite s is a wide-lane phase bias value, and determining n−1 clusters of single-difference (SD) ambiguity values includes determining a set of fixed wide-lane double-difference (DD) ambiguity values with respect to the reference receivers and the plurality of satellites, each fixed narrow-lane DD ambiguity value corresponding to a pair of the reference receivers and a pair of the satellites in the plurality of satellites. Further, each pair of SD narrow-lane floating ambiguities, $\nabla \hat{N}_{r_m}^{S_i S_j}$ and $\nabla \hat{N}_{r_n}^{S_i S_j}$ for a pair of satellites $S_i$ and $S_j$ corresponds to a respective fixed DD narrow-lane ambiguity value in the determined set of fixed DD ambiguity values.

In some embodiments, determining (504) the initial set of fixed narrow-lane DD ambiguity values with respect to the reference receivers and the plurality of satellites includes performing (506) an iterative process of removing respective float narrow-lane ambiguities from a set of potentially fixable float narrow-lane DD ambiguities in accordance with predefined criteria for identifying problematic float wide-lane DD ambiguities, until a remaining set of potentially fixable float narrow-lane DD ambiguities satisfies predefined validation criteria. For example, see the above discussions of the LAMBDA search process, the partial LAMBDA search process, and identifying and removing problematic ambiguity elements.

In some embodiments, determining the set of fixed narrow-lane DD ambiguity values with respect to the reference receivers and the plurality of satellites includes performing an iterative process of removing respective float narrow-lane ambiguities from a set of potentially fixable float narrow-lane DD ambiguities in accordance with predefined criteria for identifying problematic float narrow-lane DD ambiguities, until a remaining set of potentially fixable float narrow-lane DD ambiguities satisfies predefined validation criteria.

In some embodiments, method 500 further includes periodically determining an updated set of fixed narrow-lane double-difference (DD) ambiguity values with respect to the reference receivers and the plurality of satellites, and determining updates to the determined satellite narrow-lane bias values for the n satellites in accordance with updated set of fixed narrow-lane DD ambiguity values.

In some embodiments, determining the satellite narrow-lane bias value, $b_{NL}^s$, for a respective satellite includes determining whether the satellite narrow-lane bias value meets over-range adjustment criteria, and in accordance with a determination that the satellite narrow-lane bias value meets the over-range adjustment criteria, adjusting the satellite narrow-lane bias value by a predefined number of narrow-lane cycles, and adjusting corresponding SD narrow-lane ambiguity values by the predefined number of narrow-lane cycles.

In some embodiments, determining the satellite narrow-lane bias value, $b_{NL}^s$, for each satellite s of the n satellites includes comparing the determined satellite narrow-lane bias values for each satellite s of the n satellites with a corresponding satellite narrow-lane bias value determined when generating orbit and clock corrections for the n satellites, and adjusting the determined satellite narrow-lane bias value for a respective satellite by an integer number of narrow-lane cycles when an absolute value of a difference between the determined satellite narrow-lane bias value and the corresponding satellite narrow-lane bias value exceeds a predefined threshold.

In some embodiments, determining the satellite narrow-lane bias value, $b_{NL}^s$, for each satellite s of the n satellites includes the setting the satellite narrow-lane bias values for the n satellites such that a sum of the satellite narrow-lane bias values for the n satellites is equal to zero.

In another aspect, a system, such as satellite corrections generation system 130, described above with respect to FIGS. 3A, 3B and 3C, includes a plurality of interconnected computer systems that are configured to, collectively, execute a plurality of navigation satellite correction modules, which causes the plurality of navigation satellite correction modules to perform method 500. For example, FIGS. 5A and 5B are flowcharts of related processes 500A and 500B, with method 500A concerning NL processing by orbit solution module 330, particularly NL DD and SD module 334, and method 500B concerning NL processing by clock solution module 340, particularly NL DD and SD module 344.

Referring to FIG. 5A, method 500A, performed by orbit solution module 330 in one or more orbit solution systems 330-B (see FIG. 3A), includes the orbit solution system 300-B receiving (502A) from preprocessor systems 300-A, at predefined intervals (e.g., every second, or once per epoch of the preprocessor systems 300-A), cleaned measurements for each reference site, a fixed wide-lane ambiguity and a satellite wide-lane bias value, $b_{WL}^s$, for each satellite s of the n satellites 110-1 to 110-n. Orbit solution system 300-B uses the received cleaned measurements to update (520) for a next epoch of the obit solution system 300-B (e.g., once every 300 seconds) its orbit ZD filter (e.g., orbit ZD Kalman filter 332), including values in the orbit ZD filter for ZD NL float ambiguities for each reference cite, ZD NL satellite biases, satellite orbit parameters, solar radiation parameters (if any), satellite and receiver clocks, etc.

Orbit solution module 330 combines (522) all satellite WL biases across all the sites from preprocessor systems 300-A and generates a unified set of global wide-lane bias corrections. Orbit solution module 330 also adjusts (522), for each reference receiver, the WL fixed ambiguity value for the reference receiver 140 (reference site) by an integer cycle if there is an integer cycle WL bias change between the unified WL bias and the individual WL bias for the reference receiver. Orbit solution system 300-B also updates (524) refraction corrected measurements in the orbit ZD filter, typically at first fixed intervals, such as 300 seconds.

The orbit solution system 300-B has an orbit solution module 330 that processes the received measurements at first fixed intervals, such as 300 seconds, to produce orbit corrections (e.g., corrections to satellite positions, as represented by the satellite-broadcast ephemeris, and which are therefore sometimes called corrections to the satellite-broadcast ephemeris), which are provided (534) to clock solution system 300-C and, optionally, low-latency clock solution system 300-D. A more detailed explanation of the operation of orbit NL DD and SD module 334 to resolve NL DD and SD fixed ambiguities, and NL biases, is provided elsewhere in this document (see discussion of operations 526-532).

Referring to FIG. 5B, method 500B, performed by clock solution module 340 in one or more clock solution systems 300-C (see FIGS. 3A, 3B), includes the clock solution system 300-C receiving (502B) from preprocessor systems 300-A, at predefined intervals (e.g., every second), cleaned measurements for each reference site, a fixed wide-lane ambiguity and a satellite wide-lane bias value, $b_{WL}^s$, for each satellite s of the n satellites 110-1 to 110-n, and also receiving satellite orbit corrections or predicted orbits from orbit solution module 330 (see FIG. 5A, 534) at the first fixed intervals (e.g., every second). Clock solution system 300-C uses the received cleaned measurements and satellite orbit corrections to update (520B) for a next epoch of the clock solution system 300-C (e.g., once every 30 seconds) its clock ZD filter (e.g., Kalman filter 342), including values in the clock ZD filter for ZD NL float ambiguities for each reference cite, ZD NL satellite biases, satellite and receiver clocks, tropospheric biases, etc.

Clock solution system 300-C combines (522B) all satellite WL biases across all the sites from preprocessor systems 300-A and generates a unified set of global wide-lane bias corrections. Clock solution system 300-C also adjusts (522B), for each reference receiver/site, the WL fixed ambiguity value for the reference receiver 140 (reference site) by an integer cycle if there is an integer cycle WL bias change between the unified WL bias and the individual WL bias for the reference receiver. Clock solution system 300-C also updates (524B) refraction corrected measurements in clock ZD filter 332, typically at second fixed intervals, such as 30 seconds.

In some embodiments, clock solution system 300-C includes a clock NL DD and SD module 344 that processes the received measurements at second fixed intervals, such as 30 seconds, to produce clock corrections (e.g., corrections to satellite clocks), NL bias corrections, WL bias corrections, and tropospheric delay estimates, sometimes called corrections to the satellite-broadcast ephemeris, which are provided (534B) to low-latency clock solution system 300-D or its low-latency clock solution module 350. A more detailed explanation of the operation of clock NL DD and SD module 344 to resolve NL DD and SD fixed ambiguities, and NL biases, is provided elsewhere in this document (see discussion of operations 526B-532B).

In yet another aspect, a non-transitory computer readable storage medium (e.g., memory 310 of satellite corrections processor systems 300) stores one or more programs for execution by one or more processors of a plurality of interconnected computer systems. The one or more programs include instructions that when executed by the one or more processors of the system cause the system to perform method 500.

Figure 6:
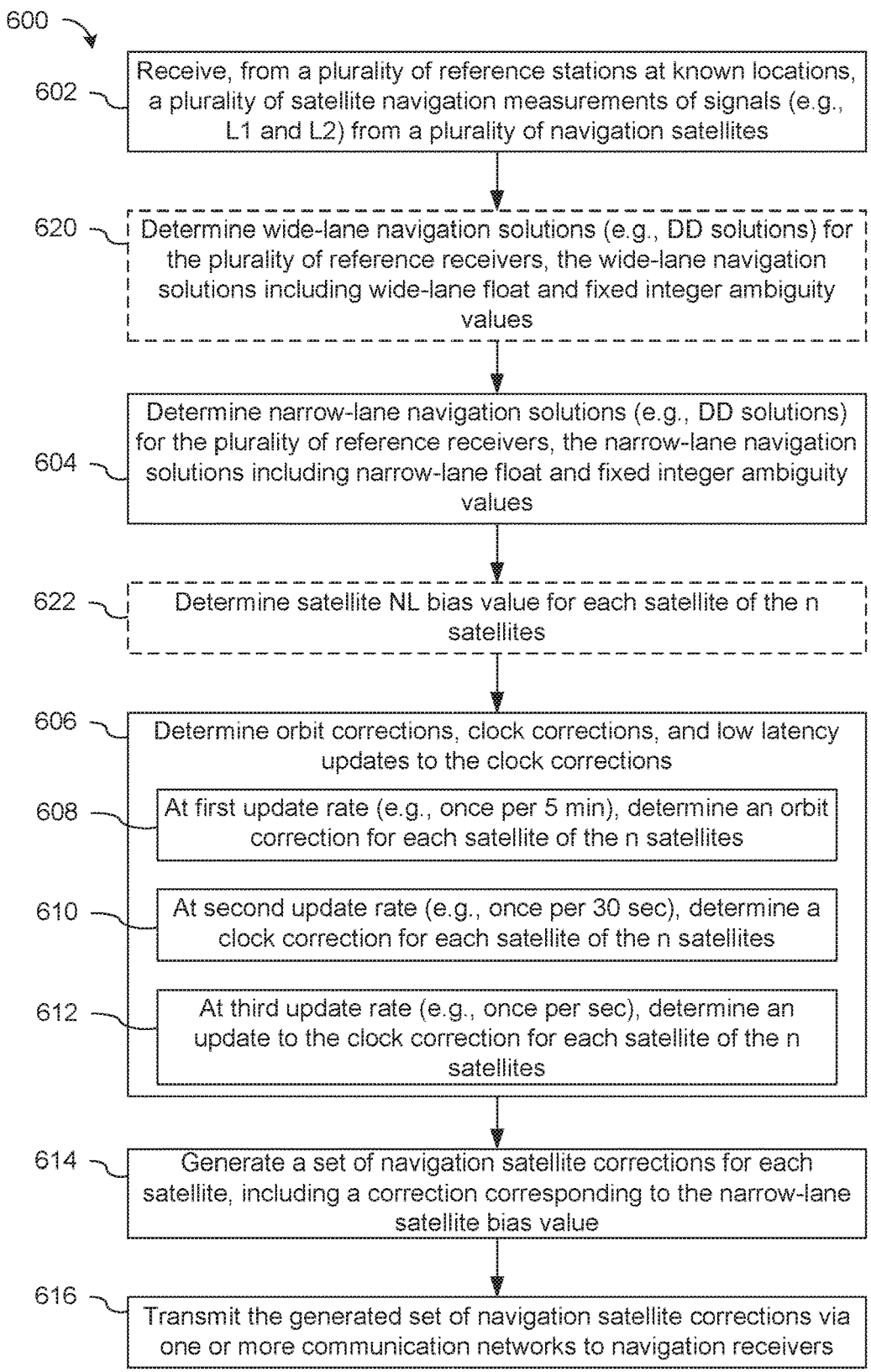
FIG. 6 is a flowchart of a process for generating navigation satellite corrections, include orbit and clock corrections for each satellite in a plurality of satellites, and for providing the generated navigation satellite corrections to navigation receivers, according to some embodiments.

Navigation Satellite Orbit and Clock Correction Determination with Low Latency Clock Corrections FIG. 6 is a flowchart of a process 600 (also herein called method 600) for determining navigation satellite corrections for a plurality of satellites, comprising n satellites, to facilitate navigation by navigation receivers that receive satellite navigation signals from various subsets of the plurality of satellites. Method 600 includes receiving (602) reference receiver measurement information, including receiving, from a plurality of reference receivers (e.g., reference receivers 140, FIG. 1) at established locations, measurements of satellite navigation signals received by each of the reference receivers, wherein the satellite navigation signals received by each reference receiver of the plurality of reference receivers include satellite navigation signals at first (L1) and second (L2) frequencies. Typically, each reference receiver receives signals from at least four or five satellites that are within view of the reference receiver's GNSS antenna (e.g., antenna 260, FIG. 2).

In accordance with the received reference receiver measurement information, and in accordance with the established locations of the plurality of reference receivers, method 600 determines (604) narrow-lane navigation solutions for the plurality of reference receivers. The narrow-lane navigation solutions include narrow-lane float ambiguities and fixed integer ambiguity values. For example, as discussed above, the Melbourne-Wübbena linear combination $L_{r,WL}^s$ can be used for wide-lane ambiguity resolution, after which narrow-lane ambiguities are resolved, consistent with the resolved wide-lane ambiguities.

Further, for a constellation of n satellites in the plurality of satellites, method 600 includes, in accordance with the narrow-lane navigation solutions, determining (606) orbit corrections, clock corrections, and low latency updates to the clock corrections. In particular, this includes (A) at a first update rate, determining (608) an orbit correction for each satellite of the n satellites, (B) at a second update rate, determining (610) a clock correction for each satellite of the n satellites, and (C) at a third update rate that is faster than the second update rate, determining (612) an update to the clock correction for each satellite of the n satellites. In some embodiments, the third update rate is at least five times faster as fast as the second update rate.

Method 600 further includes generating (614) a set of navigation satellite corrections for each satellite of the n satellites, the set of navigation satellites corrections for each satellite s including the orbit correction updated at the first update rate, and the clock correction that is updated at the third update rate. Typically, method 600 includes transmitting (616) the generated set of navigation satellite corrections for each satellite of the n satellites via one or more communication networks to navigation receivers for use in determining current locations of the navigation receivers using an absolute mode of navigation.

In some embodiments, method 600 includes, in accordance with the received reference receiver measurement information, and in accordance with the established locations of the plurality of reference receivers, determining (620) wide-lane navigation solutions for the plurality of reference receivers, where the wide-lane navigation solutions include wide-lane fixed integer ambiguity values, and determining the narrow-lane navigation solutions for the plurality of reference receivers in accordance with the received reference receiver measurement information, the established locations of the plurality of reference receivers, and the wide-lane navigation solutions. As discussed above, in some embodiments the Melbourne-Wübbena linear combination $L_{r,WL}^s$ is used for wide-lane ambiguity resolution, after which narrow-lane ambiguities are resolved, consistent with the resolved wide-lane ambiguities.

In some embodiments, method 600 includes determining (622) a satellite narrow-lane bias value, $b_{NL}^s$, for each satellite s of the n satellites, wherein the satellite narrow-lane bias value is a narrow-lane phase bias value. The orbit correction and clock correction for each satellite s of the n satellites are determined in accordance with the narrow-lane fixed integer ambiguity value and satellite narrow-lane bias value of the satellite s.

In some embodiments of method 600, the wide-lane navigation solutions are determined by a first set of preprocessor modules, the orbit corrections are determined by an orbit solution module that receives the wide-lane solutions from the first set of preprocessor modules, and the clock corrections determined at the second update rate are determined by a clock solution module. Furthermore, clock corrections are determined by a clock solution module that receives that receives the wide-lane solutions from the first set of preprocessor modules and receives the orbit corrections from the orbit solution module. See above discussions of the orbit solution module and clock solution module.

In some embodiments of method 600, the clock solution module is executed by one or more hardware processors distinct from one or more hardware processors that execute the orbit solution module and distinct from one or more hardware processors that execute the first set of preprocessor modules. See above discussions of FIGS. 3A and 3B.

In some embodiments of method 600, the updates to the clock correction for each satellite are determined by a low latency clock module that receives carrier phase measurements, or information corresponding to carrier phase measurements, received from at least a subset of the reference receivers, and determines changes in the clock correction for each satellite in accordance with the received carrier phase measurements or information corresponding to carrier phase measurements. See above discussions of FIG. 3B and low latency clock solution module 350.

In some embodiments, method 600 includes integrating the updates to the clock correction for each satellite with the clock correction for the satellite to produce an updated clock correction at each epoch in a sequence of epochs, and the generated set of navigation satellite corrections for each satellite of the n satellites includes the updated clock correction for each epoch in the sequence of epochs.

In another aspect, a system, such as satellite corrections generation system 130, described above with respect to FIGS. 3A, 3B and 3C, includes a plurality of interconnected computer systems that are configured to, collectively, execute a plurality of navigation satellite correction modules, which causes the plurality of navigation satellite correction modules to perform method 600.

In yet another aspect, a non-transitory computer readable storage medium (e.g., memory 310 of satellite corrections processor systems 300) stores one or more programs for execution by one or more processors of a plurality of interconnected computer systems. The one or more programs include instructions that when executed by the one or more processors of the system cause the system to perform method 600.

It will be understood that although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for determining navigation satellite corrections for a plurality of satellites, to facilitate navigation by moveable objects having navigation receivers that receive satellite navigation signals from various subsets of the plurality of satellites, the method comprising:
   receiving reference receiver measurement information, including receiving, from a plurality of reference receivers at established locations, measurements of satellite navigation signals received by each of the reference receivers, wherein the satellite navigation signals received by each reference receiver of the plurality of reference receivers include satellite navigation signals at first and second frequencies;
   in accordance with the received reference receiver measurement information, and in accordance with the established locations of the plurality of reference receivers, determining narrow-lane navigation solutions for the plurality of reference receivers, the narrow-lane navigation solutions including narrow-lane fixed integer ambiguity values;
   in accordance with the narrow-lane navigation solutions, for a constellation of n satellites in the plurality of satellites,
      at a first update rate, determining an orbit correction for each satellite of the n satellites;
      at a second update rate that is faster than the first update rate, determining a clock solution, the clock solution including a clock correction for each satellite of the n satellites; and
      at a third update rate that is faster than the second update rate, determining an update to the clock correction for each satellite of the n satellites in accordance with carrier phase measurements received from at least a subset of the reference receivers or information corresponding to carrier phase measurements received from at least a subset of the reference receivers; and
   generating a set of navigation satellite corrections for each satellite of the n satellites, the set of navigation satellites corrections for each satellite s including the orbit correction updated at the first update rate, and the clock correction that is updated at the third update rate.

2. The method of claim 1, including determining a satellite narrow-lane bias value, $b_{NL}^s$, for each satellite s of the n satellites, wherein the satellite narrow-lane bias value is a narrow-lane phase bias value; and wherein the orbit correction and clock correction for each satellite s of the n satellites are determined in accordance with the narrow-lane fixed integer ambiguity value and satellite narrow-lane bias value, $b_{NL}^s$, of the satellite s.

3. The method of claim 1, wherein the third update rate is at least five times faster as fast as the second update rate, and the first frequency is a frequency in a predefined L1 frequency band and the second frequency is in a predefined L2 frequency band.

4. The method of claim 1, including in accordance with the received reference receiver measurement information, and in accordance with the established locations of the plurality of reference receivers, determining wide-lane navigation solutions for the plurality of reference receivers, the wide-lane navigation solutions including wide-lane fixed integer ambiguity values; and determining the narrow-lane navigation solutions for the plurality of reference receivers in accordance with the received reference receiver measurement information, the established locations of the plurality of reference receivers, and the wide-lane navigation solutions.

5. The method of claim 4, wherein the wide-lane navigation solutions are determined by a first set of preprocessor modules, the orbit corrections are determined by an orbit solution module that receives the wide-lane solutions from the first set of preprocessor modules, and the clock corrections determined at the second update rate are determined by a clock solution module; and clock corrections are determined by a clock solution module that receives that receives the wide-lane solutions from the first set of preprocessor modules and receives the orbit corrections from the orbit solution module.

6. The method of claim 5, wherein the clock solution module is executed by one or more hardware processors distinct from one or more hardware processors that execute the orbit solution module and distinct from one or more hardware processors that execute the first set of preprocessor modules.

7. The method of claim 5, wherein the updates to the clock correction for each satellite are determined by a low latency clock module that receives the carrier phase measurements, or information corresponding to carrier phase measurements, received from at least a subset of the reference receivers, and determines changes in the clock correction for each satellite in accordance with the received carrier phase measurements or information corresponding to carrier phase measurements.

8. The method of claim 5, including integrating the updates to the clock correction for each satellite with the clock correction for the satellite to produce an updated clock correction at each epoch in a sequence of epochs, wherein the generated set of navigation satellite corrections for each satellite of the n satellites includes the updated clock correction for each epoch in the sequence of epochs.

9. The method of claim 1, including transmitting the generated set of navigation satellite corrections for each satellite of the n satellites via one or more communication networks to navigation receivers for use in determining current locations of the navigation receivers using an absolute mode of navigation.

10. A system for determining navigation satellite corrections for a plurality of satellites, comprising n satellites, to facilitate navigation by navigation receivers that receive satellite navigation signals from various subsets of the plurality of satellites, the system comprising:

a plurality of interconnected computer systems that, collectively, execute a plurality of navigation satellite correction modules, wherein execution of the plurality of navigation satellite correction modules causes the system to perform operations comprising:

receiving reference receiver measurement information, including receiving, from a plurality of reference receivers at established locations, measurements of satellite navigation signals received by each of the reference receivers, wherein the satellite navigation signals received by each reference receiver of the plurality of reference receivers include satellite navigation signals at first and second frequencies;

in accordance with the received reference receiver measurement information, and in accordance with the established locations of the plurality of reference receivers, determining narrow-lane navigation solutions for the plurality of reference receivers, the narrow-lane navigation solutions including narrow-lane fixed integer ambiguity values;

in accordance with the narrow-lane navigation solutions, for a constellation of n satellites in the plurality of satellites, at a first update rate, determining an orbit correction for each satellite of the n satellites;

at a second update rate that is faster than the first update rate, determining a clock solution, the clock solution including a clock correction for each satellite of the n satellites; and at a third update rate that is faster than the second update rate, determining an update to the clock correction for each satellite of the n satellites in accordance with carrier phase measurements received from at least a subset of the reference receivers or information corresponding to carrier phase measurements received from at least a subset of the reference receivers; and generating a set of navigation satellite corrections for each satellite of the n satellites, the set of navigation satellites corrections for each satellite s including the orbit correction updated at the first update rate, and the clock correction that is updated at the third update rate.

11. The system of claim 10, wherein the plurality of navigation satellite correction modules include a first set of preprocessor modules that determine wide-lane navigation solutions, an orbit solution module that receives the wide-lane solutions from the first set of preprocessor modules and determines the orbit corrections, and a clock solution module that receives the wide-lane solutions from the first set of preprocessor modules and determines the clock corrections.

12. The system of claim 11, including a first set of one or more hardware processors that execute the first set of preprocessor modules, a second set of one or more hardware processors that execute the orbit solution module, and a third set of one or more hardware processors that execute the clock solution module, wherein the first, second and third sets of one or more hardware processors are distinct sets of one or more hardware processors.

13. The system of claim 10, wherein the plurality of navigation satellite correction modules include instructions that when executed by the system cause the system to perform operations including:
  determining a satellite narrow-lane bias value, $b_{NL}^s$, for each satellite s of the n satellites, wherein the satellite narrow-lane bias value is a narrow-lane phase bias value;
  wherein the orbit correction and clock correction for each satellite s of the n satellites are determined in accordance with the narrow-lane fixed integer ambiguity value and satellite narrow-lane bias value, $b_{NL}^s$, of the satellites.

14. The system of claim 10, wherein the third update rate is at least five times faster as fast as the second update rate, and the first frequency is a frequency in a predefined L1 frequency band and the second frequency is in a predefined L2 frequency band.

15. The system of claim 10, wherein the plurality of navigation satellite correction modules include instructions that when executed by the system cause the system to perform operations including:
  in accordance with the received reference receiver measurement information, and in accordance with the established locations of the plurality of reference receivers, determining wide-lane navigation solutions for the plurality of reference receivers, the wide-lane navigation solutions including wide-lane fixed integer ambiguity values; and
  determining the narrow-lane navigation solutions for the plurality of reference receivers in accordance with the received reference receiver measurement information, the established locations of the plurality of reference receivers, and the wide-lane navigation solutions.

16. The system of claim 15, wherein
  the wide-lane navigation solutions are determined by a first set of preprocessor modules, the orbit corrections are determined by an orbit solution module that receives the wide-lane solutions from the first set of preprocessor modules, and the clock corrections determined at the second update rate are determined by a clock solution module; and
  clock corrections are determined by a clock solution module that receives that receives the wide-lane solutions from the first set of preprocessor modules and receives the orbit corrections from the orbit solution module.

17. The system of claim 16, wherein the clock solution module is executed by one or more hardware processors distinct from one or more hardware processors that execute the orbit solution module and distinct from one or more hardware processors that execute the first set of preprocessor modules.

18. The system of claim 16, wherein the updates to the clock correction for each satellite are determined by a low latency clock module that receives carrier phase measurements, or information corresponding to carrier phase measurements, received from at least a subset of the reference receivers, and determines changes in the clock correction for each satellite in accordance with the received carrier phase measurements or information corresponding to carrier phase measurements.

19. The system of claim 16, wherein the plurality of navigation satellite correction modules include instructions that when executed by the system cause the system to perform operations including: integrating the updates to the clock correction for each satellite with the clock correction for the satellite to produce an updated clock correction at each epoch in a sequence of epochs, wherein the generated set of navigation satellite corrections for each satellite of the n satellites includes the updated clock correction for each epoch in the sequence of epochs.

20. The system of claim 10, wherein the plurality of navigation satellite correction modules include instructions that when executed by the system cause the system to perform operations including: transmitting the generated set of navigation satellite corrections for each satellite of the n satellites via one or more communication networks to navigation receivers for use in determining current locations of the navigation receivers using an absolute mode of navigation.

21. A non-transitory computer readable storage medium storing programs for execution by processors of a system that includes plurality of interconnected computer systems, the programs including instructions that when executed by the processors of the interconnected computer systems cause the system to perform operations comprising:
  receiving reference receiver measurement information, including receiving, from a plurality of reference receivers at established locations, measurements of satellite navigation signals received by each of the reference receivers, wherein the satellite navigation signals received by each reference receiver of the plurality of reference receivers include satellite navigation signals at first and second frequencies;
  in accordance with the received reference receiver measurement information, and in accordance with the established locations of the plurality of reference receivers, determining narrow-lane navigation solutions for the plurality of reference receivers, the narrow-lane navigation solutions including narrow-lane fixed integer ambiguity values;
  in accordance with the narrow-lane navigation solutions, for a constellation of n satellites in the plurality of satellites,
    at a first update rate, determining an orbit correction for each satellite of the n satellites;
    at a second update rate that is faster than the first update rate, determining a clock solution, the clock solution including a clock correction for each satellite of the n satellites and
    at a third update rate that is faster than the second update rate, determining an update to the clock correction for each satellite of the n satellites in accordance with carrier phase measurements received from at least a subset of the reference receivers or information corresponding to carrier phase measurements received from at least a subset of the reference receivers; and
  generating a set of navigation satellite corrections for each satellite of the n satellites, the set of navigation satellites corrections for each satellite s including the orbit correction updated at the first update rate, and the clock correction that is updated at the third update rate.

22. The non-transitory computer readable storage medium of claim 21, wherein the programs include a first set of preprocessor modules that determine wide-lane navigation solutions, an orbit solution module that receives the wide-lane solutions from the first set of preprocessor modules and determines the orbit corrections, and a clock solution module that receives the wide-lane solutions from the first set of preprocessor modules and determines the clock corrections.

* * * * *

UNITED STATES PATENT AND TRADEMARK OFFICE
CERTIFICATE OF CORRECTION

PATENT NO.         : 10,386,496 B2
APPLICATION NO.    : 15/448481
DATED              : August 20, 2019
INVENTOR(S)        : Dai et al.

Page 1 of 1

It is certified that error appears in the above-identified patent and that said Letters Patent is hereby corrected as shown below:

In the Claims

Claim 5, Column 57, Line 37, please delete "module that receives that receives the" and insert --module that receives the--;

Claim 13, Column 59, Line 13, please delete "satellites" and insert --satellite $s$--;

Claim 15, Column 59, Line 20, please delete "modules include instructions" and insert --modules includes instructions--;

Claim 16, Column 59, Line 44, please delete "module that receives that receives the" and insert --module that receives the--;

Claim 19, Column 59, Line 64, please delete "modules include instructions" and insert --modules includes instructions--;

Claim 20, Column 60, Line 7, please delete "modules include instructions" and insert --modules includes instructions--.

Signed and Sealed this
Fifth Day of November, 2019

Andrei Iancu
*Director of the United States Patent and Trademark Office*